(12) United States Patent
Arndt et al.

(10) Patent No.: US 12,441,785 B2
(45) Date of Patent: Oct. 14, 2025

(54) METHODS OF TREATING INFLAMMATORY DISEASES

(71) Applicant: Boehringer Ingelheim International GmbH, Ingelheim am Rhein (DE)

(72) Inventors: Matthias Arndt, Laupheim (DE); Stella Aslanyan, Danbury, CT (US); Mary Ruth Flack, Ridgefield, CT (US); Annette Bettina Galler, Armsheim (DE); Bojan Lalovic, Cedar Knolls, NJ (US); Steven John Padula, Southbury, CT (US); Paul Russell Scholl, Redding, CT (US)

(73) Assignee: Boehringer Ingelheim International GmbH, Ingelheim am Rhein (DE)

( * ) Notice: Subject to any disclaimer, the term of this patent is extended or adjusted under 35 U.S.C. 154(b) by 333 days.

(21) Appl. No.: 15/013,008

(22) Filed: Feb. 2, 2016

(65) Prior Publication Data
US 2016/0222102 A1 Aug. 4, 2016

Related U.S. Application Data

(60) Provisional application No. 62/235,631, filed on Oct. 1, 2015, provisional application No. 62/204,520, filed on Aug. 13, 2015, provisional application No. 62/145,764, filed on Apr. 10, 2015, provisional application No. 62/135,335, filed on Mar. 19, 2015, provisional application No. 62/130,876, filed on Mar. 10, 2015, provisional application No. 62/111,731, filed on Feb. 4, 2015.

(51) Int. Cl.
*C07K 16/24* (2006.01)
*A61K 39/00* (2006.01)

(52) U.S. Cl.
CPC ...... *C07K 16/244* (2013.01); *A61K 2039/505* (2013.01); *A61K 2039/545* (2013.01); *C07K 2317/76* (2013.01)

(58) Field of Classification Search
None
See application file for complete search history.

(56) References Cited

U.S. PATENT DOCUMENTS

| | | |
|---|---|---|
| 4,179,337 A | 12/1979 | Davis et al. |
| 4,275,149 A | 6/1981 | Litman et al. |
| 4,301,144 A | 11/1981 | Iwashita et al. |
| 4,318,980 A | 3/1982 | Boguslaski et al. |
| 4,419,446 A | 12/1983 | Howley et al. |
| 4,485,045 A | 11/1984 | Rogen |
| 4,496,689 A | 1/1985 | Mitra |
| 4,544,545 A | 10/1985 | Ryan et al. |
| 4,560,655 A | 12/1985 | Baker |
| 4,601,978 A | 7/1986 | Karin |
| 4,640,835 A | 2/1987 | Shimizu et al. |
| 4,657,866 A | 4/1987 | Kumar |
| 4,670,417 A | 6/1987 | Iwasaki et al. |
| 4,737,456 A | 4/1988 | Weng et al. |
| 4,741,900 A | 5/1988 | Alvarez et al. |
| 4,767,704 A | 8/1988 | Cleveland et al. |
| 4,791,192 A | 12/1988 | Nakagawa et al. |
| 4,816,567 A | 3/1989 | Cabilly et al. |
| 4,927,762 A | 5/1990 | Darfler |
| 4,965,199 A | 10/1990 | Capon et al. |
| 4,975,278 A | 12/1990 | Senter et al. |
| 5,013,556 A | 5/1991 | Woodle et al. |
| 5,122,469 A | 6/1992 | Mather et al. |
| 5,888,809 A | 3/1999 | Allison |
| 6,037,454 A | 3/2000 | Jardieu et al. |
| 6,054,297 A | 4/2000 | Carter et al. |
| 6,060,284 A | 5/2000 | Bazan |
| 6,407,213 B1 | 6/2002 | Carter et al. |
| 6,479,634 B1 | 11/2002 | Bazan |
| 6,495,667 B1 | 12/2002 | Bazan |
| 6,610,285 B1 | 8/2003 | Hirata |
| 6,756,481 B2 | 6/2004 | Chirica et al. |
| 6,835,825 B1 | 12/2004 | Bazan |
| 7,090,847 B1 | 8/2006 | Oppmann et al. |
| 7,183,382 B2 | 2/2007 | Oppmann et al. |
| 7,252,967 B2 | 8/2007 | Hirata |
| 7,282,204 B2 | 10/2007 | Oft et al. |
| 7,332,156 B2 | 2/2008 | Bowman et al. |
| 7,411,041 B2 | 8/2008 | Chirica et al. |
| 7,422,743 B2 | 9/2008 | Chirica et al. |
| 7,427,402 B2 | 9/2008 | Kastelein et al. |

(Continued)

FOREIGN PATENT DOCUMENTS

| | | |
|---|---|---|
| DE | DD-266710 A3 | 4/1989 |
| EP | 0 736 57 A1 | 3/1983 |

(Continued)

OTHER PUBLICATIONS

Paul. Fundamental Immunology, 3rd Edition, Raven Press, New York, Chapter 8, pp. 292-295, 1993 (Year: 1993).*
MacCallum et al. Antibody-antigen interactions: contact analysis and binding topography. Journal of Molecular Biology, 262:732-745, 1996 (Year: 1996).*
Casset et al. A peptide mimetic of an anti-CD4 monoclonal antibody by rational design. Biochemical and Biophysical Research Communications, 307: 198-205, 2003. (Year: 2003).*
Vajdos et al. Comprehensive Functional Maps of the Antigen binding Site of an Anti-ErbB2 Antibody Obtained with Shotgun Scanning Mutagenesis. Journal of Molecular Biology, Jul. 5, 2002; 320(2):415-28 (Year: 2002).*

(Continued)

*Primary Examiner* — Vanessa L. Ford
*Assistant Examiner* — Sandra Carter
(74) *Attorney, Agent, or Firm* — Foley & Lardner LLP

(57) ABSTRACT

This invention generally relates to methods for the treatment of IL-23 related diseases, in particular inflammatory diseases, such as psoriasis, psoriatic arthritis or axial (spinal) spondyloarthritis (ax-SpA), including ankylosing spondylitis and non-radiographic ax-SpA, utilizing anti-IL-23A antibodies.

80 Claims, 5 Drawing Sheets

Specification includes a Sequence Listing.

(56) References Cited

U.S. PATENT DOCUMENTS

| | | | |
|---|---|---|---|
| 7,491,391 B2 | 2/2009 | Benson et al. |
| 7,501,247 B2 | 3/2009 | Kastelein et al. |
| 7,510,709 B2 | 3/2009 | Gurney |
| 7,510,853 B2 | 3/2009 | Chirica et al. |
| 7,575,741 B2 | 8/2009 | Bowman et al. |
| 7,608,690 B2 | 10/2009 | Bazan |
| 7,740,848 B2 | 6/2010 | Kastelein et al. |
| 7,749,718 B2 | 7/2010 | Chirica et al. |
| 7,750,126 B2 | 7/2010 | Hirata |
| 7,754,214 B2 | 7/2010 | Chirica et al. |
| 7,790,862 B2 | 9/2010 | Lewis et al. |
| 7,807,160 B2 | 10/2010 | Presta et al. |
| 7,807,414 B2 | 10/2010 | Benson et al. |
| 7,820,168 B2 | 10/2010 | Cua et al. |
| 7,872,102 B2 | 1/2011 | Beidler et al. |
| 7,883,695 B2 | 2/2011 | Oppmann et al. |
| 7,887,806 B2 | 2/2011 | Chirica et al. |
| 7,893,215 B2 | 2/2011 | Bowman et al. |
| 7,910,703 B2 | 3/2011 | Lewis et al. |
| 7,935,344 B2 | 5/2011 | Benson et al. |
| 7,993,645 B2 | 8/2011 | Benson et al. |
| 8,106,177 B2 | 1/2012 | Benson et al. |
| 8,778,346 B2 | 7/2014 | Barrett et al. |
| 9,441,036 B2 | 9/2016 | Barrett et al. |
| 10,202,448 B2 | 2/2019 | Barrett et al. |
| 10,507,241 B2 | 12/2019 | Visvanathan et al. |
| 11,078,265 B2 | 8/2021 | Nabozny et al. |
| 11,572,385 B2 | 2/2023 | Garidel et al. |
| 2004/0219150 A1 | 11/2004 | Cua et al. |
| 2004/0258686 A1 | 12/2004 | Chirica et al. |
| 2005/0039222 A1 | 2/2005 | Habu et al. |
| 2005/0100917 A1 | 5/2005 | Chirica et al. |
| 2005/0100918 A1 | 5/2005 | Chirica et al. |
| 2005/0100965 A1 | 5/2005 | Ghayur et al. |
| 2005/0208052 A1 | 9/2005 | Katsikis et al. |
| 2005/0244874 A1 | 11/2005 | Kastelein et al. |
| 2005/0287593 A1 | 12/2005 | Kastelein et al. |
| 2006/0088523 A1 | 4/2006 | Andya et al. |
| 2006/0140958 A1 | 6/2006 | Hogan et al. |
| 2007/0009526 A1 | 1/2007 | Benson et al. |
| 2007/0218060 A1 | 9/2007 | Long et al. |
| 2008/0199460 A1 | 8/2008 | Cua et al. |
| 2008/0200655 A1 | 8/2008 | Sek |
| 2008/0254026 A1 | 10/2008 | Long et al. |
| 2008/0311043 A1 | 12/2008 | Hoffman et al. |
| 2009/0060906 A1 | 3/2009 | Barry et al. |
| 2009/0092604 A1 | 4/2009 | Cua et al. |
| 2009/0123479 A1 | 5/2009 | Bembridge et al. |
| 2009/0156788 A1 | 6/2009 | Presta et al. |
| 2009/0291062 A1 | 11/2009 | Fraunhofer et al. |
| 2010/0003251 A1 | 1/2010 | Oft et al. |
| 2010/0041144 A1 | 2/2010 | Bazan |
| 2010/0111950 A1 | 5/2010 | Cua et al. |
| 2010/0111954 A1 | 5/2010 | Cua et al. |
| 2010/0111966 A1 | 5/2010 | Presta et al. |
| 2010/0135998 A1 | 6/2010 | Bowman et al. |
| 2010/0143357 A1 | 6/2010 | Cua et al. |
| 2010/0172862 A1 | 7/2010 | Correia et al. |
| 2010/0254991 A1 | 10/2010 | Kastelein et al. |
| 2010/0261273 A1 | 10/2010 | Chirica et al. |
| 2010/0266582 A1 | 10/2010 | Gurney |
| 2010/0266583 A1 | 10/2010 | Gurney |
| 2010/0272731 A1 | 10/2010 | Presta et al. |
| 2010/0291084 A1 | 11/2010 | Kopf et al. |
| 2010/0322863 A1 | 12/2010 | Benson et al. |
| 2011/0002942 A1 | 1/2011 | Presta et al. |
| 2011/0059087 A1 | 3/2011 | Lewis et al. |
| 2011/0135597 A1 | 6/2011 | Bowman et al. |
| 2011/0142831 A1 | 6/2011 | Cua et al. |
| 2011/0142853 A1 | 6/2011 | Presta et al. |
| 2011/0159589 A1 | 6/2011 | Lewis et al. |
| 2011/0177022 A1 | 7/2011 | Oppmann et al. |
| 2011/0195455 A1 | 8/2011 | Benson et al. |
| 2011/0206686 A1 | 8/2011 | Bembridge et al. |
| 2011/0212104 A1 | 9/2011 | Beaumont et al. |
| 2011/0229490 A1 | 9/2011 | Li et al. |
| 2011/0250201 A1 | 10/2011 | Smith |
| 2011/0311527 A1 | 12/2011 | Stern et al. |
| 2012/0128689 A1 | 5/2012 | Clarkson et al. |
| 2012/0195885 A1 | 8/2012 | Correia et al. |
| 2012/0277799 A1 | 11/2012 | Winslow et al. |
| 2012/0282269 A1 | 11/2012 | Barrett et al. |
| 2013/0004501 A1 | 1/2013 | Towne et al. |
| 2013/0028907 A1 | 1/2013 | Parshad et al. |
| 2013/0115166 A1 | 5/2013 | Clarke et al. |
| 2013/0216525 A1 | 8/2013 | Chen |
| 2014/0046063 A1 | 2/2014 | Moussy et al. |
| 2014/0178401 A1 | 6/2014 | Nabozny et al. |
| 2014/0303357 A1 | 10/2014 | Lim et al. |
| 2014/0363444 A1 | 12/2014 | Barrett et al. |
| 2016/0060338 A1 | 3/2016 | Barrett et al. |
| 2016/0222102 A1 | 8/2016 | Arndt et al. |
| 2016/0304602 A1 | 10/2016 | Arndt et al. |
| 2016/0333091 A1 | 11/2016 | Barrett et al. |
| 2017/0022294 A1 | 1/2017 | Singh et al. |
| 2017/0081402 A1 | 3/2017 | Boecher et al. |
| 2017/0157246 A1 | 6/2017 | Visvanathan et al. |
| 2017/0298126 A1 | 10/2017 | Baum et al. |
| 2018/0009887 A1 | 1/2018 | Arndt-Schmitz et al. |
| 2018/0105588 A1 | 4/2018 | Baum et al. |
| 2018/0334501 A1 | 11/2018 | Arndt-Schmitz et al. |
| 2019/0309016 A1 | 10/2019 | Garidel et al. |
| 2020/0299378 A1 | 9/2020 | Baum et al. |
| 2020/0308271 A1 | 10/2020 | Baum et al. |
| 2020/0376117 A1 | 12/2020 | Visvanathan et al. |
| 2021/0070852 A1 | 3/2021 | Garidel et al. |
| 2021/0198355 A1 | 7/2021 | Barrett et al. |
| 2021/0317201 A1 | 10/2021 | Nabozny et al. |

FOREIGN PATENT DOCUMENTS

| | | |
|---|---|---|
| EP | 0 183 070 A2 | 6/1986 |
| EP | 0 244 234 A2 | 11/1987 |
| EP | 0 402 226 A1 | 12/1990 |
| EP | 1 072 610 A1 | 1/2001 |
| EP | 2 786 746 A1 | 10/2014 |
| JP | 2015-517465 A | 6/2015 |
| WO | WO-81/01145 A1 | 4/1981 |
| WO | WO-87/00195 A1 | 1/1987 |
| WO | WO-88/07378 A1 | 10/1988 |
| WO | WO-90/03430 A1 | 4/1990 |
| WO | WO-90/13646 A1 | 11/1990 |
| WO | WO-94/04188 A1 | 3/1994 |
| WO | WO-94/11026 A2 | 5/1994 |
| WO | WO-96/24369 A1 | 8/1996 |
| WO | WO-96/32478 A1 | 10/1996 |
| WO | WO-99/05280 A1 | 2/1999 |
| WO | WO-99/40195 A1 | 8/1999 |
| WO | WO-99/54357 A1 | 10/1999 |
| WO | WO-01/1805 A2 | 3/2001 |
| WO | WO-01/85790 A2 | 11/2001 |
| WO | WO-03/039485 A2 | 5/2003 |
| WO | WO-2004/042009 A2 | 5/2004 |
| WO | WO-2004/058178 A2 | 7/2004 |
| WO | WO-2004/071517 A2 | 8/2004 |
| WO | WO-2004/081190 A2 | 9/2004 |
| WO | WO-2005/044294 A2 | 5/2005 |
| WO | WO-2005/052157 A1 | 6/2005 |
| WO | WO-2005/079837 A1 | 9/2005 |
| WO | WO-2005/108616 A1 | 11/2005 |
| WO | WO-2006/036922 A2 | 4/2006 |
| WO | WO-2006/068987 A2 | 6/2006 |
| WO | WO-2007/005647 A2 | 1/2007 |
| WO | WO-2007/005955 A2 | 1/2007 |
| WO | WO-2007/024846 A2 | 3/2007 |
| WO | WO-2007/027714 A2 | 3/2007 |
| WO | WO-2007/027761 A2 | 3/2007 |
| WO | WO-2007/076523 A2 | 7/2007 |
| WO | WO-2007/076524 A2 | 7/2007 |
| WO | WO-2007/147019 A2 | 12/2007 |
| WO | WO-2007/149814 A1 | 12/2007 |
| WO | WO-2008/101145 A1 | 8/2008 |
| WO | WO-2008/103432 A1 | 8/2008 |
| WO | WO-2008/103473 A1 | 8/2008 |

(56) References Cited

FOREIGN PATENT DOCUMENTS

| | | |
|---|---|---|
| WO | WO-2008/106131 A2 | 9/2008 |
| WO | WO-2008/153610 A2 | 12/2008 |
| WO | WO-2009/032954 A1 | 3/2009 |
| WO | WO-2009/043933 A1 | 4/2009 |
| WO | WO-2009/053493 A1 | 4/2009 |
| WO | WO-2009/055936 A1 | 5/2009 |
| WO | WO-2009/073569 A2 | 6/2009 |
| WO | WO-2009/082624 A2 | 7/2009 |
| WO | WO-2010/017598 A1 | 2/2010 |
| WO | WO-2010/027766 A1 | 3/2010 |
| WO | WO-2010/115092 A2 | 10/2010 |
| WO | WO-2010/115786 A1 | 10/2010 |
| WO | WO-2011/011797 A2 | 1/2011 |
| WO | WO-2011/056600 A1 | 5/2011 |
| WO | WO-2011/066369 A2 | 6/2011 |
| WO | WO-2011/070339 A1 | 6/2011 |
| WO | WO-2011/103105 A1 | 8/2011 |
| WO | WO-2011/104381 A2 | 9/2011 |
| WO | WO-2011/109365 A2 | 9/2011 |
| WO | WO-2011/159655 A2 | 12/2011 |
| WO | WO-2011/159750 A1 | 12/2011 |
| WO | WO-2012/009760 A1 | 1/2012 |
| WO | WO-2012/032181 A2 | 3/2012 |
| WO | WO-2012061448 A1 * | 5/2012 ............. A61P 11/00 |
| WO | WO-2012/093254 A1 | 7/2012 |
| WO | WO-2012/103345 A1 | 8/2012 |
| WO | WO-2013/165791 A1 | 11/2013 |
| WO | WO-2013/186230 A1 | 12/2013 |
| WO | WO-2014/004436 A2 | 1/2014 |
| WO | WO-2014/143540 | 9/2014 |
| WO | WO-2014/149425 A1 | 9/2014 |
| WO | WO-2016/014775 A1 | 1/2016 |
| WO | WO-2016/036918 A1 | 3/2016 |
| WO | WO-2017/048901 A1 | 3/2017 |
| WO | WO-2018/011404 A1 | 1/2018 |
| WO | WO-2019/246271 A1 | 12/2019 |
| WO | WO-2024/085697 | 4/2024 |

OTHER PUBLICATIONS

Kim et al. Diagnosis and management of psoriasis. Canadian Family Physician, 2017;63:278-85 (Year: 2017).*

Alunno et al. Targeting the IL-23/IL-17 axis for the treatment of psoriasis and psoriatic arthritis. Expert Opinion on Biological Therapy, 2015;15:12, 1727-1737 (Year: 2015).*

Campa et al. A review of biologic therapies targeting IL-23 and IL-17 for use in moderate-to-severer plaque psoriasis. Dermatology Therapy, 2016; 6:1-12 (Year: 2016).*

ClinicalTrials.gov study NCT01018810, published Nov. 24, 2009 (downloaded from https://clinicaltrials.gov/ct2/history/NCT01018810) (Year: 2009).*

ClinicalTrials.gov study NCT01483599, published Nov. 29, 2011 (downloaded fromhttps://clinicaltrials.gov/ct2/history/NCT01483599) (Year: 2011).*

ClinicalTrials.gov study NCT02319759, published Dec. 15, 2014 (downloaded fromhttps://clinicaltrials.gov/ct2/history/NCT02319759) (Year: 2014).*

ClinicalTrials.gov study NCT01729754, published Nov. 14, 2012 (downloaded fromhttps://clinicaltrials.gov/ct2/history/NCT01729754) (Year: 2012).*

ClinicalTrials.gov study NCT01483599, published Nov. 29, 2011 (downloaded fromhttps://clinicaltrials.gov/ct2/history/ NCT01483599) (Year: 2011).*

ClinicalTrials.gov study NCT02319759, published Dec. 15, 2014 (downloaded fromhttps://clinicaltrials.gov/ct2/history/ NCT02319759) (Year: 2014).*

ClinicalTrials.gov study NCT01729754, published Nov. 14, 2012 (downloaded fromhttps://clinicaltrials.gov/ct2/history/ NCT01729754) (Year: 2012).*

Aggarwal et al., "Interleukin-23 Promotes a Distinct CD4 T Cell Activation State Characterized by the Production of Interleukin-17," Journal of Biological Chemistry, 2003, 278(3): 1910-1914.

Alegre et al., "A Non-Activativing "Humanized" Anti-CD3 Monoclonal Antibody Retains Immunosuppressive Properties in Vivo," Transplantation; Jun. 1994, 57(11):1537-1543.

Anonymous: "A 52-Week, Phase 3, Randomized, Active Comparator and Placebo-Controlled, Parallel Design Study to Evaluate the Efficacy and Safety/Tolerability of Subcutaneous SCH 9000222/ MK-3222, Followed by an Optional Long-Term Safety Extension Study, in Subjects with Moderate-to-Severe Chronic Plaque Psoriasis" Dec. 30, 2014, 4 pages, Clinical Trials Identifier: NCT01729754, Clinicaltrials.gov.

Anonymous: "A Phase 2 Multicenter, Randomized, Pacebo- and Active-Comparator-Controlled, Dose-Ranging Trial to Evaluate CNTO 1959 for the Treatment of Subjects with Moderate to Sever Plaquetype Psoriasis (X-PLORE)" Mar. 10, 2014, 4 pages, Clinical Trials Identifier NCT01483599, Clinicaltrials.gov.

Anonymous: "A Phase 2a, Multicenter, Randomized, Double-blind, Placebo-controlled Study Evaluating the Efficacy and Safety of Guselkumab in the Treatment of Subjects with Active Psoriatic Arthritis," Jan. 26, 2015, 4 pages, Clinical Trials Identifier: NCT02319759, Clinicaltrials.gov.

Baerveldt et al., "Ustekinumab improves psoriasis-related gene expression in noninvolved psoriatic skin without inhibition of the antimicrobial response," British Journal of Dermatology, 2013, 168:990-998.

Beyer et al., "Crystal Structures of the Pro-Inflammatory Cytokine Interleukin-23 and its Complex with a High-Affinity Neutralizing Antibody," Journal of Molecular Biology, 2008, 382:942-955.

Bhambhani et al., "Formulation Design and High-Throughput Excipient Selection Based on Structural Integrity and Conformational Stability of Dilute and Highly Concentrated IgG1 Monoclonal Antibody Solutions," Journal of Pharmaceutical Sciences, 2012, 101(3):1120-1135.

Brodmerkel et al., "The Skin and Circulating Immune Profile of Therapeutic IL-12/23 Blockade in Psoriasis Patients Treated with Ustekinumab," Clinical Immunology, Academic Press, Jan. 1, 2009, 131:S5, Abstract.

Cao et al., "Anti-IL-23 antibody blockade of IL-23/IL-17 pathway attenuates airway obliteration in rat orthotopic tracheal transplantation," International Immunopharmacology, 2011, 11:569-575.

Castro et al., "Reslizumab for Poorly Controlled, Eosinophilic Asthma, A Randomized, Placebo-controlled Study," Am. J. Respir. Crit. Care Med., 2011, 184:1125-1132.

Catalog No. AF1716. "Anti-human IL-23 p19 Antibody," Lot No. JMB01., R&D Systems, Inc., Dec. 17, 2003.

Chan et al., "Therapeutic antibodies for autoimmunity and inflammation," Nature Reviews, Immunology, May 2010, 10:301-316.

Choy et al., "Th2 and Th17 inflammatory pathways are reciprocally regulated in asthma," www.ScienceTranslationalMedicine.org, 2015, 7(301):301 ra129, 11 pages.

Ciprandi et al., "Serum IL-23 Strongly and Inversely Correlates with FEV1 in Asthmatic Children," International Archives of Allergy and Immunology, 2012, 159(2):183-186.

Croxford et al., IL-12 and IL-23 in health and disease,: Cytokine & Growth Factor Reviews, 2014, 25:415-421.

Cupparic et al., "Serum IL-23 in Asthmatic Children," Journal of Biological Regulators & Homeostatic Agents, 2012, 26(1(S)):53-61.

Daugherty et al., "Formulation and delivery issues for monoclonal antibody therapeutics," Advanced Drug Delivery Reviews, 2006, 58:686-706.

eBioscience, Anti-Mouse IL-23 p 19 Purified; Catalog No. 14-7232; Clone G23-8; According to all information that could be obtained from publicly available sources by Applicants, G23-8 antibody was available for purchase in 2005.

eBioscience, Anti-Mouse IL-23 p 19 Purified; Catalog No. 14-7233; Clone 5B2; According to all information that could be obtained from publicly available sources by Applicants, 5B2 antibody was available for purchase in 2007.

eBioscience, Mouse IL-23 ELISA Ready-Set-Go! ELISA Kit, Catalog No. 88-7923, 6 pages. According to all information that could be obtained from publicly available sources by Applicants, Mouse IL-23 ELISA Ready-Set-Go! ELISA Kit was available for purchase in 2007.

(56) References Cited

OTHER PUBLICATIONS

Eijnden, Serge Vanden et al., "Preferential production of the IL-12(p40)/IL-23(19) heterodimer by dendritic cells from human newborns," Eur. J. Immunol., 2006, 36:21-26.

Fahy, John V., "Eosinophilic and Neutrophilic Inflammation in Asthma, Insights from Clinical Studies," Proceedings of the American Thoracic Society, 2009, 6:256-259.

Fichtner-Feigl et al., "Treatment of murine Th1- and Th2-mediated inflammatory bowel disease with NF-κB decoy oligonucleotides," Journal of Clinical Investigation, Nov. 2005, 115(11):3057-3071.

Gaffen et al., "The IL-23-1L-17 immune axis: from mechanisms to therapeutic testing," Nature Reviews, 2014, 14:585-600.

Gordon et al., "A Phase 2 Trial of Guselkumab versus Adalimumab for Plaque Psoriasis," New England Journal of Medicine, 2015, 373(2):136-144.

Gudjonsson et al., "Assessment of the Psoriatic Transcriptome in a Large Sample: Additional Regulated Genes and Comparisons with in Vitro Models," Journal of Investigative Dermatology, 2010, 130:1829-1840.

Haldar et al., "Mepolizumab and Exacerbations of Refractory Eosinophilic Asthma," The New England Journal of Medicine, 2009, 360:973-984.

Happel et al., "Divergent roles of IL-23 and IL-12 in host defense against Klebsiella pneumoniae" Journal of Experimental Medicine, Sep. 2005, 202(6):761-769.

Hegazi et al., "Carbon monoxide ameliorates chronic murine colitis through a heme oxygenase 1-dependent pathway," Journal of Experimental Medicine, Dec. 2005, vol. 202, No. 12, pp. 1703-1713.

Hegyi et al., "Vitamin D Analog Calcipotriol Suppresses the Th17 Cytokine-Induced Proinflammatory S100 'Alarmins' Psoriasin (S100A7) and Koebnerisin (S100A15) in Psoriasis," Journal of Investigative Dermatology, 2012, 132:1416-1424.

Hoeve et al., "IL-12 receptor deficiency revisited: IL-23-mediated signaling is also impaired in human genetic IL-12 receptor ?1deficiency," Eur. J. Immunol., 2003, 33:3393-3397.

Hu et al., "Information contributed by meta-analysis in exposure-response modeling: application to phase 2 does selection of guselkumab in patients with moderate-to-severe psoriasis," Journal of Pharmacokinet. Pharmacodyn., 2014, 41:239-250.

International Preliminary Report on Patentability and Written Opinion for PCT/US2015/041706 dated Feb. 2, 2017.

International Preliminary Report on Patentability for PCT/US2011/058869 dated May 7, 2013.

International Search Report & Written Opinion for PCT/US2011/058869, dated Feb 27, 2012.

International Search Report and Written Opinion dated Jul. 28, 2017, in PCT/US2017/027332.

International Search Report and Written Opinion dated Oct. 26, 2017 in PCT/US2016/027263.

International Search Report for PCT/US2013/038109 dated Apr. 25, 2013.

International Search Report for PCT/US2015/041706 dated Oct. 15, 2015.

International Search Report for PCT/US2016/016061 dated May 18, 2016.

International Search Report for PCT/US2016/027263 dated Jun. 29, 2016.

International Search Report for PCT/US2016/051844 dated Jan. 10, 2017.

Irvin et al., "Increased frequency of dual-positive TH2/TH17 cells in bronchoalveolar lavage fluid characterizes a population of patients with severe asthma," Journal of Allergy and Clinical Immunology, 2014, 134(5):1175-1186.

Kastelein et al., "Discovery and Biology of IL-23 and IL-27: Related but Functionally Distinct Regulators of Inflammation," Annual Reviews Immunology, 2007, 25: 221-242.

Kerdel et al., "An evolution in switching therapy for psoriasis patients who fail to meet treatment goals," Dermatologic Therapy, 2015, 28:390-403.

Kidoya et al., "Fas Ligand Induces Cell-Autonomous IL-23 Production in Dendritic Cells, a Mechanism for Fas Ligand-Induced IL-17 Production," Journal of Immunology, 2005, 8024-8031.

Kikly et al., "The IL-23/Th17 axis: Therapeutic targets for autoimmune inflammation," Current Opinion in Immunology, 2006, 18:670-675.

Kofoed et al "New Drugs and Treatment Targets in Psoriasis," Acta Derm. Venereol., 2015, 95:133-139.

Kopp et al., "Clinical improvement in psoriasis with specific targeting of interleukin-23," Nature, 2015, 521(7551):222-226.

Krishnan et al., "Development of Formulations for Therapeutic Monoclonal Antibodies and Fc Fusion Proteins," Formulation and Process Development Strategies for Manufacturing Biopharmaceuticals, 2010, Chapter 16, 383-427.

Kuwashima et al., "Delivery of Dendritic Cells Engineered to Secrete IFN-? into Central Nervous System Tumors Enhances the Efficacy of Peripheral Tumor Cell Vaccines: Dependence on Apoptotic Pathways," Journal of Immunology, 2005, 175: 2730-2740.

Langowski et al,. "IL-23 promotes tumour incidence and growth," Nature, Jul. 2006, 442(27):461-465.

Lee et al., "Increased Expression of Interleukin 23 p19 and p40 in Lesional Skin of Patients with Psoriasis Vulgaris," Journal of Experimental Medicine, 2004, 199(1):125-130.

Leonardi et al., "Efficacy and safety of ustekinumab, a human interleukin-12/23 monoclonal antibody, in patients with psoriasis: 76-weeks results form a randomised, double-blind, placebo-controlled trail (PHOENIX 1)," The Lancet, 2008, 371:1665-1674.

Li et al., "Silencing IL-23 expression by a small hairpin RNA protects against asthma in mice," Experimental and Molecular Medicine, 2011, 43(4):197-204.

Mallbris et al., "Neutrophil gelatinase-associated lipocalin is a marker for dysregulated keratinocyte differentiation in human skin" Experimental Dermatology, 2002, 11:584-591.

McInnes et al., "Efficacy and safety of secukinumab, a fully human anti-interleukin-17A monoclonal antibody, in patients with moderate-to-severe psoriatic arthritis: a 24-week, randomised, double-blind, placebo-controlled, phase II proof-of-concept trail," Ann. Rheum. Dis., 2014, 73:349-356.

McKinley et al., "TH17 Cells Mediate Steroid-Resistant Airway Inflammation and Airway Hyperresponsiveness in Mice," The Journal of Immunology, 2008, 181:4089-4097.

Morelli et al., "CD4+ T Cell Responses Elicted by Different Subsets of Human Skin Migratory Dendritic Cells," The Journal of Immunology, 2005, 175:7905-7915.

Naji et al., "T Helper 17 Cells and Related Cytokines after Allergen Inhalation Challenge in Allergic Asthmatics," International Archives of Allergy & Immunology, 2014, 165:27-34.

Nakajima et al., "Role of IL-23 and Th17 Cells in Airway Inflammation in Asthma," Immune Network, 2010, 10(1):1-4.

Narasimhan et al., "High-dose monoclonal antibodies via the subcutaneous route: challenges and technical solutions, an industry perspective," Therapeutic Delivery, 2012, 3(7):889-900.

Oppmann et al., Novel p19 Protein Engages IL-12p40 to Form a Cytokine, IL-23, with Biological Activities Similar as Well as Distinct from IL-12,$201D Immunity, 2000, 13:715-725.

Papp et al., "Tildrakizumab (MK-3222) an anti-interleukin-23p19 monoclonal antibody, improves psoriasis in a phase IIb randomized placebo-controlled trial," British Journal of Dermatology, 2015, 173:930-939.

Parham et al., "A Receptor for the Heterodimeric Cytokine IL-23 is Composed of IL-12Rβ1 and a Novel Cytokine Receptor Subunit, IL-23R," Journal of Immunology, 2002, 168:5699-5708.

Patel et al., "Emerging Therapies for the Treatment of Psoriasis" Dermatol Ther. (Heidelb), 2012, 2:16, 10 pages.

Pirhonen et al., "Regulation of Virus-Induced IL-12 and IL-23 Expression in Human Macrophages," Journal of Immunology, 2002, 5673-5678.

Piskin et al., "Clinical Improvement in chronic plaque-type psoriasis lesions after narrow-band UVB therapy is accompanied by a decrease in the expression of IFN-y inducers—IL-12, IL-18, and IL-23," Experimental Dermatology, 2004, 13:764-772.

(56) References Cited

OTHER PUBLICATIONS

Piskin, Gamze "IL-23 Expression by Keratinocytes," Effects of Therapies on Cytokine Patterns of Psoriasis, 2004, Chapter 7, 114-131.
R&D Systems New Products, Jun. 2005. 12 pgs. www.RnDSystems.com.
R&D Systems, de novo newsletter, Mar. 2004, 10 pgs. www.rndsystems.com.
Rouet et al., "Stability engineering of the human antibody repertoire," FEBS Letters, 2014, 588:269-277.
Savage et al. "Ustekinumab in the Treatment of Psoriasis and Psoriatic Arthritis," Rheumatol. Ther., 2015, 2:1-16.
Sehy et al., Abstract 560.34 "Unambiguous Detection of IL-23 (p19/p40) Protein in Native Samples Using a Novel Enzyme-Linked Immunosorbent Assay," Experimental Biology, 2005, A945-A946, International Congress of Physiological Sciences.
Shire, Steven J., Monoclonal Antibodies: Meeting the Challenges in Manufacturing, Formulation, Delivery and Stability of Final Drug Product, 2015.
Singh et al., "Selective targeting of the IL23 pathway: Generation and characterization of a novel high-affinity humanized anti-IL23A antibody," MABS, Apr. 23, 2015, 7(4):778-791.
Sofen et al., "Guselkumab (an IL-23-specific mAb) demonstrates clinical and molecular response in patients iwth moderate-to-severe psoriasis," Journal of Allergy and Clinical Immunology, 2014,133:1032-1040.
Suarez-Farinas et al., "Expanding the Psoriasis Disease Profile: Interrogation of the Skin and Serum of Patients with Moderate-to-Severe Psoriasis," Journal of Investigative Dermatology, 2012, 132:2552-2564.
Tang et al., "Interleukin-23: as a drug target for autoimmune inflammatory diseases," Immunology, 2011, 135:112-124.
Tian et al., "Meta-Analysis Derived (MAD) Transcriptome of Psoriasis Defines the "Core" Patheogenesis of Disease," PLOS One, 2012, 7(9):e44274, 15 pages.
U.S. Office Action on U.S. Appl. No. 13/870,061 dated Mar. 9, 2018.
U.S. Appl. No. 13/870,061, filed Apr. 25, 2013. First named inventor: Gerald Henry Nabozny.
U.S. Appl. No. 14/302,986, filed Jun. 12, 2014. First named inventor: Rachel Rebecca Barrett.
Verreck et al., "Human IL-23-producing type 1 macrophages promote but IL-10 producing type 2 macrophages subvert immunity to (myco)bacteria," PNAS, 2004, 101(13):4560-4565.
Wakashin et al., "IL-23 and Th17 Cells Enhance Th2-Cell-mediated Eosinophilic Airway Inflammation in Mice" American Journal of Respiratory and Critical Care Medicine, 2008, 178:1023-1032.
Wang et al,. "Antibody Structure, Instability, and Formulation," Journal of Pharmaceutical Sciences, Jan. 1, 2007, 96(1):1-26.
Wang et al., Aggregation of Therapeutic Proteins, 2010.
Wang, Wei, "Review: Instability, stabilization, and formulation of liquid protein pharmaceuticals," International Journal of Pharmaceutics, 1999, 185:129-188.
Wenzel, Sally, "Severe asthma: from characteristics to phenotypes to endotypes," Clinical & Experimental Allergy, 2012, 42:650-658.
Woodle et al., "Phase I Trial of a Humanized, Fc Receptor Non-binding OKT3 Antibody, huOKT3γ1(Ala-Ala) In the Treatment of Acute Renal Allograft Rejection," Transplantation, 1999, 68(5):608-616.
Written Opinion dated Aug. 17, 2017, in PCT/US2016/016061.
Yannam et al., "IL-23 in Infections, Inflammation, Autoimmunity and Cancer: Possible Role in HIV-1 and AIDS," Journal of Neuroimmune Pharmacology, 2012, 7:95-112.
Yeilding et al., "Development of the IL-12/23 antagonist ustekinumab in psoriasis: past, present and future perspectives," Annals of the New York Academy of Sciences, 2011, 1222:30-39.
Zakharova et al., "Paradoxical Anti-Inflammatory Actions of TNF-a: Inhibition of IL-12 and IL-23 via TNF Receptor 1 in Macrophages and Dendritic Cells" Journal of Immunology, 2005, 175:5024-5033.

Bandzar et al., "Crohn's disease: A review of treatment options and current research," Cellular Immunology, 2013, 286:45-52.
ClinicalTrials.gov study NCT02031276, published Jan. 8, 2014, 7 pages.
Ferrara et al., "Recombinant renewable polyclonal antibodies," mABs, 2015, 7(1):32-41.
International Preliminary Report on Patentability and Written Opinion dated Oct. 16, 2018, in PCT/US2017/027332.
Jabbari et al., "Transcriptional Profiling of Psoriasis Using RNA-seq Reveals Previously Unidentified Differentially Expressed Genes," Journal of Investigative Dermatology, 2012 (online Aug. 2011), 132:246-249.
Sands et al., "A randomized, double-blind placebo-controlled phase 2a induction study of MEDI2070 (anti-p19 antibody) in patients with active Crohn's disease who have failed anti-TNF antibody therapy," Journal of Crohn's and Colitis, Feb. 1, 2015, 9(Supp_1):S15-S16, OP025.
Wikipedia entry for "Guselkumab," 5 pages, downloaded May 29, 2018.
BioPorto Product Catalog, 2010, 28 pps.
Boehringer Ingelheim, BI 655066 Dose Ranging in Psoriasis, Active Comparator Ustekinumab. Available from: https://clinicaltrials.gov/ct2/show/NCT02054481. NLM identifier. NCT 02054481. First posted Feb. 4, 2014.
Chiricozzi, A. et al., Role of IL-23 in the pathogenesis of psoriasis: a novel potential therapeutic target?, Expert Opinion Ther. Targets, vol. 18, pp. 1-13, 2014.
CircuLex Main Products Catalog, 3 pps., 2010.
Karon, A, I L-23 inhibitor topped ustenkinumab against psoriasis. M Dedge™ Rheumatology. Retrieved from www.mdedge.com/rheumatology, 3 pps. dated Apr. 2, 2015.
Usui, T., The relationship between oral mucosal immunity and activity of dental caries after prolonged strenuous exercise, Descente Sports Science, vol. 35, pp. 37-43, 2014.
Carr, T.F et al., Eosinophilic and Noneosinophilic Asthma, Am J. Respir Cirt. Care Med., vol. 197, Issue 1, pp. 22-37. (Year: 2018).
Khatri, S.B et al., Paradigms in the identification and treatment of severe persistent asthma in adults, Medscape Education Pulmonary Medicine, pp. 1-17, (Year: 2012).
Krueger et al., "Anti-IL-23A mAb BI 655066 for treatment of moderate-to-severe psoriasis: Safety, efficacy, pharmacokinetics, and biomarker results of a single-rising-dose, randomized, double-blind, placebo-controlled trial," Journal of Allergy and Clinical Immunology, Jul. 2015, 136: 116-124.
Manning, M.C et al., Stability of Protein Pharmaceuticals: An Update, Pharmaceutical Research, vol. 27, No. 4, Apr. 2010.
Chang et al., "Practical Approaches to Protein Formulation Development," Rational Design of Stable Protein Formulations - Theory and Practice (Carpenter et al., eds.,), Kluwer Academic/Plenum Publishers, New York, 2002, 1-25.
Bankhead et al., "Novel IL-23 Inhibitor Shows Promise in Psoriases - Interleukin-23 inhibitor has 'high efficacy, quiet safety signal'," Medpage Today, Mar. 22, 2015.
Bjorkesten, Clas-Goran af, "Monitoring treatment response in Crohn's disease," Dissertation, Helsinki, Finland, Feb. 28, 2014, 88 pages.
European Search Report dated Jun. 5, 2020 in EP 19208511.6.
Krueger et al., "IL-17A is essential for cell activation and inflammatory gene circuits in subjects with psoriasis," J. Allergy Clin. Immunol., 2012, 130:145-154.
Mortezavi et al., "IL12/IL23 Inhibition in the Treatment of Psoriatic Arthritis," Curr. Treat. Options in Rheum., 2015, 1:197-209.
Partial European Search Report dated Aug. 16, 2019 in EP 19176173.3.
Tonel et al., "Cutting Edge: A Critical Functional Role for IL-23 in Psoriasis," The Journal of Immunology, 2010, 185:5688-5691.
"A Phase III, Multicenter Study of the Efficacy and Safety of Adalimumab Treatment in Subjects With Moderate to Severe Chronic Plaque Psoriasis," Adis Insight Trial Profile, Abbott GmbH & Co. KG, latest information update Jul. 26, 2022, 10 pages.
"A Randomised, Double-Blind, Placebo-controlled, Proof-of-concept, Dose-ranging Study of BI 655066/ABBV-066/Risankizumab in Patients With Active Psoriatic Arthritis," Adis

(56) References Cited

OTHER PUBLICATIONS

Insight Trial Profile, AbbVie; Boehringer Ingelheim, latest information update Nov. 6, 2021, 10 pages.
"An Open Label, Single Group, Long Term Safety Extension Trial of Bi 655066/ABBV-066 (Risankizumab) in Patients With Moderately to Severely Active Crohn's Disease," Adis Insight Trial Profile, AbbVie; Boehringer Ingelheim, latest information update Sep. 17, 2021, 13 pages.
"BI 655066 Versus Ustekinumab and Placebo Comparators in a Randomized Double Blind trial for Maintenance Use in Moderate to Severe Plaque Type Psoriasis-2 (UltIMMa-2)," Adis Insight Trial Profile, AbbVie; Boehringer Ingelheim, latest information update Nov. 23, 2022, 18 pages.
"Bi 655066/ABBV-066 (Risankizumab) Versus Adalimumab in a Randomized, Double Blind, Parallel Group Trial in Moderate to Severe Plaque Psoriasis to Assess Safety and Efficacy After 16 Weeks of Treatment and After Inadequate Adalimumab Treatment response (IMMvent)," Adis Insight Trial Profile, AbbVie; Boehringer Ingelheim Pharma KG, latest information update Nov. 23, 2022, 15 pages.
"Bi 655066/ABBV-066 (Risankizumab) Versus Placebo In a Multicenter Randomized Double-blind Study in Patients With Moderate to Severe Chronic Plaque Psoriasis Evaluating the Efficacy and Safety With Randomized Withdrawal and Re-treatment (IMMhance)," Adis Insight Trial Profile, AbbVie; Boehringer Ingelheim; Boehringer Ingelheim Pharma KG, latest information update Dec. 29, 2021, 14 pages.
"Bi 655066/ABBV-066 (risankizumab) Versus Ustekinumab and placebo comparators in a randomized double blind trial for Maintenance use in Moderate to severe plaque type psoriasis (UltIMMa-1)," Adis Insight Trial Profile, AbbVie; Boehringer Ingelheim, latest information update Nov. 23, 2022, 18 pages.
"Boehringer Ingelheim Reports Results of Phase II Head-to-Head Psoriasis Study of BI 655066," Close-Up Media, Inc., Oct. 15, 2015, 1 page.
"Boehringer Ingelheim Updates on Phase II Psoriasis Study of BI 655066," Close-Up Media, Inc., Mar. 25, 2015, 1 page.
"Boehringer Ingelheim's Investigational Biologic Cleared Skin Better than Ustekinumab in Head-to- Head Phase II Psoriasis Study," Mar. 20, 2015, 14 pages.
"Efficacy and Safety of Bi 655066/ABBV-066 (Risankizumab) in Patients With Severe Persistent Asthma," ClinicalTrials.gov, last update posted Apr. 10, 2019, 20 pages.
"Phase lla, Randomized, Double-blind, Placebo Controlled, Parallel Group Study to Assess the Safety and Efficacy of Subcutaneously Administered Bi 655066/ABBV-066 (Risankizumab) as add-on Therapy Over 24 Weeks in Patients With Severe Persistent Asthma," Adis Insight Trial Profile, AbbVie; Boehringer Ingelheim, latest information update Nov. 8, 2021, 11 pages.
"Safety, Tolerability, and Pharmacokinetics of Single Rising s.c. (Stage 1) and i.v. (Stage 2) Doses of Bi 655066/ABBV-066 (Risankizumab) in Healthy Asian and Caucasian Male Volunteers (Double-blind, Randomized, Placebo-controlled Within Dose Groups)," Adis Insight Trial Profile, AbbVie; Boehringer Ingelheim, latest information update Jan. 16, 2020, 7 pages.
Ciprandi et al., "Serum IL-23 in Asthmatic Children," Journal of Biological Regulators & Homeostatic Agents, 2012, 26(1(S)):53-61.
Feagan et al., "Efficacy and Safety of Induction Therapy With the Selective IL-23 Inhibitor BI 655066, in Patients With Moderate-to-Severe Crohn's Disease: Results of a Randomized, Double-Blind, Placebo- Controlled Phase II Study," Gastroenterology, Apr. 2016, 150(4: Suppl. 1), S-1266.
Gras, J., "Guselkumab," Drugs of the Future, 2017, 42(2):81-86.
INN risankizumab, WHO Drug Information, Jul. 10, 2015, 29(2): 195, 196, 254 and 255.
Lalovic et al., "PK-PD Analysis of PASI with Data at Boundary: BI 655066 an Anti-IL-23 mAb for the Treatment of Psoriasis," Journal of Pharmacokinetics and Pharmacodynamics, Oct. 2015, 42(1:Suppl. 1), S64. Abstract No. T-49, 1 page.

Noda et al., "The translational revolution and use of biologics in patients with inflammatory skin diseases," J. Allergy Clin. Immunol., 2015, 135:324-336.
Osmola-Mankowska, Angieszka, "Generalised pustular psoriasis - a case report and review of therapeutic approaches," Przegl. Dermatol., 2014, 6(101):473-476.
Ota et al., "Phase 3 study of guselkumab, a human mAb directed against the p19 subunit of IL23, in Japanese subjects with generalized pustular psoriasis and erythrodermic psoriasis," J. Am. Acad. Dermatol., Jun. 2017, 76(6):AB196, abstract 4526.
Papp et al., "Efficacy and Safety of Different Dose Regimens of a Selective IL-23p19 Inhibitor (BI 655066) Compared with Ustekinumab in Patients with Moderate-to-Severe Plaque Psoriasis with and without Psoriatic Arthritis," ACR Concurrent Abstract Session, Nov. 9, 2015 (first publication Sep. 29, 2015), 2 pages.
Papp, Kim A., "Superior Onset and Duration of BI-655066 Compared to Ustekinumab," European Academy of Dermatology and Venereology (EADV) 24th Annual Congress, Oct. 7-11, 2015, 767-769.
Rasch et al., "24th European Academy of Dermatology and Venereology," Immunotherapy, Mar. 14, 2016, 8(4):395-397.
Strober, B., "Interleukin-23 inhibition for the treatment of psoriasis: the next frontier for high-efficacy biologic therapy," British Journal of Dermatology, 2015, 173:886-895.
Supplementary European Search Report dated Jun. 2, 2022 in EP 21191271.2.
Visvanathan et al., "IL-23 pathway inhibition by risankizumab differentially modulates the molecular and histopathological profile in psoriatic skin compared with ustekinumab," Experimental Dermatology, 2016, 25(Suppl. 4):3-51, Abstract P061.
Al-Lazikani et al., "Standard conformations for the canonical structures of immunoglobulins," J. Mol. Biol., 1997, 273:927-948.
Altschul et al., "Basic Local Alignment Search Tool," J. Mol. Biol., (1990), 215:403-410.
Altschul et al., "Gapped BLAST and PSI-BLAST: a new generation of protein database search programs," Nucleic Acids Res., (1997), 25:3389-3402.
Barnes et al., "Methods for Growth of Cultured Cells in Serum-Free Medium," Anal. Biochem., 1980, 102, 255-270.
Brennan et al., "Preparation of bispecific antibodies by chemical recombination of monoclonal immunoglobulin G1 fragments," Science, 1985, 229:81-83.
Buchwald et al., "Long-term, continuous intravenous heparin administration by an implantable infusion pump in ambulatory patients with recurrent venous thrombosis," Surgery, Oct. 1980, 88:507-516.
Caron et al., "Engineered humanized dimeric forms of lgG are more effective antibodies," J. Exp. Med., Oct. 1992, 176:1191-1195.
Carter et al., "High level Escherichia coli expression and production of a bivalent humanized antibody fragment," Bio/Technology, Feb. 1992, 10:163-167.
Chothia et al., "Canonical Structures for the Hypervariable Regions of Immunoglobulins," J. Mol. Biol., 1987, 196:901-917.
Chothia et al., "Domain Association in Immunoglobulin Molecules - The Packing of Variable Domains," J. Mol. Biol., 1985, 186:651-663.
Clackson et al., "Making antibody fragments using phage display libraries," Nature, 1991, 352:624-628.
Cunningham et al., "High-resolution epitope mapping of hGH-receptor interactions by alanine- scanning mutagenesis," Science, Jun. 2, 1989, 244:1081-1085.
During et al., "Controlled release of dopamine from a polymeric brain implant: in vivo characterization," Ann. Neurol., Apr. 1989, 25(4): 351-356.
Edge et al., "Deglycosylation of glycoproteins by trifluoromethanesulfonic acid," Anal. Biochem., 1981, 118:131-137.
Edwards et al., "The remarkable flexibility of the human antibody repertoire; isolation of over one thousand different antibodies to a single protein, BLyS", Journal of Molecular Biology, Sep. 24, 2003, 334(1):103-118.
Epstein et al., "Biological activity of liposome-encapsulated murine interferon gamma is mediated by a cell membrane receptor," Proc. Natl. Acad. Sci. USA, Jun. 1985, 82:3688-3692.

(56) References Cited

OTHER PUBLICATIONS

Evan et al., "Isolation of monoclonal antibodies specific for human c-myc proto-oncogene product," Molecular and Cellular Biology, Dec. 1985, 5(12):3610-3616.
Field et al., "Purification of RAS-Responsive Adenylyl Cyclase Complex from Saccharaomyces cerevisiae by Use of an Epitope Addition Method," Mol. Cell. Biol., May 1988, 8(5):2159-2165.
Fleer et al., "Stable multicopy vectors for high-level secretion of recombinant human serum albumin by Kluyveromyces yeasts," Bio/Technology, Oct. 1991, 9:968-975.
Gabizon et al., "Pharmacokinetics and Tissue Distribution of Doxorubicin Encapsulated in Stable Liposomes with Long Circulation Times," J. National Cancer Inst., 1989, 81(19): 1484-1488.
Goel et al., "Plasticity within the Antigen-Combining Site May Manifest as Molecular Mimicry in the Humoral Immune Response," The Journal of Immunology, Dec. 15, 2004, 173(12):7358-7367.
Graham et al., "Characteristics of a human cell line transformed by DNA from human adenovirus type 5," J. Gen. Virol., 1977, 36:59-74.
Guss et al., "Structure of the IgG-binding regions of streptococcal protein G,"Embo J., 1986, 5:1567- 1575.
Hakimuddin et al., "A chemical method for the deglycosylation of proteins," Arch. Biochem. Biophys., Nov. 15, 1987, 259, 52-57.
Ham et al., "Media and growth requirements," Meth. Enz., 1979, 58, 44-93.
Hezareh et al., "Effector Function Activities of a Panel of Mutants of a Broadly Neutralizing Antibody against Human Immunodeficiency Virus Type 1," Journal of Virology, Dec. 2001, 75(24): 12161- 12168.
Higgins et al., "Using CLUSTAL for Multiple Sequence Alignments," Methods Enzymol., 1996, 266:383-402.
Holliger et al., "Diabodies': Small bivalent and bispecific antibody fragments," Proc. Natl. Acad. Sci. USA, Jul. 1993, 90:6444-6448.
Howard et al., "Intracerebral drug delivery in rats with lesion-induced memory deficits," J. Neurosurg., Jul. 1989, 71(1): 105-112.
Hwang et al., "Hepatic uptake and degradation of unilamellar sphingomyelin/cholesterol liposomes: a kinetic study," Proc. Natl. Acad. Sci. USA, Jul. 1980, 77:4030-4034.
Janeway et al., Immunobiology, 3rd edition, 1997, Garland Publishing Inc., pp. 3:1-3:11.
Jones, Elizabeth W., "Proteinase Mutants of Saccharomyces Cerevisiae," Genetics, Jan. 1977, 85:23-33.
Kabat et al., Sequences of Proteins of Immunological Interest, 1991, NIH Publ., I, 5th Ed., No. 91, 3242:647-669.
Kanyavuz et al., "Breaking the law: unconventional strategies for antibody diversification," Nature Reviews: Immunology, Jun. 2019, 19:355-368.
Karlin et al., "Applications and statistics for multiple high-scoring segments in molecular sequences," Proc. Natl. Acad. Sci. USA, Jun. 1993, 90, 5873-5877.
Karlin et al., "Methods for assessing the statistical significance of molecular sequence features by using general scoring schemes," Proc. Natl. Acad. Sci. USA, Mar. 1990, 87:2264-2268.
Kastelein et al., "Discovery and Biology of IL-23 and IL-27: Related but Functionally Distinct Regulators of Inflammation," Annu. Rev. Immunol., 2007, 25:221-242.
Koehler et al., "Continuous cultures of fused cells secreting antibody of predefined specificity," Nature, Aug. 7, 1975, 256:495-497.
Langer et al., "Chemical and Physical Structure of Polymers as Carriers for Controlled Release of Bioactive Agents: A Review," Macromol. Sci. Rev. Macromol. Chem., 1983, 23, 61-126.
Langer, Robert, "New methods of drug delivery," Science, Sep. 28, 1990, 249: 1527-1533.
Levy et al., "Inhibition of calcification of bioprosthetic heart valves by local controlled-release diphosphonate," Science, Apr. 12, 1985, 228, 190-192.
Lindmark et al., "Binding of immunoglobulins to protein A and immunoglobulin levels in mammalian sera," J. Immunol. Meth., 1983, 62:1-13.
Lloyd et al., "Modelling the human immune response: performance of a 10" human antibody repertoire against a broad panel of therapeutically relevant antigens, Protein Engineering, Design & Selection, Mar. 2009 (online Oct. 29, 2008), 22(3): 159-168.
Marks et al., "By-passing Immunization: Human Antibodies from V-gene Libraries Displayed on Phage," J. Mol. Biol., 1991, 222:581-597.
Martin et al., "Irreversible coupling of immunoglobulin fragments to preformed vesicles. An improved method for liposome targeting," J. Biol. Chem., Jan. 10, 1982, 257:286-288.
Mather et al., "Culture of testicular cells in hormone-supplemented serum-free medium," Annals N.Y. Acad. Sci., 1982, 383:44-68.
Mather, Jennie P., "Establishment and characterization of two distinct mouse testicular epithelial cell lines," Biol. Reprod., 1980, 23:243-251.
Morimoto et al., "Single-step purification of F(ab')2 fragments of mouse monoclonal antibodies (immunoglobulins G1) by hydrophobic interaction high performance liquid chromatography using TSKgel Phenyl-5PW," Journal of Biochemical and Biophysical Methods, 1992, 24:107-117.
Morrison et al., "Chimeric human antibody molecules: Mouse antigen-binding domains with human constant region domains"; Proc. Natl. Acad. Sci. USA Nov. 1984, 81:6851-6855.
Neuberger et al., "Recombinant antibodies possessing novel effector functions"; Nature, Dec. 13, 1984, 312:604-608.
O'Sullivan et al., "Methods for the Preparation of Enzyme-Antibody Conjugates for use in Enzyme Immunoassay," Methods in Enzymology, 1981, 73:147-166.
Paborsky et al., "Mammalian cell transient expression of tissue factor for the production of antigen," Protein Engineering, 1990, 3(6):547-553.
Parham et al., "A Receptor for the Heterodimeric Cytokine IL-23 Is Composed of IL-12RB1 and a Novel Cytokine Receptor Subunit, IL-23R1," The Journal of Immunology, 2002, 168 :5699-5708.
Pearson et al., "Improved tools for biological sequence comparison," Proc. Natl. Acad. Sci. USA, Apr. 1988, 85:2444-2448.
Plueckthun, A., "Antibodies from *Escherichia coli*," Chapter 11 In The Pharmacology of monoclonal Antibodies, Rosenburg and Moore eds., Springer-Verlag, New York, 1994, 113:269-315.
Reyes et al., "Expression of human ß-interferon cDNA under the control of a thymidine kinase promoter from herpes simplex virus," Nature, Jun. 17, 1982, 297:598-601.
Rudikoff et al., "Single amino acid substitution altering antigen-binding specificity," PNAS, Mar. 1982, 79(6): 1979-1983.
Saudek et al., "A preliminary trial of the programmable implantable medication system for insulin delivery," N. Engl. J. Med., Aug. 31, 1989, 321, 574-579.
Sefton, Michael V., "Implantable Pumps," CRC Crit. Ref. Biomed. Eng., 1989, 14(3): 201-240.
Shopes, B., "A genetically engineered human IgG mutant with enhanced cytolytic activity," J. Immunol., 1992, 148:2918-2922.
Stevenson et al., "A chimeric antibody with dual Fc regions (bisFabFc) prepared by manipulations at the IgG hinge," Anti-Cancer Drug Design, 1989, 3:219-230.
Stinchcomb et al., "Isolation and characterisation of a yeast chromosomal replicator," Nature, Nov. 1, 1979, 282:39-43.
Thotakura et al., " Enzymatic deglycosylation of glycoproteins," Meth, Enzymol, 1987, 138:350-359.
Torelli et al., "Advance and Adam: two algorithms for the analysis of global similarity between homologous informational sequences," Comput. Appl. Biosci., 1994, 10(1): 3-6.
Urlaub et al., "Isolation of Chinese hamster cell mutants deficient in dihydrofolate reductase activity," Proc. Natl. Acad. Sci. USA, Jul. 1980, 77, 4216-4220.
Van den Berg et al., "Kluyveromyces as a Host for Heterologous Gene Expression: Expression and Secretion of Prochymosin," Bio/Technology, Feb. 1990, 8:135-139.
Vitetta et al., "Redesigning nature's poisons to create anti-tumor reagents," Science, Nov. 20, 1987, 238:1098-1104.
Wolff et al., "Monoclonal Antibody Homodimers: Enhanced Anti-tumor Activity in Nude Mice," Cancer Research, Jun. 1, 1993, 53:2560-2565.

(56) References Cited

OTHER PUBLICATIONS

Yaniv, Moshe, "Enhancing elements for activation of eukaryotic promoters," Nature, May 6, 1982, 297:17-18.
Zapata et al., "Engineering linear F(ab')2 fragments for efficient production in Escherichia coli and enhanced antiproliferative activity," Protein Engineering, 1995, 8(10): 1057-1062.
Zola, Heddy, "Using Monoclonal Antibodies: Soluble Antigens," Chapter 6 in Monoclonal Antibodies: A Manual of Techniques, 1987, CRC Press, 147-181.
"Internal Medicine-Crohn's Disease and Chronic Ulcerative Colon," https://doctor.get.com.tw/ m/Journal/detail.aspx?no=402782, with English machine translation, accessed May 30, 2022, 3 pages.
Abdo et al. "Interleukin 23 and autoimmune diseases: current and possible future therapies," Inflammation Research, May 2020, 69(5): 463-480.
Bachelez, Herve, M.D., PhD., "Pustular variants of psoriasis: an update," BI 655066 Psoriasis Advisory Board Meeting, New York, 4/Sep. 2015 - ; 2015, 104 pages.
D'Haens et al., Risankizumab as induction therapy for Crohn's disease: results from the phase 3 Advance and Motivate induction trials,' Lancet, 2022, 399:2015-2030.
Feagan et al., "Efficacy and safety of induction therapy with the selective IL-23 inhibitor risankizumab (BI 655066) in patients with moderate-to-severe Crohn's disease: results of a randomized, double-blind, placebo-controlled phase II study," Digestive Disease Week (DDW) 2016, San Diego, May 21-24, 2016/May 2016; 2016, 23 pages.
Feagan et al., "Efficacy and safety of re-induction treatment with the selective IL-23 inhibitor risankizumab in patients with moderate-to-severe Crohn's disease," 24th United Eur Gastroenterology Week (UEGW), Vienna, Oct. 15-19, 2016/Oct. 2016; 2016, 14 pages.
Feagan et al., "Efficacy and safety of re-induction treatment with the selective IL-23 inhibitor risankizumab in patients with moderate-to-severe Crohn's disease," 24th United Eur Gastroenterology Week (UEGW), Vienna, Oct. 15-19, 2016/Oct. 2016; United Eur Gastroenterol J; 2016; 4(6); Abstr LB17; 806-807.
Lalovic et al., "PK-PD analysis of PASI with data at boundary: BI 655066, an anti-IL-23A mAb for the treatment of psoriasis," AcoP6, 6th American Conf on Pharmacometrics of the International Society of Pharmacometrics (IsoP), Crystal City, Oct. 4-7, 2015-Oct. 2015; 2015, 5 pages.
Leonardi, Craig L., M.D., "Antibodies in the treatment of psoriasis: IL-12/23 p40 and IL-17a," Semin Cutan Med Surg; 2016; 35(Suppl 4); S74-S77.
Louis et al., "Risankizumab Induction Therapy in Patients With Moderately to Severely Active Ulcerative Colitis: Efficacy and Safety in the Randomized Phase 3 Inspire Study," United European Gastroenterology Week, Oct. 14-17, 2023, Copenhagen, Denmark, 16 pages.
Maas et al., "PK-PD of Crohn's disease activity index after treatment with risankizumab, an IL-23 inhibitor," ACoP7, 7th American Conf on Pharmacometrics of the International Society of Pharmacometrics (ISoP), Bellevue, Oct. 23-26, 2016/Oct. 2016; 2016, 5 pages.
Nasti et al., "IL-23 Inhibits Melanoma Development by Augmenting DNA Repair and Modulating T-cell Subpopulations," J. Immunol., Jan. 15, 2017, 198(2):950-961.
Ngiow et al., "A balance of interleukin-12 and -23 in cancer," Trends in Immunology, Nov. 2013, 34(11):548-555.
Papp et al., "Clinical response following re-treatment with a selective IL-23p19 inhibitor risankizumab (BI 655066) or switching from ustekinumab to risankizumab in patients with moderate-to-severe chronic plaque psoriasis," 25th Cong of the European Academy of Dermatology and Venereology, Vienna, Sep. 2-28, 2016/Oct. 2016; 2016, 32 pages.
Papp et al., "Comparison of a selective IL-23p19 inhibitor (BI 655066) with ustekinumab in patients with moderate-to-severe plaque psoriasis: analysis of scalp, palmoplantar, and nail psoriasis subgroups," 74th Ann Mtg of the American Academy of Dermatology, Washington, Mar. 4-8, 2016/Mar. 2016; 2016, 11 pages.
Papp et al., "Comparison of a selective IL-23p19 inhibitor (BI 655066) with ustekinumab in patients with moderate-to-severe plaque psoriasis: analysis of scalp, palmoplantar, and nail psoriasis subgroups," 74th Ann Mtg of the American Academy of Dermatology, Washington, Mar. 4-8, 2016/Mar. 2016; J Am Acad Dermatol; 2016; 74(5)(Suppl 1); Abstr 3433; AB240, 1 page.
Papp et al., "Efficacy and safety of different dose regimens of a novel selective IL-23p19 inhibitor (BI 655066) compared with ustekinumab in patients with moderate-to-severe plaque psoriasis," 73rd Ann Mtg of the American Academy of Dermatology, San Francisco, Mar. 21-24, 2015/Mar. 2015; 2015, 59 pages.
Papp et al., "Efficacy and safety of different dose regimens of a selective IL-23p19 inhibitor (BI 655066) compared with ustekinumab in patients with moderate-to-severe plaque psoriasis with and without psoriatic arthritis," ACR/ARHP Sci Mtg 2015, 79th Ann Mtg of the American College of Rheumatology and 50th Ann Mtg of the Association of Rheumatology Health Professionals, San Francisco, Nov. 6-11, 2015/Nov. 2015; 2015, 22 pages.
Papp et al., "Onset and duration of clinical response following treatment with a selective IL-23p19 inhibitor (BI 655066) compared with ustekinumab in patients with moderate-to-severe chronic plaque psoriasis," 24th Cong of the European Academy of Dermatology and Venereology (EADV), Copenhagen, Oct. 7-11, 2015/Oct. 2015; 2015, 34 pages.
Papp et al., "Selective blockade of IL-23p19 with BI 655066 is associated with clinical responses superior to ustekinumab in patients with moderate-to-severe plaque psoriasis: results from a 48-week phase II study," 74th Ann Mtg of the American Academy of Dermatology, Washington, Mar. 4-8, 2016/Mar. 2016; 2016, 11 pages.
Papp et al., "Selective blockade of IL-23p19 with BI 655066 is associated with clinical responses superior to ustekinumab in patients with moderate-to-severe plaque psoriasis: results from a 48-week phase II study," 74th Ann Mtg of the American Academy of Dermatology (AAD), Washington, Mar. 4-8, 2016/Mar. 2016; J Am Acad Dermatol; 2016; 74(5)(Suppl 1); Abstr 3362; AB274, 1 page.
Papp et al., "Selective blockade of IL-23p19 with BI 655066 is associated with significant improvement in QoL outcomes compared with ustekinumab in patients with moderate-to-severe plaque psoriasis," 74th Ann Mtg of the American Academy of Dermatology (AAD), Washington, Mar. 4-8, 2016/Mar. 2016; J Am Acad Dermatol; 2016; 74(5)(Suppl 1); Abstr 2787; AB275, 1 page.
Siebert et al., "Why did IL-23p19 inhibition fail in AS: a tale of tissues, trials or translation?", Ann. Rheum. Dis., Aug. 2019, 78(8): 1015-1018.
Visvanathan et al., "IL-23 pathway inhibition by risankizumab differentially modulates the molecular and histopathological profile in psoriatic skin compared with ustekinumab," 25th Cong of the European Academy of Dermatology and Venereology, Vienna, Sep. 2-28, 2016/Oct. 2016; 2016, 12 pages.
Visvanathan et al., "Selective IL-23 inhibition by risankizumab modulates the molecular profile in the colon of active Crohn's disease patients," 24th United Eur Gastroenterology Week, Vienna, Oct. 15-19, 2016/Oct. 2016; 2016, 11 pages.
Baylot et al., "TCTP Has a Crucial Role in the Different Stages of Prostate Cancer Malignant 4 Progression 5," Results and Problems in Cell Differentiation, 2017, 64:255-261.
Botkin et al., "Targeted therapy for psoriatic disease," Russian Journal of Clinical Dermatology and Venereology, 2017, 17(4):18-29, with English machine translation.
Gooderham et al., "Shifting the focus—the primary role IL-23 in psoriasis and other inflammatory disorders," J. Eur. Acad. Dermatol. Venereol., 2018, 32(7):1111-1119.
Ishikawa et al., "Influence of pH on heat-induced aggregation and degradation of therapeutic monoclonal antibodies," Biol. Pharm. Bull., 2010, 33(8): 1413-1417.
Jorgensen et al., "Recent trends in stabilising peptides and proteins in pharmaceutical formulation—considerations in the choice of excipients," Expert Opin. Drug Deliv., 2009, 6(11): 1219-1230.
Wang et al., "Instability, stabilization, and formulation of liquid protein pharmaceuticals," International Journal of Pharmaceutics, 1999, 185(2): 129-188.

(56) References Cited

OTHER PUBLICATIONS

Bordwell, Frederick G., "Equilibrium Acidities in Dimethyl Sulfoxide Solution," Acc. Chem. Res., 1988, 21:456-463.

Carron, et al., "Peripheral manifestations in spondyloarthritis: relevance for diagnosis, classification and follow-up," Curr. Opin. Rheumatol., 2012, 24:370-374.

Dauden et al., "Ustekinumab: effective in a patient with severe recalcitrant generalized pustular psoriasis," British Journal of Dermatology, Dec. 2010, 163(6): 1346-1347.

Huang, et al., "The DAVID Gene Functional Classification Tool: a novel biological module-centric algorithm to functionally analyze large gene lists," Genome Biology 2007, 8:R183 (16 pages).

Iezzi, et al., "CD40-CD40L cross-talk integrates strong antigenic signals and microbial stimuli to induce development of IL-17-producing CD4 T cells," Proc Natl Acad Sci U S A., 2009 106:876-81.

Kang et al., "Rapid Formulation Development for Monoclonal Antibodies," BioProcess International, Apr. 2016, 14(4):40-45.

Marrakchi et al., "Pathophysiology of Generalized Pustular Psoriasis," American Journal of Clinical Dermatology, Jan. 21, 2022, 23(Suppl. 1):S13-S19.

Massey, R.J., "Catalytic antibodies catching on," Nature 1987, 328:457-458.

Myers, et al., "Approximate matching of regular expressions," Bulletin of mathematical biology vol. 51, 1, (1989): 5-37.

Stella, et al., (1985). "Prodrugs: A Chemical Approach to Targeted Drug Delivery." In: Borchardt, et al., (eds.) Directed Drug Delivery. Experimental Biology and Medicine, vol. 7. Humana Press. https://doi.org/10.1007/978-1-4612-5186-6_14 (Abstract only).

Wilman, (1986), "Prodrugs in Cancer Chemotherapy," In Biochemical Society Transactions, 14, pp. 375-382, 615th Meeting Belfast (Preview Only).

Yao et al., "Inhibition of the interleukin-23/interleukin-17 pathway by anti-interleukin-23p19 monoclonal antibody attenuates 2,4,6-trinitrobenzene sulfonic acid-induced Crohn’s disease in rats," Molecular Medicine Reports, 2014, 10:2105-2110.

Haugh et al., "Risankizumab: an anti-IL-23 antibody for the treatment of psoriasis," Drug Design, Development and Therapy, 2018, 12:3879-3883.

Langley et al., "The 5-point Investigator's Global Assessment (IGA) Scale: A modified tool for evaluating plaque psoriasis severity in clinical trials," Journal of Dermatological Treatment, 2015, 26(1):23-31.

Pubchem, Bethesda (MD): National Library of Medicine (US), National Center for Biotechnology Information, Oct. 12, 2023, PubChem Compound Summary for Risankizumab, PubChem Reference Collection SID 483926270, Registry No. 1612838-76-2, https://pubchem.ncbi.nlm.nih.gov/compound/Risankizumab, 14 pages.

* cited by examiner

SEQUENCE LISTING

```
<160> NUMBER OF SEQ ID NOS: 22

<210> SEQ ID NO 1
<211> LENGTH: 11
<212> TYPE: PRT
<213> ORGANISM: Mus sp.

<400> SEQUENCE: 1

Lys Ala Ser Arg Asp Val Ala Ile Ala Val Ala
1               5                   10

<210> SEQ ID NO 2
<211> LENGTH: 7
<212> TYPE: PRT
<213> ORGANISM: Mus sp.

<400> SEQUENCE: 2

Trp Ala Ser Thr Arg His Thr
1               5

<210> SEQ ID NO 3
<211> LENGTH: 9
<212> TYPE: PRT
<213> ORGANISM: Mus sp.

<400> SEQUENCE: 3

His Gln Tyr Ser Ser Tyr Pro Phe Thr
1               5

<210> SEQ ID NO 4
<211> LENGTH: 10
<212> TYPE: PRT
<213> ORGANISM: Mus sp.
```

```
<400> SEQUENCE: 4

Gly Asn Thr Phe Thr Asp Gln Thr Ile His
1               5                   10

<210> SEQ ID NO 5
<211> LENGTH: 17
<212> TYPE: PRT
<213> ORGANISM: Mus sp.

<400> SEQUENCE: 5

Tyr Ile Tyr Pro Arg Asp Asp Ser Pro Lys Tyr Asn Glu Asn Phe Lys
1               5                   10                  15

Gly

<210> SEQ ID NO 6
<211> LENGTH: 11
<212> TYPE: PRT
<213> ORGANISM: Mus sp.

<400> SEQUENCE: 6

Pro Asp Arg Ser Gly Tyr Ala Trp Phe Ile Tyr
1               5                   10

<210> SEQ ID NO 7
<211> LENGTH: 10
<212> TYPE: PRT
<213> ORGANISM: Artificial Sequence
<220> FEATURE:
<223> OTHER INFORMATION: Description of Artificial Sequence: Humanized
      sequence

<400> SEQUENCE: 7

Gly Tyr Thr Phe Thr Asp Gln Thr Ile His
1               5                   10

<210> SEQ ID NO 8
<211> LENGTH: 10
<212> TYPE: PRT
<213> ORGANISM: Artificial Sequence
<220> FEATURE:
<223> OTHER INFORMATION: Description of Artificial Sequence: Humanized
      sequence

<400> SEQUENCE: 8

Gly Phe Thr Phe Thr Asp Gln Thr Ile His
1               5                   10

<210> SEQ ID NO 9
<211> LENGTH: 10
<212> TYPE: PRT
<213> ORGANISM: Artificial Sequence
<220> FEATURE:
<223> OTHER INFORMATION: Description of Artificial Sequence: Humanized
      sequence

<400> SEQUENCE: 9

Gly Gly Thr Phe Thr Asp Gln Thr Ile His
1               5                   10

<210> SEQ ID NO 10
<211> LENGTH: 107
<212> TYPE: PRT
<213> ORGANISM: Artificial Sequence
<220> FEATURE:
<223> OTHER INFORMATION: Description of Artificial Sequence: Humanized
      sequence
```

<400> SEQUENCE: 10

Asp Ile Gln Met Thr Gln Ser Pro Ser Ser Leu Ser Ala Ser Val Gly
1               5                   10                  15

Asp Arg Val Thr Ile Thr Cys Lys Ala Ser Arg Asp Val Ala Ile Ala
            20                  25                  30

Val Ala Trp Tyr Gln Gln Lys Pro Gly Lys Val Pro Lys Leu Leu Leu
        35                  40                  45

Phe Trp Ala Ser Thr Arg His Thr Gly Val Pro Asp Arg Phe Ser Gly
    50                  55                  60

Ser Gly Ser Gly Thr Asp Phe Thr Leu Thr Ile Ser Ser Leu Gln Pro
65                  70                  75                  80

Glu Asp Leu Ala Asp Tyr Tyr Cys His Gln Tyr Ser Ser Tyr Pro Phe
                85                  90                  95

Thr Phe Gly Gln Gly Thr Lys Leu Glu Ile Lys
            100                 105

<210> SEQ ID NO 11
<211> LENGTH: 107
<212> TYPE: PRT
<213> ORGANISM: Artificial Sequence
<220> FEATURE:
<223> OTHER INFORMATION: Description of Artificial Sequence: Humanized
      sequence

<400> SEQUENCE: 11

Asp Ile Gln Met Thr Gln Ser Pro Ser Ser Leu Ser Ala Ser Val Gly
1               5                   10                  15

Asp Arg Val Thr Ile Thr Cys Lys Ala Ser Arg Asp Val Ala Ile Ala
            20                  25                  30

Val Ala Trp Tyr Gln Gln Lys Pro Gly Lys Val Pro Lys Leu Leu Ile
        35                  40                  45

Tyr Trp Ala Ser Thr Arg His Thr Gly Val Pro Ser Arg Phe Ser Gly
    50                  55                  60

Ser Gly Ser Arg Thr Asp Phe Thr Leu Thr Ile Ser Ser Leu Gln Pro
65                  70                  75                  80

Glu Asp Val Ala Asp Tyr Phe Cys His Gln Tyr Ser Ser Tyr Pro Phe
                85                  90                  95

Thr Phe Gly Ser Gly Thr Lys Leu Glu Ile Lys
            100                 105

<210> SEQ ID NO 12
<211> LENGTH: 107
<212> TYPE: PRT
<213> ORGANISM: Artificial Sequence
<220> FEATURE:
<223> OTHER INFORMATION: Description of Artificial Sequence: Humanized
      sequence

<400> SEQUENCE: 12

Asp Ile Gln Met Thr Gln Ser Pro Ser Ser Leu Ser Ala Ser Val Gly
1               5                   10                  15

Asp Arg Val Thr Ile Thr Cys Lys Ala Ser Arg Asp Val Ala Ile Ala
            20                  25                  30

Val Ala Trp Tyr Gln Gln Lys Pro Gly Lys Val Pro Lys Leu Leu Leu
        35                  40                  45

Tyr Trp Ala Ser Thr Arg His Thr Gly Val Pro Ser Arg Phe Ser Gly
    50                  55                  60

Ser Gly Ser Arg Thr Asp Phe Thr Leu Thr Ile Ser Ser Leu Gln Pro
65                  70                  75                  80

Glu Asp Val Ala Thr Tyr Tyr Cys His Gln Tyr Ser Ser Tyr Pro Phe
                85                  90                  95

Thr Phe Gly Ser Gly Thr Lys Leu Glu Ile Lys
            100                 105

<210> SEQ ID NO 13
<211> LENGTH: 107
<212> TYPE: PRT
<213> ORGANISM: Artificial Sequence
<220> FEATURE:
<223> OTHER INFORMATION: Description of Artificial Sequence: Humanized
      sequence

<400> SEQUENCE: 13

Asp Ile Gln Met Thr Gln Ser Pro Ser Ser Leu Ser Ala Ser Val Gly
1               5                   10                  15

Asp Arg Val Thr Ile Thr Cys Lys Ala Ser Arg Asp Val Ala Ile Ala
                20                  25                  30

Val Ala Trp Tyr Gln Gln Lys Pro Gly Lys Val Pro Lys Leu Leu Leu
            35                  40                  45

Phe Trp Ala Ser Thr Arg His Thr Gly Val Pro Asp Arg Phe Ser Gly
50                  55                  60

Ser Gly Ser Arg Thr Asp Phe Thr Leu Thr Ile Ser Ser Leu Gln Pro
65                  70                  75                  80

Glu Asp Leu Ala Asp Tyr Tyr Cys His Gln Tyr Ser Ser Tyr Pro Phe
                85                  90                  95

Thr Phe Gly Ser Gly Thr Lys Leu Glu Ile Lys
            100                 105

<210> SEQ ID NO 14
<211> LENGTH: 120
<212> TYPE: PRT
<213> ORGANISM: Artificial Sequence
<220> FEATURE:
<223> OTHER INFORMATION: Description of Artificial Sequence: Humanized
      sequence

<400> SEQUENCE: 14

Gln Val Gln Leu Val Gln Ser Gly Ala Glu Val Lys Lys Pro Gly Ser
1               5                   10                  15

Ser Val Lys Val Ser Cys Lys Ala Ser Gly Tyr Thr Phe Thr Asp Gln
                20                  25                  30

Thr Ile His Trp Met Arg Gln Ala Pro Gly Gln Gly Leu Glu Trp Ile
            35                  40                  45

Gly Tyr Ile Tyr Pro Arg Asp Asp Ser Pro Lys Tyr Asn Glu Asn Phe
50                  55                  60

Lys Gly Lys Val Thr Ile Thr Ala Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Ile Pro Asp Arg Ser Gly Tyr Ala Trp Phe Ile Tyr Trp Gly Gln
            100                 105                 110

Gly Thr Leu Val Thr Val Ser Ser
            115                 120

<210> SEQ ID NO 15
<211> LENGTH: 120

<212> TYPE: PRT
<213> ORGANISM: Artificial Sequence
<220> FEATURE:
<223> OTHER INFORMATION: Description of Artificial Sequence: Humanized sequence

<400> SEQUENCE: 15

```
Gln Val Gln Leu Val Gln Ser Gly Ala Glu Val Lys Lys Pro Gly Ser
1               5                   10                  15
Ser Val Lys Val Ser Cys Lys Ala Ser Gly Phe Thr Phe Thr Asp Gln
            20                  25                  30
Thr Ile His Trp Val Arg Gln Ala Pro Gly Gln Gly Leu Glu Trp Met
        35                  40                  45
Gly Tyr Ile Tyr Pro Arg Asp Asp Ser Pro Lys Tyr Asn Glu Asn Phe
    50                  55                  60
Lys Gly Lys Val Thr Leu Thr Ala Asp Lys Ser Thr Ser Thr Ala Tyr
65                  70                  75                  80
Met Glu Leu Ser Ser Leu Arg Ser Glu Asp Thr Ala Val Tyr Tyr Cys
                85                  90                  95
Ala Ile Pro Asp Arg Ser Gly Tyr Ala Trp Phe Ile Tyr Trp Gly Gln
            100                 105                 110
Gly Thr Leu Val Thr Val Ser Ser
        115                 120
```

<210> SEQ ID NO 16
<211> LENGTH: 120
<212> TYPE: PRT
<213> ORGANISM: Artificial Sequence
<220> FEATURE:
<223> OTHER INFORMATION: Description of Artificial Sequence: Humanized sequence

<400> SEQUENCE: 16

```
Gln Val Gln Leu Val Gln Ser Gly Ala Glu Val Lys Lys Pro Gly Ser
1               5                   10                  15
Ser Val Lys Thr Ser Cys Lys Ala Ser Gly Gly Thr Phe Thr Asp Gln
            20                  25                  30
Thr Ile His Trp Val Arg Gln Arg Pro Gly Gln Gly Leu Glu Trp Met
        35                  40                  45
Gly Tyr Ile Tyr Pro Arg Asp Asp Ser Pro Lys Tyr Asn Glu Asn Phe
    50                  55                  60
Lys Gly Arg Val Thr Ile Thr Ala Asp Lys Ser Thr Ser Thr Ala Tyr
65                  70                  75                  80
Met Glu Leu Ser Ser Leu Arg Ser Glu Asp Thr Ala Val Tyr Tyr Cys
                85                  90                  95
Ala Ile Pro Asp Arg Ser Gly Tyr Ala Trp Phe Ile Tyr Trp Gly Gln
            100                 105                 110
Gly Thr Leu Val Thr Val Ser Ser
        115                 120
```

<210> SEQ ID NO 17
<211> LENGTH: 120
<212> TYPE: PRT
<213> ORGANISM: Artificial Sequence
<220> FEATURE:
<223> OTHER INFORMATION: Description of Artificial Sequence: Humanized sequence

<400> SEQUENCE: 17

```
Gln Val Gln Leu Val Gln Ser Gly Ala Glu Val Lys Lys Pro Gly Ser
```

```
                 1               5                   10                  15
            Ser Val Lys Val Ser Cys Lys Ala Ser Gly Gly Thr Phe Thr Asp Gln
                            20                  25                  30

Thr Ile His Trp Val Arg Gln Ala Pro Gly Gln Gly Leu Glu Trp Met
                            35                  40                  45

Gly Tyr Ile Tyr Pro Arg Asp Asp Ser Pro Lys Tyr Asn Glu Asn Phe
                        50                  55                  60

Lys Gly Arg Val Thr Leu Thr Ala Asp Lys Ser Thr Ser Thr Ala Tyr
             65                 70                  75                  80

Met Glu Leu Ser Ser Leu Arg Ser Glu Asp Thr Ala Val Tyr Phe Cys
                            85                  90                  95

Ala Arg Pro Asp Arg Ser Gly Tyr Ala Trp Phe Ile Tyr Trp Gly Gln
                            100                 105                 110

Gly Thr Leu Val Thr Val Ser Ser
                        115                 120

<210> SEQ ID NO 18
<211> LENGTH: 214
<212> TYPE: PRT
<213> ORGANISM: Artificial Sequence
<220> FEATURE:
<223> OTHER INFORMATION: Description of Artificial Sequence: Humanized
      sequence

<400> SEQUENCE: 18

Asp Ile Gln Met Thr Gln Ser Pro Ser Ser Leu Ser Ala Ser Val Gly
             1               5                   10                  15

Asp Arg Val Thr Ile Thr Cys Lys Ala Ser Arg Asp Val Ala Ile Ala
                            20                  25                  30

Val Ala Trp Tyr Gln Gln Lys Pro Gly Lys Val Pro Lys Leu Leu Ile
                            35                  40                  45

Tyr Trp Ala Ser Thr Arg His Thr Gly Val Pro Ser Arg Phe Ser Gly
                        50                  55                  60

Ser Gly Ser Arg Thr Asp Phe Thr Leu Thr Ile Ser Ser Leu Gln Pro
             65                 70                  75                  80

Glu Asp Val Ala Asp Tyr Phe Cys His Gln Tyr Ser Ser Tyr Pro Phe
                            85                  90                  95

Thr Phe Gly Ser Gly Thr Lys Leu Glu Ile Lys Arg Thr Val Ala Ala
                            100                 105                 110

Pro Ser Val Phe Ile Phe Pro Pro Ser Asp Glu Gln Leu Lys Ser Gly
                        115                 120                 125

Thr Ala Ser Val Val Cys Leu Leu Asn Asn Phe Tyr Pro Arg Glu Ala
                        130                 135                 140

Lys Val Gln Trp Lys Val Asp Asn Ala Leu Gln Ser Gly Asn Ser Gln
             145                150                 155                 160

Glu Ser Val Thr Glu Gln Asp Ser Lys Asp Ser Thr Tyr Ser Leu Ser
                            165                 170                 175

Ser Thr Leu Thr Leu Ser Lys Ala Asp Tyr Glu Lys His Lys Val Tyr
                            180                 185                 190

Ala Cys Glu Val Thr His Gln Gly Leu Ser Ser Pro Val Thr Lys Ser
                            195                 200                 205

Phe Asn Arg Gly Glu Cys
                        210

<210> SEQ ID NO 19
<211> LENGTH: 449
```

```
<212> TYPE: PRT
<213> ORGANISM: Artificial Sequence
<220> FEATURE:
<223> OTHER INFORMATION: Description of Artificial Sequence: Humanized
      sequence

<400> SEQUENCE: 19

Gln Val Gln Leu Val Gln Ser Gly Ala Glu Val Lys Lys Pro Gly Ser
1               5                   10                  15

Ser Val Lys Val Ser Cys Lys Ala Ser Gly Tyr Thr Phe Thr Asp Gln
            20                  25                  30

Thr Ile His Trp Met Arg Gln Ala Pro Gly Gln Gly Leu Glu Trp Ile
        35                  40                  45

Gly Tyr Ile Tyr Pro Arg Asp Asp Ser Pro Lys Tyr Asn Glu Asn Phe
    50                  55                  60

Lys Gly Lys Val Thr Ile Thr Ala Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Ile Pro Asp Arg Ser Gly Tyr Ala Trp Phe Ile Tyr Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Arg Val Glu Pro Lys Ser Cys Asp
    210                 215                 220

Lys Thr His Thr Cys Pro Pro Cys Pro Ala Pro Glu Ala Ala Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Glu Glu Met Thr Lys Asn Gln Val Ser Leu
        355                 360                 365

Thr Cys Leu Val Lys Gly Phe Tyr Pro Ser Asp Ile Ala Val Glu Trp
    370                 375                 380
```

```
Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
            405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
            435                 440                 445

Gly

<210> SEQ ID NO 20
<211> LENGTH: 449
<212> TYPE: PRT
<213> ORGANISM: Artificial Sequence
<220> FEATURE:
<223> OTHER INFORMATION: Description of Artificial Sequence: Humanized
      sequence

<400> SEQUENCE: 20

Gln Val Gln Leu Val Gln Ser Gly Ala Glu Val Lys Lys Pro Gly Ser
1               5                   10                  15

Ser Val Lys Val Ser Cys Lys Ala Ser Gly Phe Thr Phe Thr Asp Gln
            20                  25                  30

Thr Ile His Trp Val Arg Gln Ala Pro Gly Gln Gly Leu Glu Trp Met
        35                  40                  45

Gly Tyr Ile Tyr Pro Arg Asp Asp Ser Pro Lys Tyr Asn Glu Asn Phe
50                  55                  60

Lys Gly Lys Val Thr Leu Thr Ala Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Ile Pro Asp Arg Ser Gly Tyr Ala Trp Phe Ile Tyr Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Arg Val Glu Pro Lys Ser Cys Asp
210                 215                 220

Lys Thr His Thr Cys Pro Pro Cys Pro Ala Pro Glu Ala Ala Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285
```

```
Asn Ala Lys Thr Lys Pro Arg Glu Glu Gln Tyr Asn Ser Thr Tyr Arg
            290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
                340                 345                 350

Thr Leu Pro Pro Ser Arg Glu Glu Met Thr Lys Asn Gln Val Ser Leu
            355                 360                 365

Thr Cys Leu Val Lys Gly Phe Tyr Pro Ser Asp Ile Ala Val Glu Trp
        370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
                420                 425                 430

Glu Ala Leu His Asn His Tyr Thr Gln Lys Ser Leu Ser Leu Ser Pro
            435                 440                 445

Gly

<210> SEQ ID NO 21
<211> LENGTH: 214
<212> TYPE: PRT
<213> ORGANISM: Artificial Sequence
<220> FEATURE:
<223> OTHER INFORMATION: Description of Artificial Sequence: Humanized
      sequence

<400> SEQUENCE: 21

Asp Ile Gln Met Thr Gln Ser Pro Ser Ser Leu Ser Ala Ser Val Gly
1               5                   10                  15

Asp Arg Val Thr Ile Thr Cys Lys Ala Ser Arg Asp Val Ala Ile Ala
                20                  25                  30

Val Ala Trp Tyr Gln Gln Lys Pro Gly Lys Val Pro Lys Leu Leu Leu
            35                  40                  45

Phe Trp Ala Ser Thr Arg His Thr Gly Val Pro Asp Arg Phe Ser Gly
    50                  55                  60

Ser Gly Ser Gly Thr Asp Phe Thr Leu Thr Ile Ser Ser Leu Gln Pro
65                  70                  75                  80

Glu Asp Leu Ala Asp Tyr Tyr Cys His Gln Tyr Ser Ser Tyr Pro Phe
                85                  90                  95

Thr Phe Gly Gln Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190
```

```
Ala Cys Glu Val Thr His Gln Gly Leu Ser Ser Pro Val Thr Lys Ser
            195                 200                 205

Phe Asn Arg Gly Glu Cys
    210

<210> SEQ ID NO 22
<211> LENGTH: 189
<212> TYPE: PRT
<213> ORGANISM: Homo sapiens

<400> SEQUENCE: 22

Met Leu Gly Ser Arg Ala Val Met Leu Leu Leu Leu Pro Trp Thr
1               5                   10                  15

Ala Gln Gly Arg Ala Val Pro Gly Gly Ser Ser Pro Ala Trp Thr Gln
                20                  25                  30

Cys Gln Gln Leu Ser Gln Lys Leu Cys Thr Leu Ala Trp Ser Ala His
            35                  40                  45

Pro Leu Val Gly His Met Asp Leu Arg Glu Glu Gly Asp Glu Glu Thr
    50                  55                  60

Thr Asn Asp Val Pro His Ile Gln Cys Gly Asp Gly Cys Asp Pro Gln
65                  70                  75                  80

Gly Leu Arg Asp Asn Ser Gln Phe Cys Leu Gln Arg Ile His Gln Gly
                85                  90                  95

Leu Ile Phe Tyr Glu Lys Leu Leu Gly Ser Asp Ile Phe Thr Gly Glu
            100                 105                 110

Pro Ser Leu Leu Pro Asp Ser Pro Val Gly Gln Leu His Ala Ser Leu
        115                 120                 125

Leu Gly Leu Ser Gln Leu Leu Gln Pro Glu Gly His His Trp Glu Thr
    130                 135                 140

Gln Gln Ile Pro Ser Leu Ser Pro Ser Gln Pro Trp Gln Arg Leu Leu
145                 150                 155                 160

Leu Arg Phe Lys Ile Leu Arg Ser Leu Gln Ala Phe Val Ala Val Ala
                165                 170                 175

Ala Arg Val Phe Ala His Gly Ala Ala Thr Leu Ser Pro
            180                 185
```

METHODS OF TREATING INFLAMMATORY DISEASES

TECHNICAL FIELD OF THE INVENTION

This invention generally relates to method of treating inflammatory diseases, for example psoriasis, psoriatic arthritis or axial (spinal) spondyloarthritis (ax-SpA), including ankylosing spondylitis (AS, also called radiographic ax-SpA) and non-radiographic ax-SpA, utilizing anti-IL-23A antibodies.

BACKGROUND OF THE INVENTION

Psoriasis is a chronic, immune-mediated, inflammatory skin disease, with a global incidence of approximately 2%, associated with significant morbidity and can have a substantial psychosocial impact on quality of life and well-being of patients. Plaque psoriasis is the most common form and affects approximately 80-90% of patients, manifesting as raised plaques on the skin; the disease usually begins in late adolescence and early adulthood and may persist through adult life. The extent of the affected body surface area (BSA) and the degree of skin manifestations, including erythema, induration, and scaling, defines the severity of psoriasis with approximately 20-30% of patients having moderate-to-severe disease. Approximately one third of patients with psoriasis have associated joint inflammation (psoriatic arthritis (PsA)) resulting in pain and disability. Axial (spinal) spondyloarthritis (ax-SpA), including ankylosing Spondylitis (AS, also called radiographic axial spondyloarthritis (ax-SpA)) and non-radiographic axial spondyloarthritis (ax-SpA), are an inflammatory disease involving primarily the axial skeleton and sacroiliac joints.

Psoriasis, psoriatic arthritis and axial (spinal) spondyloarthritis (ax-SpA), which includes ankylosing spondylitis and non-radiographic ax-SpA, are multifactorial autoimmune diseases whose exact aetiology is unknown. Multiple genome-wide association studies have linked variants in the genes for the IL-23 receptor to psoriasis susceptibility. Human IL-23 is primarily produced by antigen presenting cells and induces differentiation of T helper 17 (Th17) cells. This results in the production of IL-17 and IL-22, which may mediate the development of the epidermal hyperplasia and tissue inflammation observed in psoriasis.

There is a need for treatment options for inflammatory diseases, in particular psoriasis, psoriatic arthritis, axial (spinal) spondyloarthritis (ax-SpA), including ankylosing spondylitis and non-radiographic ax-SpA, that lead to favorable outcomes for patients, for example in terms of efficacy, safety and/or tolerability of the treatment.

SUMMARY OF THE INVENTION

The present invention addresses the above needs and provides methods for treating inflammatory diseases, in particular methods comprising administering an anti-IL-23A antibody to a patient in certain amounts and/or at certain intervals. In one aspect, a method of the present invention is for the treatment of psoriasis or psoriatic arthritis. In one aspect, a method of the present invention is for the treatment of axial (spinal) spondyloarthritis (ax-SpA), including ankylosing spondylitis (AS) and non-radiographic ax-SpA. Accordingly, in one aspect, a method of the present invention is for the treatment of ankylosing spondylitis (AS) and in one aspect, a method of the present invention is for the treatment of non-radiographic ax-SpA.

The methods of the present invention provide the advantage of enabling patients to experience clinical improvement while receiving fewer administrations of the anti-IL-23A antibody.

In one embodiment, the present invention provides a method for treating an inflammatory disease, in one aspect for treating psoriasis, psoriatic arthritis or axial (spinal) spondyloarthritis (ax-SpA), including ankylosing spondylitis and non-radiographic ax-SpA, comprising administering to a patient an anti-IL-23A antibody, said method comprising:
  a) administering an initial dose of the anti-IL-23A antibody to the patient;
  b) administering a first maintenance dose of the anti-IL-23A antibody to the patient 4 to 24 weeks, for example 4 to 16 weeks, for example 4 to 12 weeks, after said initial dose is administered; and
  c) administering at least one additional maintenance dose to the patient 4 to 24 weeks, for example 4 to 16 weeks, for example 4 to 12 weeks, after said first maintenance dose is administered.

In one embodiment, the present invention provides a method for treating an inflammatory disease, in one aspect for treating psoriasis, psoriatic arthritis or axial (spinal) spondyloarthritis (ax-SpA), including ankylosing spondylitis and non-radiographic ax-SpA, comprising administering to a patient an anti-IL-23A antibody, said method comprising:
  a) administering an initial dose of the anti-IL-23A antibody to the patient;
  b) administering a first maintenance dose of the anti-IL-23A antibody to the patient 8 to 24 weeks, for example 8 to 16 weeks, for example 8 to 12 weeks, for example 6 to 24 weeks, for example 6 to 16 weeks, for example 6 to 12 weeks, after said initial dose is administered; and
  c) administering at least one additional maintenance dose to the patient 8 to 24 weeks, for example 8 to 16 weeks, for example 8 to 12 weeks, for example 6 to 24 weeks, for example 6 to 16 weeks, for example 6 to 12 weeks, after said first maintenance dose is administered.

In one embodiment, the first maintenance dose is administered to the patient 4, 6, 8, 12, 16, 20 or 24 weeks after the initial dose is administered.

In one embodiment, the at least one additional maintenance dose is administered to the patient 4, 6, 8, 12, 16, 20 or 24 weeks after the first maintenance dose is administered.

In one embodiment, the first maintenance dose is administered to the patient 4, 6, 8, 12, 16, 20 or 24 weeks after the initial dose is administered and the at least one additional maintenance dose is administered to the patient 4, 6, 8, 12, 16, 20 or 24 weeks after the first maintenance dose is administered.

In additional embodiments:
  the first maintenance dose is administered to the patient 4 weeks after the initial dose is administered and the at least one additional maintenance dose is administered to the patient 4 weeks after the first maintenance dose is administered; or
  the first maintenance dose is administered to the patient 6 weeks after the initial dose is administered and the at least one additional maintenance dose is administered to the patient 6 weeks after the first maintenance dose is administered; or
  the first maintenance dose is administered to the patient 8 weeks after the initial dose is administered and the at least one additional maintenance dose is administered to the patient 8 weeks after the first maintenance dose is administered; or the first maintenance dose is administered to the patient 12 weeks after the initial dose is administered and the at least one additional maintenance dose is administered to the patient 12 weeks after the first maintenance dose is administered; or the first maintenance dose is administered to the patient 16 weeks after the initial dose is administered and the at least one additional maintenance dose is administered to the patient 16 weeks after the first maintenance dose is administered; or the first maintenance dose is administered to the patient 20 weeks after the initial dose is administered and the at least one additional maintenance dose is administered to the patient 20 weeks after the first maintenance dose is administered; or the first maintenance dose is administered to the patient 24 weeks after the initial dose is administered and the at least one additional maintenance dose is administered to the patient 24 weeks after the first maintenance dose is administered.

In one embodiment, in any one of the methods above, the initial dose comprises 15 to 300 mg, for example 15 to 250 mg, for example 90 to 180 mg, of the anti- IL-23A antibody.

In one embodiment, in any one of the methods above, the first maintenance dose and the at least one additional maintenance dose comprise 15 to 300 mg, for example 15 to 250 mg, for example 90 to 180 mg, of the anti- IL-23A antibody.

In one embodiment, in any one of the methods above, the initial dose comprises 70 to 90 mg, 80 to 100 mg, 90 to 110 mg, 100 to 120 mg, 110 to 130 mg, 120 to 140 mg, 130 to 150 mg, 140 to 160 mg, 150 to 170 mg, 160 to 180 mg, 170 to 190 mg, 180 to 200 mg, 190 to 210 mg, 200 to 220 mg, 210 to 230 mg, 220 to 240 mg, 230 to 250 mg, 240 to 260 mg, 250 to 270 mg, 260 to 280 mg, 270 to 290 mg or 280 to 300 mg of the anti-IL-23A antibody.

In one embodiment, in any one of the methods above, the first maintenance dose and the at least one additional maintenance dose comprise 70 to 90 mg, 80 to 100 mg, 90 to 110 mg, 100 to 120 mg, 110 to 130 mg, 120 to 140 mg, 130 to 150 mg, 140 to 160 mg, 150 to 170 mg, 160 to 180 mg, 170 to 190 mg, 180 to 200 mg, 190 to 210 mg, 200 to 220 mg, 210 to 230 mg, 220 to 240 mg, 230 to 250 mg, 240 to 260 mg, 250 to 270 mg, 260 to 280 mg, 270 to 290 mg or 280 to 300 mg of the anti- IL-23A antibody.

In one embodiment, in any one of the methods above, the initial dose comprises 18, 20, 30, 40, 50, 60, 70, 80, 90, 100, 110, 120, 130, 140, 150, 160, 170, 180, 190, 200, 210, 220, 230, 240, 250, 260, 270, 280, 290 or 300 mg of the anti-IL-23A antibody. In one embodiment, in any one of the methods above, the initial dose comprises 75 mg of the anti-IL-23A antibody.

In one embodiment, in any one of the methods above, the first maintenance dose and the at least one additional maintenance dose comprise 18, 20, 30, 40, 50, 60, 70, 80, 90, 100, 110, 120, 130, 140, 150, 160, 170, 180, 190, 200, 210, 220, 230, 240, 250, 260, 270, 280, 290 or 300 mg of the anti-IL-23A antibody. In one embodiment, in any one of the methods above, the first maintenance dose and the at least one additional maintenance dose comprise 75 mg of the anti-IL-23A antibody.

In one embodiment, in any one of the methods above, the initial dose, the first maintenance dose and the at least one additional maintenance dose comprise 18, 20, 30, 40, 50, 60, 70, 80, 90, 100, 110, 120, 130, 140, 150, 160, 170, 180, 190, 200, 210, 220, 230, 240, 250, 260, 270, 280, 290 or 300 mg of the anti- IL-23A antibody. In one embodiment, in any one of the methods above, the initial dose, the first maintenance dose and the at least one additional maintenance dose comprise 75 mg of the anti- IL-23A antibody.

In one embodiment, the present invention provides a method for treating an inflammatory disease, in one aspect for treating psoriasis, psoriatic arthritis or axial (spinal) spondyloarthritis (ax-SpA), including ankylosing spondylitis and non-radiographic ax-SpA, comprising administering to a patient an anti-IL-23A antibody, said method comprising:
   a) administering an initial dose of the anti-IL-23A antibody to the patient;
   b) administering a first maintenance dose of the anti-IL-23A antibody to the patient 12 weeks after said initial dose is administered; and
   c) administering at least one additional maintenance dose to the patient 12 weeks after said first maintenance dose is administered.

In one embodiment, in said method, the initial dose and the maintenance dose comprise 150 mg of said anti-IL-23A antibody. In one embodiment, in said method, the initial dose and the maintenance dose comprise 75 mg of said anti-IL-23A antibody.

In one embodiment, the present invention provides a method for treating an inflammatory disease, in one aspect for treating psoriasis, psoriatic arthritis or axial (spinal) spondyloarthritis (ax-SpA), including ankylosing spondylitis and non-radiographic ax-SpA, comprising administering to a patient an anti-IL-23A antibody, said method comprising:
   a) administering an initial dose of the anti-IL-23A antibody to the patient;
   b) administering a first maintenance dose of the anti-IL-23A antibody to the patient 8 weeks after said initial dose is administered; and
   c) administering at least one additional maintenance dose to the patient 8 weeks after said first maintenance dose is administered.

In one embodiment, in said method, the initial dose and the maintenance dose comprise 90 mg of said anti-IL-23A antibody. In one embodiment, in said method, the initial dose and the maintenance dose comprise 150 mg of said anti-IL-23A antibody.

In one embodiment, the present invention provides a method for treating an inflammatory disease, in one aspect for treating psoriasis, psoriatic arthritis or axial (spinal) spondyloarthritis (ax-SpA), including ankylosing spondylitis and non-radiographic ax-SpA, comprising administering to a patient an anti-IL-23A antibody, said method comprising:
   a) administering an initial dose of the anti-IL-23A antibody to the patient;
   b) administering a first maintenance dose of the anti-IL-23A antibody to the patient 16 weeks after said initial dose is administered; and
   c) administering at least one additional maintenance dose to the patient 16 weeks after said first maintenance dose is administered.

In one embodiment, in said method, the initial dose and the maintenance dose comprise 150 mg of said anti-IL-23A antibody.

In one embodiment, the present invention provides a method for treating an inflammatory disease, in one aspect for treating psoriasis, psoriatic arthritis or axial (spinal) spondyloarthritis (ax-SpA), including ankylosing spondylitis and non-radiographic ax-SpA, comprising administering to a patient an anti-IL-23A antibody, said method comprising:
- a) administering an initial dose of the anti-IL-23A antibody to the patient;
- b) administering a first maintenance dose of the anti-IL-23A antibody to the patient 6 weeks after said initial dose is administered; and
- c) administering at least one additional maintenance dose to the patient 6 weeks after said first maintenance dose is administered.

In one embodiment, in said method, the initial dose and the maintenance dose comprise 150 mg of said anti-IL-23A antibody.

In one embodiment, the present invention provides a method for treating an inflammatory disease, in one aspect for treating psoriasis, psoriatic arthritis or axial (spinal) spondyloarthritis (ax-SpA), including ankylosing spondylitis and non-radiographic ax-SpA, comprising administering to a patient an anti-IL-23A antibody, said method comprising:
- a) administering an initial dose of the anti-IL-23A antibody to the patient;
- b) administering a first maintenance dose of the anti-IL-23A antibody to the patient 4 weeks after said initial dose is administered; and
- c) administering at least one additional maintenance dose to the patient 4 weeks after said first maintenance dose is administered.

In one embodiment, in said method, the initial dose and the maintenance dose comprise 150 mg of said anti-IL-23A antibody.

In one embodiment, the present invention further provides a method for treating an inflammatory disease, in one aspect for treating psoriasis, psoriatic arthritis or axial (spinal) spondyloarthritis (ax-SpA), including ankylosing spondylitis and non-radiographic ax-SpA, comprising administering to a patient an anti-IL-23A antibody, said method comprising:
- a) administering an initial dose of said anti-IL-23A antibody to the patient;
- b) administering a loading dose of said anti-IL-23A antibody to the patient 1 to 6 weeks after said initial dose is administered;
- c) administering a first maintenance dose of said anti-IL-23A antibody to the patient 8 to 24 weeks, for example 8 to 16 weeks, for example 8 to 12 weeks, for example 6 to 24 weeks, for example 6 to 16 weeks, for example 6 to 12 weeks, after said loading dose is administered; and
- d) administering at least one additional maintenance dose to the patient 8 to 24 weeks, for example 8 to 16 weeks, for example 8 to 12 weeks, for example 6 to 24 weeks, for example 6 to 16 weeks, for example 6 to 12 weeks, after said first maintenance dose is administered.

In one embodiment, the loading dose is administered to the patient 1, 2, 3, 4, 5 or 6 weeks the said initial dose is administered.

In one embodiment, the first maintenance dose is administered to the patient 6, 8, 12, 16, 20 or 24 weeks after the loading dose is administered.

In one embodiment, the at least one additional maintenance dose is administered to the patient 6, 8, 12, 16, 20 or 24 weeks after the first maintenance dose is administered.

In one embodiment, the first maintenance dose is administered to the patient 6, 8, 12, 16, 20 or 24 weeks after the initial dose is administered and the at least one additional maintenance dose is administered to the patient 6, 8, 12, 16, 20 or 24 weeks after the first maintenance dose is administered.

In one embodiment, the first maintenance dose is administered to the patient 6, 8, 12, 16, 20 or 24 weeks after the loading dose is administered and the at least one additional maintenance dose is administered to the patient 6, 8, 12, 16, 20 or 24 weeks after the first maintenance dose is administered.

In additional embodiments:
the first maintenance dose is administered to the patient 6 weeks after the initial dose is administered and the at least one additional maintenance dose is administered to the patient 6 weeks after the first maintenance dose is administered; or the first maintenance dose is administered to the patient 8 weeks after the initial dose is administered and the at least one additional maintenance dose is administered to the patient 8 weeks after the first maintenance dose is administered; or the first maintenance dose is administered to the patient 12 weeks after the initial dose is administered and the at least one additional maintenance dose is administered to the patient 12 weeks after the first maintenance dose is administered; or the first maintenance dose is administered to the patient 16 weeks after the initial dose is administered and the at least one additional maintenance dose is administered to the patient 16 weeks after the first maintenance dose is administered; or the first maintenance dose is administered to the patient 20 weeks after the initial dose is administered and the at least one additional maintenance dose is administered to the patient 20 weeks after the first maintenance dose is administered; or the first maintenance dose is administered to the patient 24 weeks after the initial dose is administered and the at least one additional maintenance dose is administered to the patient 24 weeks after the first maintenance dose is administered.

In additional embodiments:
the first maintenance dose is administered to the patient 6 weeks after the loading dose is administered and the at least one additional maintenance dose is administered to the patient 6 weeks after the first maintenance dose is administered; or the first maintenance dose is administered to the patient 8 weeks after the loading dose is administered and the at least one additional maintenance dose is administered to the patient 8 weeks after the first maintenance dose is administered; or the first maintenance dose is administered to the patient 12 weeks after the loading dose is administered and the at least one additional maintenance dose is administered to the patient 12 weeks after the first maintenance dose is administered; or the first maintenance dose is administered to the patient 16 weeks after the loading dose is administered and the at least one additional maintenance dose is administered to the patient 16 weeks after the first maintenance dose is administered; or the first maintenance dose is administered to the patient 20 weeks after the loading dose is administered and the at least one additional maintenance dose is administered to the patient 20 weeks after the first maintenance dose is administered; or the first maintenance dose is administered to the patient 24 weeks after the loading dose is administered and the at least one additional maintenance dose is administered to the patient 24 weeks after the first maintenance dose is administered.

In one embodiment, in any one of the methods above, the initial dose comprises 15 to 300 mg, for example 15 to 250 mg, for example 90 to 180 mg, of the anti- IL-23A antibody.

In one embodiment, in any one of the methods above, the loading dose comprises 15 to 300 mg, for example 15 to 250 mg, for example 90 to 180 mg, of the anti- IL-23A antibody.

In one embodiment, in any one of the methods above, the first maintenance dose and the at least one additional maintenance dose comprise 15 to 300 mg, for example 15 to 250 mg, for example 90 to 180 mg, of the anti- IL-23A antibody.

In one embodiment, in any one of the methods above, the initial dose comprises 70 to 90 mg, 80 to 100 mg, 90 to 110 mg, 100 to 120 mg, 110 to 130 mg, 120 to 140 mg, 130 to 150 mg, 140 to 160 mg, 150 to 170 mg, 160 to 180 mg, 170 to 190 mg, 180 to 200 mg, 190 to 210 mg, 200 to 220 mg, 210 to 230 mg, 220 to 240 mg, 230 to 250 mg, 240 to 260 mg, 250 to 270 mg, 260 to 280 mg, 270 to 290 mg or 280 to 300 mg of the anti-IL-23A antibody.

In one embodiment, in any one of the methods above, the loading dose comprises 70 to 90 mg, 80 to 100 mg, 90 to 110 mg, 100 to 120 mg, 110 to 130 mg, 120 to 140 mg, 130 to 150 mg, 140 to 160 mg, 150 to 170 mg, 160 to 180 mg, 170 to 190 mg, 180 to 200 mg, 190 to 210 mg, 200 to 220 mg, 210 to 230 mg, 220 to 240 mg, 230 to 250 mg, 240 to 260 mg, 250 to 270 mg, 260 to 280 mg, 270 to 290 mg or 280 to 300 mg of the anti-IL-23A antibody.

In one embodiment, in any one of the methods above, the first maintenance dose and the at least one additional maintenance dose comprise 70 to 90 mg, 80 to 100 mg, 90 to 110 mg, 100 to 120 mg, 110 to 130 mg, 120 to 140 mg, 130 to 150 mg, 140 to 160 mg, 150 to 170 mg, 160 to 180 mg, 170 to 190 mg, 180 to 200 mg, 190 to 210 mg, 200 to 220 mg, 210 to 230 mg, 220 to 240 mg, 230 to 250 mg, 240 to 260 mg, 250 to 270 mg, 260 to 280 mg, 270 to 290 mg or 280 to 300 mg of the anti-IL-23A antibody.

In one embodiment, in any one of the methods above, the initial dose comprises 18, 20, 30, 40, 50, 60, 70, 80, 90, 100, 110, 120, 130, 140, 150, 160, 170, 180, 190, 200, 210, 220, 230, 240, 250, 260, 270, 280, 290 or 300 mg of the anti-IL-23A antibody. In one embodiment, in any one of the methods above, the initial dose comprises 75 mg of the anti-IL-23A antibody.

In one embodiment, in any one of the methods above, the first maintenance dose and the at least one additional maintenance dose comprise 18, 20, 30, 40, 50, 60, 70, 80, 90, 100, 110, 120, 130, 140, 150, 160, 170, 180, 190, 200, 210, 220, 230, 240, 250, 260, 270, 280, 290 or 300 mg of the anti-IL-23A antibody. In one embodiment, in any one of the methods above, the first maintenance dose and the at least one additional maintenance dose comprise 75 mg of the anti-IL-23A antibody.

In one embodiment, in any one of the methods above, the initial dose and the loading dose comprise 18, 20, 30, 40, 50, 60, 70, 80, 90, 100, 110, 120, 130, 140, 150, 160, 170, 180, 190, 200, 210, 220, 230, 240, 250, 260, 270, 280, 290 or 300 mg of the anti-IL-23A antibody. In one embodiment, in any one of the methods above, the initial dose and the loading dose comprise 75 mg of the anti-IL-23A antibody.

In one embodiment, in any one of the methods above, the initial dose, the loading dose, the first maintenance dose and the at least one additional maintenance dose comprise 18, 20, 30, 40, 50, 60, 70, 80, 90, 100, 110, 120, 130, 140, 150, 160, 170, 180, 190, 200, 210, 220, 230, 240, 250, 260, 270, 280, 290 or 300 mg of the anti-IL-23A antibody. In one embodiment, in any one of the methods above, the initial dose, the loading dose, the first maintenance dose and the at least one additional maintenance dose comprise 75 mg of the anti-IL-23A antibody.

In one embodiment, the present invention further provides a method for treating an inflammatory disease, in one aspect for treating psoriasis, psoriatic arthritis or axial (spinal) spondyloarthritis (ax-SpA), including ankylosing spondylitis and non-radiographic ax-SpA, comprising administering to a patient an anti-IL-23A antibody, said method comprising:
a) administering an initial dose of said anti-IL-23A antibody to the patient;
b) administering a loading dose of said anti-IL-23A antibody to the patient 4 weeks after said initial dose is administered;
c) administering a first maintenance dose of said anti-IL-23A antibody to the patient 12 weeks after said loading dose is administered; and
d) administering at least one additional maintenance dose to the patient 12 weeks after said first maintenance dose is administered.

In one embodiment, in said method, the initial dose, the loading dose and the maintenance dose comprise 150 mg of said anti-IL-23A antibody. In one embodiment, in said method, the initial dose and the loading dose comprise 300 mg of said anti-IL-23A antibody and the maintenance dose comprises 150 mg of said anti-IL-23A antibody. In one embodiment, in said method, the initial dose and the loading dose comprise 180 mg of said anti-IL-23A antibody and the maintenance dose comprises 90 mg of said anti-IL-23A antibody. In one embodiment, in said method, the initial dose, the loading dose and the maintenance dose comprise 75 mg of said anti-IL-23A antibody.

In one embodiment, the present invention further provides a method for treating an inflammatory disease, in one aspect for treating psoriasis, psoriatic arthritis or axial (spinal) spondyloarthritis (ax-SpA), including ankylosing spondylitis and non-radiographic ax-SpA, comprising administering to a patient an anti-IL-23A antibody, said method comprising:
a) administering an initial dose of said anti-IL-23A antibody to the patient;
b) administering a loading dose of said anti-IL-23A antibody to the patient 4 weeks after said initial dose is administered;
c) administering a first maintenance dose of said anti-IL-23A antibody to the patient 8 weeks after said loading dose is administered; and
d) administering at least one additional maintenance dose to the patient 8 weeks after said first maintenance dose is administered.

In one embodiment, in said method, the initial dose, the loading dose and the maintenance dose comprise 90 mg of said anti-IL-23A antibody. In one embodiment, in said method, the initial dose, the loading dose and the maintenance dose comprise 150 mg of said anti-IL-23A antibody.

In one embodiment, the present invention further provides a method for treating an inflammatory disease, in one aspect for treating psoriasis, psoriatic arthritis or axial (spinal) spondyloarthritis (ax-SpA), including ankylosing spondylitis and non-radiographic ax-SpA, comprising administering to a patient an anti-IL-23A antibody, said method comprising:

a) administering an initial dose of said anti-IL-23A antibody to the patient;
b) administering a loading dose of said anti-IL-23A antibody to the patient 4 weeks after said initial dose is administered;
c) administering a first maintenance dose of said anti-IL-23A antibody to the patient 16 weeks after said loading dose is administered; and
d) administering at least one additional maintenance dose to the patient 16 weeks after said first maintenance dose is administered.

In one embodiment, in said method, the initial dose, the loading dose and the maintenance dose comprise 150 mg of said anti-IL-23A antibody.

In one embodiment, the present invention further provides a method for treating an inflammatory disease, in one aspect for treating psoriasis, psoriatic arthritis or axial (spinal) spondyloarthritis (ax-SpA), including ankylosing spondylitis and non-radiographic ax-SpA, comprising administering to a patient an anti-IL-23A antibody, said method comprising:
a) administering an initial dose of said anti-IL-23A antibody to the patient;
b) administering a loading dose of said anti-IL-23A antibody to the patient 4 weeks after said initial dose is administered;
c) administering a first maintenance dose of said anti-IL-23A antibody to the patient 6 weeks after said loading dose is administered; and
d) administering at least one additional maintenance dose to the patient 6 weeks after said first maintenance dose is administered.

In one embodiment, in said method, the initial dose, the loading dose and the maintenance dose comprise 150 mg of said anti-IL-23A antibody.

In one embodiment, the present invention further provides a method for treating an inflammatory disease comprising administering to a patient 15 to 300 mg, for example 15 to 250 mg, for example 90 to 180 mg, of an anti-IL-23A antibody. In one embodiment, the inflammatory disease is psoriasis, psoriatic arthritis or axial (spinal) spondyloarthritis (ax-SpA), including ankylosing spondylitis and non-radiographic ax-SpA.

In one embodiment, the method comprises administering to a patient 70 to 90 mg, 80 to 100 mg, 90 to 110 mg, 100 to 120 mg, 110 to 130 mg, 120 to 140 mg, 130 to 150 mg, 140 to 160 mg, 150 to 170 mg, 160 to 180 mg, 170 to 190 mg, 180 to 200 mg, 190 to 210 mg, 200 to 220 mg, 210 to 230 mg, 220 to 240 mg, 230 to 250 mg, 240 to 260 mg, 250 to 270 mg, 260 to 280 mg, 270 to 290 mg or 280 to 300 mg of an anti-IL-23A antibody.

In one embodiment, the method comprises administering to a patient 18, 20, 30, 40, 50, 60, 70, 80, 90, 100, 110, 120, 130, 140, 150, 160, 170, 180, 190, 200, 210, 220, 230, 240, 250, 260, 270, 280, 290 or 300 mg of an anti-IL-23A antibody. In one embodiment, the method comprises administering to a patient 75 mg of an anti-IL-23A antibody.

In one embodiment, the anti-IL-23A antibody is administered as an an initial dose, a loading dose or a maintenance dose.

In one embodiment, the present invention further provides a method for treating an inflammatory disease, in one aspect for treating psoriasis or psoriatic arthritis, comprising administering to a patient an anti-IL-23A antibody, said method comprising:
a) administering an initial dose of said anti-IL-23A antibody to the patient; and b) administering a second dose of said anti-IL-23A antibody to the patient when the patient no longer maintains a certain PASI score, for example PASI 90, PASI 75, PASI 100 or PASI 50.

In one aspect, the initial dose and the second dose are doses as described herein.

In one embodiment, the present invention further provides a method for treating an inflammatory disease, in one aspect for treating psoriasis or psoriatic arthritis, comprising administering to a patient an anti-IL-23A antibody, said method comprising:
a) administering an initial dose of said anti-IL-23A antibody to the patient;
b) administering a loading dose of said anti-IL-23A antibody to the patient 1 to 6 weeks, for example 4 weeks, after said initial dose is administered; and
c) administering a third dose of said anti-IL-23A antibody to the patient when the patient no longer maintains a certain PASI score, for example PASI 90, PASI 75, PASI 100 or PASI 50.

In one aspect, the initial dose, the loading dose and the third dose are doses as described herein.

In one embodiment, in any one of the methods above, the anti-IL-23A antibody is Antibody A, Antibody B, Antibody C or Antibody D.

In one embodiment, in any one of the methods above, the method is for treating plaque psoriasis, for example chronic plaque psoriasis.

In one embodiment, in any one of the methods above, the method is for treating moderate to severe chronic plaque psoriasis, for example in a patient who is a candidate for systemic therapy or phototherapy.

In one embodiment, in any one of the methods above, the method is for treating moderate to severe chronic plaque psoriasis, for example in a patient who failed to respond to, or who has a contraindication to, or is intolerant to other systemic therapy including ciclosporin, methotrexate, psoralen or ultraviolet-A light (PUVA).

In one embodiment, in any one of the methods above, the method is for treating pustular psoriasis.

In one embodiment, in any one of the methods above, the method is for treating erythodermic psoriasis (also known as psoriatic erythroderma).

In one embodiment, in any one of the methods above, the method is for treating psoriatic arthritis, for example active psoriatic arthritis.

In one embodiment, the anti-IL-23A antibody is used alone or in combination with one or more non-biologic DMARDs (Disease-Modifying Antirheumatic Drug), for example for treating psoriatic arthritis, for example active psoriatic arthritis, for example to reduce signs and symptoms. In one embodiment, the anti-IL-23A antibody is used or indicated to inhibit the progression of structural damage, and/or improve physical function.

In one embodiment, the anti-IL-23A antibody is used alone or in combination with methotrexate (MTX), for example for the treatment of psoriatic arthritis, for example active psoriatic arthritis, for example when the response to previous non-biological DMARD therapy has been inadequate. In one aspect, the anti-IL-23A antibody is used to reduce the rate of progression of peripheral joint damage as measured by X-ray and/or to improve physical function.

In one embodiment, in any one of the methods above, the anti-IL-23A antibody is administered by subcutaneous administration.

In one aspect, in a method of the present invention, 90-180 mg of the anti-IL-23 antibody is administered to the patient every 6-12 weeks, for example every 8-12 weeks, with or without a loading dose.

In one embodiment, in any one of the methods above, the patient is an adult patient.

In one aspect, the present invention provides an anti-IL-23A antibody for use in the treatment of a disease as described herein.

In one aspect, the present invention provides an anti-IL-23A antibody for use in the treatment of a disease, for example an inflammatory disease, for example psoriasis, psoriatic arthritis or axial (spinal) spondyloarthritis (ax-SpA), including Ankylosing Spondylitis and non-radiographic ax-SpA, by administration in certain amounts and/or at certain intervals as described herein.

In one aspect, the present invention provides for the use of an anti-IL-23A antibody for the preparation of a medicament for the treatment of a disease as described herein.

In one aspect, the present invention provides for the use of an anti-IL-23A antibody for the preparation of a medicament for the treatment of a disease, for example an inflammatory disease, for example psoriasis, psoriatic arthritis or axial (spinal) spondyloarthritis (ax-SpA), including Ankylosing Spondylitis and non-radiographic ax-SpA, by administration in certain amounts and/or at certain intervals as described herein.

In one embodiment, in any one of the methods or uses above, the anti-IL-23A antibody is disclosed below.

In one embodiment, the anti-IL-23A antibody comprises a light chain variable region comprising the amino acid sequence of SEQ ID NO:1 (CDR1-L); the amino acid sequence of SEQ ID NO:2 (CDR2-L); and the amino acid sequence of SEQ ID NO:3 (CDR3-L); and a heavy chain variable region comprising the amino acid sequence of SEQ ID NO: 4, 7, 8 or 9 (CDR1-H); the amino acid sequence of SEQ ID NO:5 (CDR2-H); and the amino acid sequence of SEQ ID NO:6 (CDR3-H).

In one embodiment, the anti-IL-23A antibody comprises a light chain variable region comprising the amino acid sequence of SEQ ID NO:1 (CDR1-L); the amino acid sequence of SEQ ID NO:2 (CDR2-L); and the amino acid sequence of SEQ ID NO:3 (CDR3-L); and a heavy chain variable region comprising the amino acid sequence of SEQ ID NO:4 (CDR1-H); the amino acid sequence of SEQ ID NO:5 (CDR2-H); and the amino acid sequence of SEQ ID NO:6 (CDR3-H).

In one embodiment, the anti-IL-23A antibody comprises a light chain variable region comprising the amino acid sequence of SEQ ID NO:1 (CDR1-L); the amino acid sequence of SEQ ID NO:2 (CDR2-L); and the amino acid sequence of SEQ ID NO:3 (CDR3-L); and a heavy chain variable region comprising the amino acid sequence of SEQ ID NO:7 (CDR1-H); the amino acid sequence of SEQ ID NO:5 (CDR2-H); and the amino acid sequence of SEQ ID NO:6 (CDR3-H).

In one embodiment, the anti-IL-23A antibody comprises a light chain variable region comprising the amino acid sequence of SEQ ID NO:1 (CDR1-L); the amino acid sequence of SEQ ID NO:2 (CDR2-L); and the amino acid sequence of SEQ ID NO:3 (CDR3-L); and a heavy chain variable region comprising the amino acid sequence of SEQ ID NO:8 (CDR1-H); the amino acid sequence of SEQ ID NO:5 (CDR2-H); and the amino acid sequence of SEQ ID NO:6 (CDR3-H).

In one embodiment, the anti-IL-23A antibody comprises a light chain variable region comprising the amino acid sequence of SEQ ID NO:1 (CDR1-L); the amino acid sequence of SEQ ID NO:2 (CDR2-L); and the amino acid sequence of SEQ ID NO:3 (CDR3-L); and a heavy chain variable region comprising the amino acid sequence of SEQ ID NO:9 (CDR1-H); the amino acid sequence of SEQ ID NO:5 (CDR2-H); and the amino acid sequence of SEQ ID NO:6 (CDR3-H).

In one embodiment, the anti-IL-23A antibody comprises a light chain variable region comprising the amino acid sequence of any one of SEQ ID NO:10, 11, 12 or 13; and a heavy chain variable region comprising the amino acid sequence any one of SEQ ID NO:14, 15, 16 or 17.

In one embodiment, the anti-IL-23A antibody comprises a light chain variable region comprising the amino acid sequence of SEQ ID NO:11 and a heavy chain variable region comprising the amino acid sequence SEQ ID NO:14.

In one embodiment, the anti-IL-23A antibody comprises a light chain variable region comprising the amino acid sequence of SEQ ID NO:11 and a heavy chain variable region comprising the amino acid sequence SEQ ID NO:15.

In one embodiment, the anti-IL-23A antibody comprises a light chain variable region comprising the amino acid sequence of SEQ ID NO:10 and a heavy chain variable region comprising the amino acid sequence SEQ ID NO:14.

In one embodiment, the anti-IL-23A antibody comprises a light chain variable region comprising the amino acid sequence of SEQ ID NO:10 and a heavy chain variable region comprising the amino acid sequence SEQ ID NO:15.

In one embodiment, the anti-IL-23A antibody comprises the amino acid sequence SEQ ID NO:14 or 15 linked to a human IgG1, IgG2, IgG3, IgG4, IgM, IgA or IgE heavy chain constant region. In one embodiment, the anti-IL-23A antibody comprises the amino acid sequence of SEQ ID NO: 14 or 15 linked to a human IgG1 heavy chain constant region. In one embodiment, the anti-IL-23A antibody comprises the amino acid sequence of SEQ ID NO:10 or 11 linked to a human kappa or lambda light chain constant region.

In one embodiment, In one embodiment, the anti-IL-23A antibody comprises the amino acid sequence of SEQ ID NO:14 or 15 linked to a human IgG1 heavy chain constant region; and the amino acid sequence of SEQ ID NO: 10 or 11 linked to a human kappa light chain constant region.

In one embodiment, the anti-IL-23A antibody is a humanized monoclonal antibody comprising a light chain variable region comprising the amino acid sequence selected from the group consisting of any one of SEQ ID NO:10, 11, 12 and 13 and a heavy chain variable region comprising the amino acid sequence selected from the group consisting of any one of SEQ ID NO:14, 15, 16 and 17.

In one embodiment, the anti-IL-23A antibody is a humanized monoclonal antibody comprising a light chain variable region comprising the amino acid sequence of SEQ ID NO:11 and a heavy chain variable region comprising the amino acid sequence SEQ ID NO:14.

In one embodiment, the anti-IL-23A antibody is a humanized monoclonal antibody comprising a light chain variable region comprising the amino acid sequence of SEQ ID NO:11 and a heavy chain variable region comprising the amino acid sequence SEQ ID NO:15.

In one embodiment, the anti-IL-23A antibody is a humanized monoclonal antibody comprising a light chain variable region comprising the amino acid sequence of SEQ ID NO:10 and a heavy chain variable region comprising the amino acid sequence SEQ ID NO:14.

In one embodiment, the anti-IL-23A antibody is a humanized monoclonal antibody comprising a light chain variable region comprising the amino acid sequence of SEQ ID NO:10 and a heavy chain variable region comprising the amino acid sequence SEQ ID NO:15.

In one embodiment, the anti-IL-23A antibody comprises a light chain comprising the amino acid sequence of SEQ ID NO:18 or 21 and a heavy chain comprising the amino acid sequence of SEQ ID NO:19 or 20.

In one embodiment, the anti-IL-23A antibody comprises a light chain comprising the amino acid sequence of SEQ ID NO:18 and a heavy chain comprising the amino acid sequence of SEQ ID NO:19.

In one embodiment, the anti-IL-23A antibody comprises a light chain comprising the amino acid sequence of SEQ ID NO:18 and a heavy chain comprising the amino acid sequence of SEQ ID NO:20.

In one embodiment, the anti-IL-23A antibody comprises a light chain comprising the amino acid sequence of SEQ ID NO:21 and a heavy chain comprising the amino acid sequence of SEQ ID NO:19.

In one embodiment, the anti-IL-23A antibody comprises a light chain comprising the amino acid sequence of SEQ ID NO: 21 and a heavy chain comprising the amino acid sequence of SEQ ID NO: 20.

In one embodiment, the anti-IL-23A antibody is Antibody A, Antibody B, Antibody C or Antibody D.

In one embodiment, the anti-IL-23A antibody is as disclosed in WO2007/005955, WO2007/024846, WO2007/027714, WO2007/076524, WO2008/103432 or WO2012/061448.

DETAILED DESCRIPTION

Figure 1:
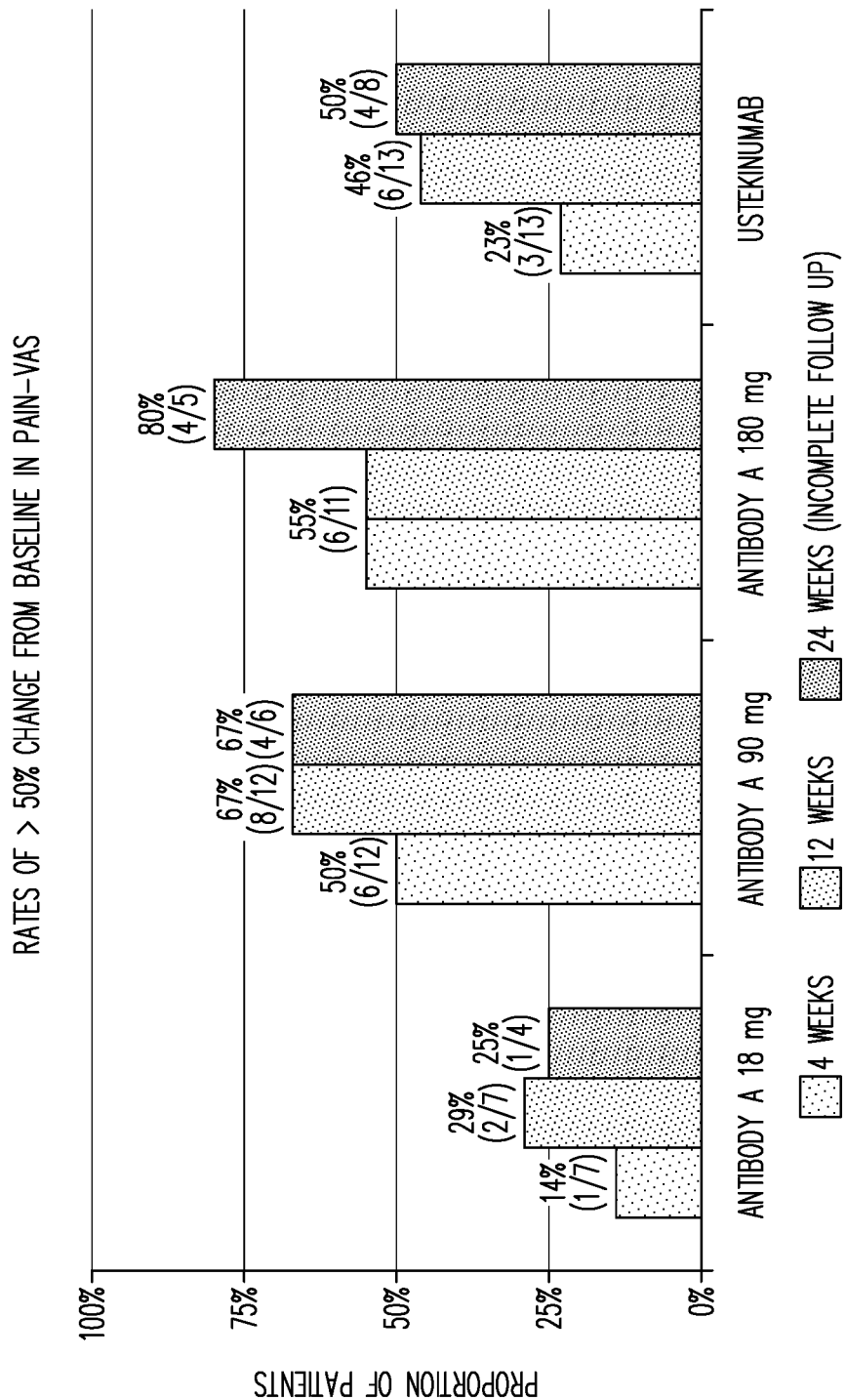
FIG. 1: Rate of patients with >50% reductions from baseline pain-VAS (%).

The p19 subunit of IL-23 (also referred to herein as "IL-23A", "IL-23p19" and "p19 subunit") is a 189 amino acid polypeptide containing a 21 aa leader sequence (Oppmann et al. Immunity 13:715 (2000), SEQ ID NO: 22). The biological activity of the molecule is only detected when it is partnered with the IL-12p40 subunit to form IL-23. IL-23 is predominantly expressed by activated dendritic cells (DCs) and phagocytic cells. The receptor for IL-23 was found to be composed of the IL-12Rβ1 subunit of IL-12 receptor partnered with a unique subunit called IL-23R (Parham et al. J. Immunol. 168:5699 (2002)). Expression of the receptor is detected primarily on memory T cells and NK cells. Thus, expression of this cytokine:receptor pair appears to be restricted to specific populations of immune cells. While it was first thought that IL-12 and IL-23 would share many functions, the data has shown the picture to be different. Whereas IL-12 has a predominant role in the production of Th1 cells, IL-23 was found to be critically involved in the production and maintenance of a recently recognized Th cell subset termed Th17 (Kikly et al. Curr. Opin. Immunol. 18:670 (2006), Kastelein et al. Ann. Rev. Immunol. 25:221 (2007)). These cells produce IL-17A, IL-17F, IL-22 and other pro-inflammatory cytokines such as IL-6 and TNF-α. As described below, animal model studies on the role of these Th17 cells show their importance as a driving force in chronic inflammation and autoimmunity.

```
SEQ ID NO: 22:
mlgsravmll lllpwtaqgr avpggsspaw tqcqqlsqkl ctlawsahpl vghmdlreeg deettndvph iqcgdgcdpq glrdnsqfcl qrihqglify ekllgsdift gepsllpdsp vgqlhasllg lsqllqpegh hwetqqipsl spsqpwqrll lrfkilrslq afvavaarvf ahgaatlsp
```

In one aspect, the present invention provides methods for the treatment of IL-23A related diseases. In one aspect, the present invention provides methods for treating a disease, for example an inflammatory disease, in particular methods comprising administering an anti-IL-23A antibody to a patient in certain amounts and/or at certain intervals. In one aspect, a method of the present invention is for the treatment of psoriasis or psoriatic arthritis. In one aspect, a method of the present invention is for the treatment of Ankylosing Spondylitis (AS). In one aspect, a method of the present invention is for the treatment axial (spinal) spondyloarthritis (ax-SpA), for example non-radiographic ax-SpA.

In one aspect, the present invention provides an anti-IL-23A antibody for use in the treatment of a disease, for example an inflammatory disease, for example psoriasis, psoriatic arthritis or axial (spinal) spondyloarthritis (ax-SpA), including Ankylosing Spondylitis and non-radiographic ax-SpA, by administration in certain amounts and/or at certain intervals as described herein.

In one aspect, the present invention provides for the use of an anti-IL-23A antibody for the preparation of a medicament for the treatment of a disease, for example an inflammatory disease, for example psoriasis, psoriatic arthritis or axial (spinal) spondyloarthritis (ax-SpA), including Ankylosing Spondylitis and non-radiographic ax-SpA, by administration in certain amounts and/or at certain intervals as described herein.

In one aspect, a method of the present invention comprises administering to the patient an initial dose of the anti-IL-23A antibody followed by the administration of one or more maintenances doses of the anti-IL-23A antibody. Optionally, a loading dose of the anti-IL-23A antibody is administered to the patient between the administration of the initial dose and the administration of the first maintenance dose.

In one aspect, in a method of the instant invention the interval between the administration of the initial dose and the first maintenance dose is 4 to 24 weeks, for example 4 to 16 weeks, for example 4 to 12 weeks, for example 4, 6, 8, 12, 16, 20 or 24 weeks. In another aspect, the interval between the administration of the first maintenance dose and the subsequent maintenance doses is 4 to 24 weeks, for example 4 to 16 weeks, for example 4 to 12 weeks, for example 4, 6, 8, 12, 16, 20 or 24 weeks.

In one aspect, in a method of the instant invention the interval between the administration of the initial dose and the first maintenance dose is 8 to 24 weeks, for example 8 to 16 weeks, for example 8 to 12 weeks, for example 6 to 24 weeks, for example 6 to 16 weeks, for example 6 to 12 weeks, for example 6, 8, 12, 16, 20 or 24 weeks. In another aspect, the interval between the administration of the first maintenance dose and the subsequent maintenance doses is 8 to 24 weeks, for example 8 to 16 weeks, for example 8 to 12 weeks, for example 6 to 24 weeks, for example 6 to 16 weeks, for example 6 to 12 weeks, for example 6, 8, 12, 16, 20 or 24 weeks.

In one aspect, in a method of the instant invention, the interval between the administration of the initial dose and the first maintenance dose and the interval between the administration of the first maintenance dose and the subsequent maintenance doses are the same, for example 4 to 24 weeks, for example 4 to 16 weeks, for example 4 to 12 weeks, for example 4, 6, 8, 12, 16, 20 or 24 weeks.

In one aspect, in a method of the instant invention, the interval between the administration of the initial dose and the first maintenance dose and the interval between the administration of the first maintenance dose and the subsequent maintenance doses are the same, for example 8 to 24 weeks, for example 8 to 16 weeks, for example 8 to 12 weeks, for example 6 to 24 weeks, for example 6 to 16 weeks, for example 6 to 12 weeks, for example 6, 8, 12, 16, 20 or 24 weeks.

In one aspect, in a method of the instant invention, a loading dose of the anti-IL-23A antibody is administered to the patient between the administration of the initial dose and the administration of the first maintenance doses.

In one aspect, the loading dose is administered to the patient 1, 2, 3, 4, 5 or 6 weeks after the adminstration of the initial dose. In one aspect, in a method of the instant invention the interval between the administration of the loading dose and the first maintenance dose is 8 to 24 weeks, for example 8 to 16 weeks, for example 8 to 12 weeks, for example 6 to 24 weeks, for example 6 to 16 weeks, for example 6 to 12 weeks, for example 6, 8, 12, 16, 20 or 24 weeks. In another aspect, the interval between the administration of the first maintenance dose and the subsequent maintenance doses is 8 to 24 weeks, for example 8 to 16 weeks, for example 8 to 12 weeks, for example 6 to 24 weeks, for example 6 to 16 weeks, for example 6 to 12 weeks, for example 6, 8, 12, 16, 20 or 24 weeks.

In one aspect, in a method of the instant invention, the interval between the administration of the loading dose and the first maintenance dose and the interval between the administration of the first maintenance dose and the subsequent maintenance doses are the same, for example 8 to 24 weeks, for example 8 to 16 weeks, for example 8 to 12 weeks, for example 6 to 24 weeks, for example 6 to 16 weeks, for example 6 to 12 weeks, for example 6, 8, 12, 16, 20 or 24 weeks.

In one aspect, the amount of anti-IL-23A antibody in the initial dose and in the maintenance dose is the same. In one aspect, the amount of anti-IL-23A antibody in the initial dose and in the loading dose is the same. In one aspect, the amount of anti-IL-23A antibody in the loading dose and in the maintenance dose is the same. In one aspect, the amount of anti-IL-23A antibody in the initial dose, in the loading dose and in the maintenance dose is the same.

In one aspect, the amount of anti-IL-23A antibody in the maintenance doses is lower than the amount of anti-IL-23A antibody in the initial dose and/or loading dose. In one aspect, the amount of anti-IL-23A antibody in the initial dose is twice the amount of anti-IL-23A antibody in the maintenance dose, for example in the absence of a loading dose. In one aspect, the amount of anti-IL-23A antibody in the initial dose and in the loading dose is twice the amount of anti-IL-23A antibody in the maintenance dose.

In one aspect, in a method of the present invention, the initial dose comprises 15 to 300 mg, for example 15 to 250 mg of the anti-IL-23A antibody. In another aspect, the maintenance doses comprise 15 to 300 mg, for example 15 to 250 mg of the anti-IL-23A antibody. In another aspect, if a loading dose is administered, such loading dose comprises 15 to 300 mg, for example 15 to 250 mg of the anti-IL-23A antibody.

In a further aspect, an initial dose, a loading dose or a maintenance dose according to the present invention comprises 70 to 90 mg, 80 to 100 mg, 90 to 110 mg, 100 to 120 mg, 110 to 130 mg, 120 to 140 mg, 130 to 150 mg, 140 to 160 mg, 150 to 170 mg, 160 to 180 mg, 170 to 190 mg, 180 to 200 mg, 190 to 210 mg, 200 to 220 mg, 210 to 230 mg, 220 to 240 mg, 230 to 250 mg, 240 to 260 mg, 250 to 270 mg, 260 to 280 mg, 270 to 290 mg or 280 to 300 mg of the anti-IL-23A antibody.

In a further aspect, an initial dose, a loading dose or a maintenance dose according to the present invention comprises 18, 20, 30, 40, 50, 60, 70, 80, 90, 100, 110, 120, 130, 140, 150, 160, 170, 180, 190, 200, 210, 220, 230, 240, 250, 260, 270, 280, 290 or 300 mg of the anti-IL-23A antibody. In a further aspect, an initial dose, a loading dose or a maintenance dose according to the present invention comprises 75 mg of the anti-IL-23A antibody.

In a further aspect, the present invention provides a method for treating an inflammatory disease, said method comprising administering to a patient 15 to 250 mg of an anti-IL-23A antibody. In one aspect, 70 to 90 mg, 80 to 100 mg, 90 to 110 mg, 100 to 120 mg, 110 to 130 mg, 120 to 140 mg, 130 to 150 mg, 140 to 160 mg, 150 to 170 mg, 160 to 180 mg, 170 to 190 mg, 180 to 200 mg, 190 to 210 mg, 200 to 220 mg, 210 to 230 mg, 220 to 240 mg, 230 to 250 mg, 240 to 260 mg, 250 to 270 mg, 260 to 280 mg, 270 to 290 mg or 280 to 300 mg of the anti-IL-23A antibody is administered to the patient. In one aspect, 18, 20, 30, 40, 50, 60, 70, 80, 90, 100, 110, 120, 130, 140, 150, 160, 170, 180, 190, 200, 210, 220, 230, 240, 250, 260, 270, 280, 290 or 300 mg of the anti-IL-23A antibody is administered to the patient. In one aspect, 75 mg of the anti-IL-23A antibody is administered to the patient. In one aspect, the disease is psoriasis or psoriatic arthritis. In one aspect, the disease is axial (spinal) spondyloarthritis (ax-SpA), including ankylosing spondylitis and non-radiographic ax-SpA.

In one aspect, in a method of the present invention, 90-180 mg of the anti-IL-23 antibody is administered to the patient every 6-12 weeks, for example every 8-12 weeks, with or without a loading dose.

Representative examples of doses and dose regimens according to the present invention are disclosed in Table A.

TABLE A doses and dose regimens

| Initial dose (mg) | Loading dose (mg, 4 weeks after initial dose) | Maintenance dose (mg) | Frequency of maintenance doses | Alternative frequencies of maintenance doses |
|---|---|---|---|---|
| 90 | x | 90 | Every 12 weeks | Every 6, 8, 16, 20 or 24 weeks |
| 90 | 90 | 90 | Every 12 weeks | Every 6, 8, 16, 20 or 24 weeks |
| 180 | x | 180 | Every 12 weeks | Every 6, 8, 16, 20 or 24 weeks |
| 180 | 180 | 180 | Every 12 weeks | Every 6, 8, 16, 20 or 24 weeks |
| 150 | x | 150 | Every 12 weeks | Every 6, 8, 16, 20 or 24 weeks |
| 150 | 150 | 150 | Every 12 weeks | Every 6, 8, 16, 20 or 24 weeks |

TABLE A-continued doses and dose regimens

| Initial dose (mg) | Loading dose (mg, 4 weeks after initial dose) | Maintenance dose (mg) | Frequency of maintenance doses | Alternative frequencies of maintenance doses |
|---|---|---|---|---|
| 140 | x | 140 | Every 12 weeks | Every 6, 8, 16, 20 or 24 weeks |
| 140 | 140 | 140 | Every 12 weeks | Every 6, 8, 16, 20 or 24 weeks |
| 130 | x | 130 | Every 12 weeks | Every 6, 8, 16, 20 or 24 weeks |
| 130 | 130 | 130 | Every 12 weeks | Every 6, 8, 16, 20 or 24 weeks |
| 120 | x | 120 | Every 12 weeks | Every 6, 8, 16, 20 or 24 weeks |
| 120 | 120 | 120 | Every 12 weeks | Every 6, 8, 16, 20 or 24 weeks |
| 110 | x | 110 | Every 12 weeks | Every 6, 8, 16, 20 or 24 weeks |
| 110 | 110 | 110 | Every 12 weeks | Every 6, 8, 16, 20 or 24 weeks |
| 100 | x | 100 | Every 12 weeks | Every 6, 8, 16, 20 or 24 weeks |
| 100 | 100 | 100 | Every 12 weeks | Every 6, 8, 16, 20 or 24 weeks |
| 160 | x | 160 | Every 12 weeks | Every 6, 8, 16, 20 or 24 weeks |
| 160 | 160 | 160 | Every 12 weeks | Every 6, 8, 16, 20 or 24 weeks |
| 170 | x | 170 | Every 12 weeks | Every 6, 8, 16, 20 or 24 weeks |
| 170 | 170 | 170 | Every 12 weeks | Every 6, 8, 16, 20 or 24 weeks |
| 190 | x | 190 | Every 12 weeks | Every 6, 8, 16, 20 or 24 weeks |
| 190 | 190 | 190 | Every 12 weeks | Every 6, 8, 16, 20 or 24 weeks |
| 200 | x | 200 | Every 12 weeks | Every 6, 8, 16, 20 or 24 weeks |
| 200 | 200 | 200 | Every 12 weeks | Every 6, 8, 16, 20 or 24 weeks |
| 210 | 210 | 210 | Every 12 weeks | Every 6, 8, 16, 20 or 24 weeks |
| 220 | 220 | 220 | Every 12 weeks | Every 6, 8, 16, 20 or 24 weeks |
| 230 | 230 | 230 | Every 12 weeks | Every 6, 8, 16, 20 or 24 weeks |
| 240 | 240 | 240 | Every 12 weeks | Every 6, 8, 16, 20 or 24 weeks |
| 250 | 250 | 250 | Every 12 weeks | Every 6, 8, 16, 20 or 24 weeks |
| 260 | 260 | 260 | Every 12 weeks | Every 6, 8, 16, 20 or 24 weeks |
| 270 | 270 | 270 | Every 12 weeks | Every 6, 8, 16, 20 or 24 weeks |
| 280 | 280 | 280 | Every 12 weeks | Every 6, 8, 16, 20 or 24 weeks |
| 290 | 290 | 290 | Every 12 weeks | Every 6, 8, 16, 20 or 24 weeks |
| 300 | 300 | 300 | Every 12 weeks | Every 6, 8, 16, 20 or 24 weeks | x: no loading dose administered.

In Table A when a loading dose is administered, it is indicated as being administered 4 weeks after the initial dose.

It is also within the scope of the instant invention to administer the loading dose 1 week after the initial dose for each of the doses and frequencies of maintenance doses identified in the above table.

It is also within the scope of the instant invention to administer the loading dose 2 week after the initial dose for each of the doses and frequencies of maintenance doses identified in the above table.

It is also within the scope of the instant invention to administer the loading dose 3 week after the initial dose for each of the doses and frequencies of maintenance doses identified in the above table.

It is also within the scope of the instant invention to administer the loading dose 5 week after the initial dose for each of the doses and frequencies of maintenance doses identified in the above table.

It is also within the scope of the instant invention to administer the loading dose 6 week after the initial dose for each of the doses and frequencies of maintenance doses identified in the above table.

For example, in the context of the present invention, if no loading dose is administered to the patient, and with a frequency of administration of the maintenance doses of 12 weeks, the initial dose is administered to the patient at week 0, followed by a further administration at week 12 (first maintenance dose), then at week 24 (second maintenance dose) and so on at dosing intervals of 12 weeks. In one aspect, the initial dose and the maintenance doses comprise 150 mg of the anti-IL-23A antibody. In one aspect, the initial dose and the maintenance doses comprise 75 mg of the anti-IL-23A antibody.

For example, in the context of the present invention, if a loading dose is administered to the patient, and with a frequency of administration of the maintenance doses of 12 weeks, the initial dose is administered to the patient at week 0, followed by a further administration at week 4 (loading dose), then at week 16 (first maintenance dose), at week 28 (second maintenance dose) and so on at dosing intervals of 12 weeks. In one aspect, the initial dose, the loading dose and the maintenance doses comprise 150 mg of the anti-IL-23A antibody. In one aspect, the initial dose and the loading dose comprise 300 mg of the anti-IL-23A antibody and the maintenance doses comprise 150 mg of the anti-IL-23A antibody. In one aspect, the initial dose and the loading dose comprise 180 mg of the anti-IL-23A antibody and the maintenance doses comprise 90 mg of the anti-IL-23A antibody. In one aspect, the initial dose, the loading dose and the maintenance doses comprise 75 mg of the anti-IL-23A antibody.

For example, in the context of the present invention, if no loading dose is administered to the patient, and with a frequency of administration of the maintenance doses of 8 weeks, the initial dose is administered to the patient at week 0, followed by a further administration at week 8 (first maintenance dose), then at week 16 (second maintenance dose) and so on at dosing intervals of 8 weeks. In one aspect, the initial dose and the maintenance doses comprise 90 mg of the anti-IL-23A antibody. In one aspect, the initial dose and the maintenance doses comprise 150 mg of the anti-IL-23A antibody.

For example, in the context of the present invention, if a loading dose is administered to the patient, and with a frequency of administration of the maintenance doses of 8 weeks, the initial dose is administered to the patient at week 0, followed by a further administration at week 4 (loading dose), then at week 12 (first maintenance dose), at week 20 (second maintenance dose) and so on at dosing intervals of 8 weeks. In one aspect, the initial dose, the loading dose and the maintenance doses comprise 90 mg of the anti-IL-23A antibody. In one aspect, the initial dose, the loading dose and the maintenance doses comprise 150 mg of the anti-IL-23A antibody.

For example, in the context of the present invention, if no loading dose is administered to the patient, and with a frequency of administration of the maintenance doses of 16 weeks, the initial dose is administered to the patient at week 0, followed by a further administration at week 16 (first maintenance dose), then at week 32 (second maintenance dose) and so on at dosing intervals of 16 weeks. In one aspect, the initial dose and the maintenance doses comprise 150 mg of the anti-IL-23A antibody.

For example, in the context of the present invention, if a loading dose is administered to the patient, and with a frequency of administration of the maintenance doses of 16 weeks, the initial dose is administered to the patient at week 0, followed by a further administration at week 4 (loading dose), then at week 20 (first maintenance dose), at week 36 (second maintenance dose) and so on at dosing intervals of 16 weeks. In one aspect, the initial dose, the loading dose and the maintenance doses comprise 150 mg of the anti-IL-23A antibody.

For example, in the context of the present invention, if no loading dose is administered to the patient, and with a frequency of administration of the maintenance doses of 6 weeks, the initial dose is administered to the patient at week 0, followed by a further administration at week 6 (first maintenance dose), then at week 12 (second maintenance dose) and so on at dosing intervals of 6 weeks. In one aspect, the initial dose and the maintenance doses comprise 150 mg of the anti-IL-23A antibody.

For example, in the context of the present invention, if a loading dose is administered to the patient, and with a frequency of administration of the maintenance doses of 6 weeks, the initial dose is administered to the patient at week 0, followed by a further administration at week 4 (loading dose), then at week 10 (first maintenance dose), at week 16 (second maintenance dose) and so on at dosing intervals of 6 weeks. In one aspect, the initial dose, the loading dose and the maintenance doses comprise 150 mg of the anti-IL-23A antibody.

For example, in the context of the present invention, if the frequency of administration of the maintenance doses is 4 weeks, the initial dose is administered to the patient at week 0, followed by a further administration at week 4 (first maintenance dose), then at week 8 (second maintenance dose), at week 12 (third maintenance dose) and so on at dosing intervals of 4 weeks. In one aspect, the initial dose and the maintenance doses comprise 150 mg of the anti-IL-23A antibody.

In a further aspect, in a method according to the present invention, an initial dose of an anti-IL-23 antibody is administered to the patient. A second dose of the anti-IL-23 antibody is not administered to the patient as long as the therapeutic benefit of the initial dose is maintained, for example as assessed by PASI score, for example PASI 90, PASI 75, PASI 100 or PASI 50, but a second dose is administered to the patient when the disease severity increases above a certain level, for example when the patient no longer maintains a certain PASI score, e.g. PASI 90, PASI 75, PASI 100 or PASI 50. The initial dose and the second dose of the anti-IL-23 antibody are for example doses as described herein. In one aspect, the patient is monitored after the initial dose is administered, for example by assessing the PASI score of the patient. In one aspect, a third dose of the anti-IL-23 antibody is administered to the patient when the patient no longer maintains a certain PASI score, e.g. PASI 90, PASI 75, PASI 100 or PASI 50, after the administration of the second dose. The third dose of the anti-IL-23 antibody is for example a dose as described herein, for example the same dose as the second dose. In one aspect, the patient is monitored after the second dose is administered, for example by assessing the PASI score of the patient. In a further aspect, at least one additional dose is administered to the patient in such a way.

In a further aspect, in a method according to the present invention, a loading dose of the anti-IL-23 antibody is administered to the patient after the administration of the initial dose, for example after a time period as described herein. A third dose of the anti-IL-23 antibody is not administered to the patient as long as the therapeutic benefit of the initial dose is maintained, for example as assessed by PASI score, for example PASI 90, PASI 75, PASI 100 or PASI 50, but a third dose is administered to the patient when the disease severity increases above a certain level, for example when the patient no longer maintains a certain PASI score, e.g. PASI 90, PASI 75, PASI 100 or PASI 50. In one aspect, the loading dose of the anti-IL-23 antibody is a dose as described herein. In one aspect, a fourth dose of the anti-IL-23 antibody is administered to the patient when the patient no longer maintains a certain PASI score, e.g. PASI 90, PASI 75, PASI 100 or PASI 50, after administration of the third dose. The fourth dose of the anti-IL-23 antibody is for example a dose as described herein, for example the same dose as the third dose. In one aspect, the patient is monitored after the third dose is administered, for example by assessing the PASI score of the patient. In a further aspect, at least one additional dose is administered to the patient in such a way.

Accordingly, In one embodiment, the present invention further provides a method for treating an inflammatory disease, in one aspect for treating psoriasis or psoriatic arthritis, comprising administering to a patient an anti-IL-23A antibody, said method comprising:
  a) administering an initial dose of said anti-IL-23A antibody to the patient; and
  b) administering a second dose of said anti-IL-23A antibody to the patient when the patient no longer maintains PASI 90, PASI 75, PASI 100 or PASI 50.

In one aspect, the amount of anti-IL-23A antibody in the second and following doses is lower than the amount of anti-IL-23A antibody in the initial dose. In one aspect, the amount of anti-IL-23A antibody in the initial dose is twice the amount of anti-IL-23A antibody in the second and following doses.

In one embodiment, the present invention further provides a method for treating an inflammatory disease, in one aspect for treating psoriasis or psoriatic arthritis, comprising administering to a patient an anti-IL-23A antibody, said method comprising:
  a) administering an initial dose of said anti-IL-23A antibody to the patient;
  b) administering a loading dose of said anti-IL-23A antibody to the patient 1 to 6 weeks, for example 4 weeks, after said initial dose is administered; and
  c) administering a third dose of said anti-IL-23A antibody to the patient when the patient no longer maintains PASI 90, PASI 75, PASI 100 or PASI 50.

In one aspect, the amount of anti-IL-23A antibody in the third and following doses is lower than the amount of anti-IL-23A antibody in the initial dose and/or loading dose. In one aspect, the amount of anti-IL-23A antibody in the initial dose is twice the amount of anti-IL-23A antibody in the third and following doses. In one aspect, the amount of anti-IL-23A antibody in the initial dose and in the loading dose is twice the amount of anti-IL-23A antibody in the third and following doses.

In one embodiment, an anti-IL-23A antibody in any one of the methods above is disclosed herein.

In one aspect, in any one of the methods above, a pharmaceutical composition comprising an anti-IL-23A antibody is administered to the patient. In one aspect, formulation 2 disclosed in Example 4 comprising an anti-IL-23A antibody, for example Antibody A, Antibody B, Antibody C or Antibody D is administered to the patient. In one aspect, formulation 3 disclosed in Example 4 comprising an anti-IL-23A antibody, for example Antibody A, Antibody B, Antibody C or Antibody D is administered to the patient.

In one aspect, the anti-IL-23A antibody is a humanized antibody. In one aspect, the anti-IL-23A antibody is a monoclonal antibody. In one aspect, the anti-IL-23A antibody is a full length antibody. In one aspect, the anti-IL-23A antibody is a humanized monoclonal antibody, for example a full length humanized monoclonal antibody.

An antibody described herein recognizes specific "IL-23A antigen epitope" or " IL-23A epitope". As used herein these terms refer to a molecule (e.g., a peptide) or a fragment of a molecule capable of immunoreactivity with an anti-IL-23A antibody and, for example, include an IL-23A antigenic determinant recognized by any of the antibodies having a light chain/heavy chain sequence combination of SEQ ID NO:11/14, 11/15, 10/14 or 10/15.

The generalized structure of antibodies or immunoglobulin is well known to those of skill in the art. These molecules are heterotetrameric glycoproteins, typically of about 150,000 daltons, composed of two identical light (L) chains and two identical heavy (H) chains and are typically referred to as full length antibodies. Each light chain is covalently linked to a heavy chain by one disulfide bond to form a heterodimer, and the heterotrameric molecule is formed through a covalent disulfide linkage between the two identical heavy chains of the heterodimers. Although the light and heavy chains are linked together by one disulfide bond, the number of disulfide linkages between the two heavy chains varies by immunoglobulin isotype. Each heavy and light chain also has regularly spaced intrachain disulfide bridges. Each heavy chain has at the amino-terminus a variable domain ($V_H$), followed by three or four constant domains ($C_{H1}$, $C_{H2}$, $C_{H3}$, and $C_{H4}$), as well as a hinge region between $C_{H1}$ and $C_{H2}$. Each light chain has two domains, an amino-terminal variable domain ($V_L$) and a carboxy-terminal constant domain ($C_L$). The $V_L$ domain associates non-covalently with the $V_H$ domain, whereas the $C_L$ domain is commonly covalently linked to the $C_{H1}$ domain via a disulfide bond. Particular amino acid residues are believed to form an interface between the light and heavy chain variable domains (Chothia et al., 1985, J. Mol. Biol. 186:651-663). Variable domains are also referred herein as variable regions.

Certain domains within the variable domains differ extensively between different antibodies i.e., are "hypervariable." These hypervariable domains contain residues that are directly involved in the binding and specificity of each particular antibody for its specific antigenic determinant. Hypervariability, both in the light chain and the heavy chain variable domains, is concentrated in three segments known as complementarity determining regions (CDRs) or hypervariable loops (HVLs). CDRs are defined by sequence comparison in Kabat et al., 1991, In: Sequences of Proteins of Immunological Interest, 5$^{th}$ Ed. Public Health Service, National Institutes of Health, Bethesda, Md., whereas HVLs (also referred herein as CDRs) are structurally defined according to the three-dimensional structure of the variable domain, as described by Chothia and Lesk, 1987, J. Mol. Biol. 196: 901-917. These two methods result in slightly different identifications of a CDR. As defined by Kabat, CDR-L1 is positioned at about residues 24-34, CDR-L2, at about residues 50-56, and CDR-L3, at about residues 89-97 in the light chain variable domain; CDR-H1 is positioned at about residues 31-35, CDR-H2 at about residues 50-65, and CDR-H3 at about residues 95-102 in the heavy chain variable domain. The exact residue numbers that encompass a particular CDR will vary depending on the sequence and size of the CDR. Those skilled in the art can routinely determine which residues comprise a particular CDR given the variable region amino acid sequence of the antibody. The CDR1, CDR2, CDR3 of the heavy and light chains therefore define the unique and functional properties specific for a given antibody.

The three CDRs within each of the heavy and light chains are separated by framework regions (FR), which contain sequences that tend to be less variable. From the amino terminus to the carboxy terminus of the heavy and light chain variable domains, the FRs and CDRs are arranged in the order: FR1, CDR1, FR2, CDR2, FR3, CDR3, and FR4. The largely β-sheet configuration of the FRs brings the CDRs within each of the chains into close proximity to each other as well as to the CDRs from the other chain. The resulting conformation contributes to the antigen binding site (see Kabat et al., 1991, NIH Publ. No. 91-3242, Vol. I, pages 647-669), although not all CDR residues are necessarily directly involved in antigen binding.

FR residues and Ig constant domains are not directly involved in antigen binding, but contribute to antigen binding and/or mediate antibody effector function. Some FR residues are thought to have a significant effect on antigen binding in at least three ways: by noncovalently binding directly to an epitope, by interacting with one or more CDR residues, and by affecting the interface between the heavy and light chains. The constant domains are not directly involved in antigen binding but mediate various Ig effector functions, such as participation of the antibody in antibody dependent cellular cytotoxicity (ADCC), complement dependent cytotoxicity (CDC) and antibody dependent cellular phagocytosis (ADCP).

The light chains of vertebrate immunoglobulins are assigned to one of two clearly distinct classes, kappa (κ) and lambda (λ), based on the amino acid sequence of the constant domain. By comparison, the heavy chains of mammalian immunoglobulins are assigned to one of five major classes, according to the sequence of the constant domains: IgA, IgD, IgE, IgG, and IgM. IgG and IgA are further divided into subclasses (isotypes), e.g., IgG$_1$, IgG$_2$, IgG$_3$, IgG$_4$, IgA$_1$, and IgA$_2$. The heavy chain constant domains that correspond to the different classes of immunoglobulins are called α, δ, ε, γ, and μ, respectively. The subunit structures and three-dimensional configurations of the classes of native immunoglobulins are well known.

The terms, "antibody", "anti-IL-23A antibody", "anti-IL-23p19 antibody", "humanized anti-IL-23A antibody", "humanized anti-IL-23p19 antibody", "humanized anti-IL-23A epitope antibody", "humanized anti-IL-2319 epitope antibody", "variant humanized anti-IL-23A epitope antibody" and "variant humanized anti-IL-23p19 epitope antibody" specifically encompass monoclonal antibodies (including full length monoclonal antibodies), polyclonal antibodies, and antibody fragments such as variable domains and other portions of antibodies that exhibit a desired biological activity, e.g., IL-23A binding. The term "monoclonal antibody" (mAb) refers to an antibody that is highly specific, being directed against a single antigenic determinant, an "epitope". Therefore, the modifier "monoclonal" is indicative of antibodies directed to the identical epitope and is not to be construed as requiring production of the antibody by any particular method. It should be understood that monoclonal antibodies can be made by any technique or methodology known in the art; including e.g., the hybridoma method (Kohler et al., 1975, Nature 256:495), or recombinant DNA methods known in the art (see, e.g., U.S. Pat. No. 4,816,567), or methods of isolation of monoclonal recombinantly produced using phage antibody libraries, using techniques described in Clackson et al., 1991, Nature 352: 624-628, and Marks et al., 1991, J. Mol. Biol. 222: 581-597.

The term "monomer" refers to a homogenous form of an antibody. For example, for a full-length antibody, monomer means a monomeric antibody having two identical heavy chains and two identical light chains.

Chimeric antibodies consist of the heavy and light chain variable regions of an antibody from one species (e.g., a non-human mammal such as a mouse) and the heavy and light chain constant regions of another species (e.g., human) antibody and can be obtained by linking the DNA sequences encoding the variable regions of the antibody from the first species (e.g., mouse) to the DNA sequences for the constant regions of the antibody from the second (e.g. human) species and transforming a host with an expression vector containing the linked sequences to allow it to produce a chimeric antibody. Alternatively, the chimeric antibody also could be one in which one or more regions or domains of the heavy and/or light chain is identical with, homologous to, or a variant of the corresponding sequence in a monoclonal antibody from another immunoglobulin class or isotype, or from a consensus or germline sequence. Chimeric antibodies can include fragments of such antibodies, provided that the antibody fragment exhibits the desired biological activity of its parent antibody, for example binding to the same epitope (see, e.g., U.S. Pat. No. 4,816,567; and Morrison et al., 1984, Proc. Natl. Acad. Sci. USA 81: 6851-6855).

The terms, "antibody fragment", "anti-IL-23A antibody fragment", "anti-IL-23A epitope antibody fragment", "humanized anti-IL-23A antibody fragment", "humanized anti-IL-23A epitope antibody fragment", "variant humanized anti-IL-23A epitope antibody fragment" refer to a portion of a full length anti-IL-23A antibody, in which a variable region or a functional capability is retained, for example, specific IL-23A epitope binding. Examples of antibody fragments include, but are not limited to, a Fab, Fab', F(ab')$_2$, Fd, Fv, scFv and scFv-Fc fragment.

Full length antibodies can be treated with enzymes such as papain or pepsin to generate useful antibody fragments. Papain digestion is used to produces two identical antigen-binding antibody fragments called "Fab" fragments, each with a single antigen-binding site, and a residual "Fc" fragment. The Fab fragment also contains the constant domain of the light chain and the $C_{H1}$ domain of the heavy chain. Pepsin treatment yields a F(ab')$_2$ fragment that has two antigen-binding sites and is still capable of cross-linking antigen.

Fab' fragments differ from Fab fragments by the presence of additional residues including one or more cysteines from the antibody hinge region at the C-terminus of the $C_{H1}$ domain. F(ab')$_2$ antibody fragments are pairs of Fab' fragments linked by cysteine residues in the hinge region. Other chemical couplings of antibody fragments are also known.

"Fv" fragment contains a complete antigen-recognition and binding site consisting of a dimer of one heavy and one light chain variable domain in tight, non-covalent association. In this configuration, the three CDRs of each variable domain interact to define an antigen-biding site on the surface of the $V_H$-$V_L$ dimer. Collectively, the six CDRs confer antigen-binding specificity to the antibody.

A "single-chain Fv" or "scFv" antibody fragment is a single chain Fv variant comprising the $V_H$ and $V_L$ domains of an antibody where the domains are present in a single polypeptide chain. The single chain Fv is capable of recognizing and binding antigen. The scFv polypeptide may optionally also contain a polypeptide linker positioned between the $V_H$ and $V_L$ domains in order to facilitate formation of a desired three-dimensional structure for antigen binding by the scFv (see, e.g., Pluckthun, 1994, In The Pharmacology of monoclonal Antibodies, Vol. 113, Rosenburg and Moore eds., Springer-Verlag, New York, pp. 269-315).

A "humanized antibody" or a "humanized antibody fragment" is a specific type of chimeric antibody which includes an immunoglobulin amino acid sequence variant, or fragment thereof, which is capable of binding to a predetermined antigen and which, comprises one or more FRs having substantially the amino acid sequence of a human immunoglobulin and one or more CDRs having substantially the amino acid sequence of a non-human immunoglobulin. This non-human amino acid sequence often referred to as an "import" sequence is typically taken from an "import" antibody domain, particularly a variable domain. In general, a humanized antibody includes at least the CDRs or HVLs of a non-human antibody, inserted between the FRs of a human heavy or light chain variable domain. The present invention describes specific humanized anti-IL-23A antibodies which contain CDRs derived from the mouse monoclonal antibodies or humanized CDRs shown in Tables 1 and 2 inserted between the FRs of human germline sequence heavy and light chain variable domains. It will be understood that certain mouse FR residues may be important to the function of the humanized antibodies and therefore certain of the human germline sequence heavy and light chain variable domains residues are modified to be the same as those of the corresponding mouse sequence.

In another aspect, a humanized anti-IL-23A antibody comprises substantially all of at least one, and typically two, variable domains (such as contained, for example, in Fab, Fab', F(ab')2, Fabc, and Fv fragments) in which all, or substantially all, of the CDRs correspond to those of a non-human immunoglobulin, and specifically herein, all of the CDRs are mouse or humanized sequences as detailed in Tables 1 and 2 herein below and all, or substantially all, of the FRs are those of a human immunoglobulin consensus or germline sequence. In another aspect, a humanized anti-IL-23A antibody also includes at least a portion of an immunoglobulin Fc region, typically that of a human immunoglobulin. Ordinarily, the antibody will contain both the light chain as well as at least the variable domain of a heavy chain. The antibody also may include one or more of the $C_{H1}$, hinge, $C_{H2}$, $C_{H3}$, and/or $C_{H4}$ regions of the heavy chain, as appropriate.

A humanized anti-IL-23A antibody can be selected from any class of immunoglobulins, including IgM, IgG, IgD, IgA and IgE, and any isotype, including $IgG_1$, $IgG_2$, $IgG_3$, $IgG_4$, $IgA_1$ and $IgA_2$. For example, the constant domain can be a complement fixing constant domain where it is desired that the humanized antibody exhibit cytotoxic activity, and the isotype is typically $IgG_1$. Where such cytotoxic activity is not desirable, the constant domain may be of another isotype, e.g., IgG$_2$. An alternative humanized anti-IL-23A antibody can comprise sequences from more than one immunoglobulin class or isotype, and selecting particular constant domains to optimize desired effector functions is within the ordinary skill in the art. In specific embodiments, the present invention provides antibodies that are IgG1 antibodies and more particularly, are IgG1 antibodies in which there is a knock-out of effector functions.

The FRs and CDRs, or HVLs, of a humanized anti-IL-23A antibody need not correspond precisely to the parental sequences. For example, one or more residues in the import CDR, or HVL, or the consensus or germline FR sequence may be altered (e.g., mutagenized) by substitution, insertion or deletion such that the resulting amino acid residue is no longer identical to the original residue in the corresponding position in either parental sequence but the antibody nevertheless retains the function of binding to IL-23A. Such alteration typically will not be extensive and will be conservative alterations. Usually, at least 75% of the humanized antibody residues will correspond to those of the parental consensus or germline FR and import CDR sequences, more often at least 90%, and most frequently greater than 95%, or greater than 98% or greater than 99%.

Immunoglobulin residues that affect the interface between heavy and light chain variable regions ("the $V_L$-$V_H$ interface") are those that affect the proximity or orientation of the two chains with respect to one another. Certain residues that may be involved in interchain interactions include $V_L$ residues 34, 36, 38, 44, 46, 87, 89, 91, 96, and 98 and $V_H$ residues 35, 37, 39, 45, 47, 91, 93, 95, 100, and 103 (utilizing the numbering system set forth in Kabat et al., Sequences of Proteins of Immunological Interest (National Institutes of Health, Bethesda, Md., 1987)). U.S. Pat. No. 6,407,213 also discusses that residues such as $V_L$ residues 43 and 85, and $V_H$ residues 43 and 60 also may be involved in this interaction. While these residues are indicated for human IgG only, they are applicable across species. Important antibody residues that are reasonably expected to be involved in interchain interactions are selected for substitution into the consensus sequence.

The terms "consensus sequence" and "consensus antibody" refer to an amino acid sequence which comprises the most frequently occurring amino acid residue at each location in all immunoglobulins of any particular class, isotype, or subunit structure, e.g., a human immunoglobulin variable domain. The consensus sequence may be based on immunoglobulins of a particular species or of many species. A "consensus" sequence, structure, or antibody is understood to encompass a consensus human sequence as described in certain embodiments, and to refer to an amino acid sequence which comprises the most frequently occurring amino acid residues at each location in all human immunoglobulins of any particular class, isotype, or subunit structure. Thus, the consensus sequence contains an amino acid sequence having at each position an amino acid that is present in one or more known immunoglobulins, but which may not exactly duplicate the entire amino acid sequence of any single immunoglobulin. The variable region consensus sequence is not obtained from any naturally produced antibody or immunoglobulin. Kabat et al., 1991, Sequences of Proteins of Immunological Interest, 5th Ed. Public Health Service, National Institutes of Health, Bethesda, Md., and variants thereof. The FRs of heavy and light chain consensus sequences, and variants thereof, provide useful sequences for the preparation of humanized anti-IL-23p19 antibodies. See, for example, U.S. Pat. Nos. 6,037,454 and 6,054,297.

Human germline sequences are found naturally in the human population. A combination of those germline genes generates antibody diversity. Germline antibody sequences for the light chain of the antibody come from conserved human germline kappa or lambda v-genes and j-genes. Similarly the heavy chain sequences come from germline v-, d- and j-genes (LeFranc, M-P, and LeFranc, G, "The Immunoglobulin Facts Book" Academic Press, 2001).

As used herein, "variant", "anti-IL-23A variant", "humanized anti- IL-23A variant", or "variant humanized anti-IL-23A" each refers to a humanized anti-IL-23A antibody having at least a light chain variable murine CDR from any of the sequences as shown in Table 1 or a heavy chain murine CDR sequence derived from the murine monoclonal antibody as shown in Table 2. Variants include those having one or more amino acid changes in one or both light chain or heavy chain variable domains, provided that the amino acid change does not substantially impair binding of the antibody to IL-23A. Exemplary antibodies produced herein include those designated as Antibody A, Antibody B, Antibody C and Antibody D, and the various light chains and heavy chains of the same are shown in SEQ ID Nos:18 and 21, and SEQ ID Nos:19 and 20, respectively.

An "isolated" antibody is one that has been identified and separated and/or recovered from a component of its natural environment. Contaminant components of the antibody's natural environment are those materials that may interfere with diagnostic or therapeutic uses of the antibody, and can be enzymes, hormones, or other proteinaceous or nonproteinaceous solutes. In one aspect, the antibody will be purified to at least greater than 95% isolation by weight of antibody.

An isolated antibody includes an antibody in situ within recombinant cells in which it is produced, since at least one component of the antibody's natural environment will not be present. Ordinarily however, an isolated antibody will be prepared by at least one purification step in which the recombinant cellular material is removed.

The term "antibody performance" refers to factors that contribute to antibody recognition of antigen or the effectiveness of an antibody in vivo. Changes in the amino acid sequence of an antibody can affect antibody properties such as folding, and can influence physical factors such as initial rate of antibody binding to antigen ($k_a$), dissociation constant of the antibody from antigen ($k_d$), affinity constant of the antibody for the antigen (Kd), conformation of the antibody, protein stability, and half life of the antibody.

The term "epitope tagged" when used herein, refers to an anti-IL-23A antibody fused to an "epitope tag". An "epitope tag" is a polypeptide having a sufficient number of amino acids to provide an epitope for antibody production, yet is designed such that it does not interfere with the desired activity of the anti-IL-23A antibody. The epitope tag is usually sufficiently unique such that an antibody raised against the epitope tag does not substantially cross-react with other epitopes. Suitable tag polypeptides generally contain at least 6 amino acid residues and usually contain about 8 to 50 amino acid residues, or about 9 to 30 residues. Examples of epitope tags and the antibody that binds the epitope include the flu HA tag polypeptide and its antibody 12CA5 (Field et al., 1988 Mol. Cell. Biol. 8: 2159-2165; c-myc tag and 8F9, 3C7, 6E10, G4, B7 and 9E10 antibodies thereto (Evan et al., 1985, Mol. Cell. Biol. 5(12):3610-3616; and Herpes simplex virus glycoprotein D (gD) tag and its antibody (Paborsky et al. 1990, Protein Engineering 3(6): 547-553). In certain embodiments, the epitope tag is a "salvage receptor binding epitope". As used herein, the term "salvage receptor binding epitope" refers to an epitope of the Fc region of an IgG molecule (such as $IgG_1$, $IgG_2$, $IgG_3$, or $Iga_r$) that is responsible for increasing the in vivo serum half-life of the IgG molecule.

For diagnostic as well as therapeutic monitoring purposes, the antibodies of the invention also may be conjugated to a label, either a label alone or a label and an additional second agent (prodrug, chemotherapeutic agent and the like). A label, as distinguished from the other second agents refers to an agent that is a detectable compound or composition and it may be conjugated directly or indirectly to a antibody of the present invention. The label may itself be detectable (e.g., radioisotope labels or fluorescent labels) or, in the case of an enzymatic label, may catalyze chemical alteration of a substrate compound or composition that is detectable. Labeled anti-IL-23A antibody can be prepared and used in various applications including in vitro and in vivo diagnostics.

In various aspects of the present invention one or more domains of the antibodies will be recombinantly expressed. Such recombinant expression may employ one or more control sequences, i.e., polynucleotide sequences necessary for expression of an operably linked coding sequence in a particular host organism. The control sequences suitable for use in prokaryotic cells include, for example, promoter, operator, and ribosome binding site sequences. Eukaryotic control sequences include, but are not limited to, promoters, polyadenylation signals, and enhancers. These control sequences can be utilized for expression and production of anti-IL-23A antibody in prokaryotic and eukaryotic host cells.

A nucleic acid sequence is "operably linked" when it is placed into a functional relationship with another nucleic acid sequence. For example, a nucleic acid presequence or secretory leader is operably linked to a nucleic acid encoding a polypeptide if it is expressed as a preprotein that participates in the secretion of the polypeptide; a promoter or enhancer is operably linked to a coding sequence if it affects the transcription of the sequence; or a ribosome binding site is operably linked to a coding sequence if it is positioned so as to facilitate translation. Generally, "operably linked" means that the DNA sequences being linked are contiguous, and, in the case of a secretory leader, contiguous and in reading frame. However, enhancers are optionally contiguous. Linking can be accomplished by ligation at convenient restriction sites. If such sites do not exist, synthetic oligonucleotide adaptors or linkers can be used.

As used herein, the expressions "cell", "cell line", and "cell culture" are used interchangeably and all such designations include the progeny thereof. Thus, "transformants" and "transformed cells" include the primary subject cell and cultures derived therefrom without regard for the number of transfers.

The term "mammal" for purposes of treatment refers to any animal classified as a mammal, including humans, domesticated and farm animals, and zoo, sports, or pet animals, such as dogs, horses, cats, cows, and the like. Preferably, the mammal is human.

A "disorder", as used herein, is any condition that would benefit from treatment with an anti-IL-23A antibody described herein. This includes chronic and acute disorders or diseases including those pathological conditions that predispose the mammal to the disorder in question.

As used herein, the term "IL-23-associated disorder" or "IL-23-associated disease" refers to a condition in which IL-23 activity contributes to the disease and typically where IL-23 is abnormally expressed. An IL-23-associated disorder includes diseases and disorders of the immune system, such as autoimmune disorders and inflammatory diseases. Such conditions include psoriasis, inflammatory bowel disease, for example ulcerative colitis or Crohn's disease, and spondyloarthritis, for example ankylosing spondylitis, non-radiographic axial spondyloarthritis, peripheral spondyloarthritis or psoriatic arthritis.

The term "intravenous infusion" refers to introduction of an agent into the vein of an animal or human patient over a period of time greater than approximately 15 minutes, generally between approximately 30 to 90 minutes.

The term "intravenous bolus" or "intravenous push" refers to drug administration into a vein of an animal or human such that the body receives the drug in approximately 15 minutes or less, generally 5 minutes or less.

The term "subcutaneous administration" refers to introduction of an agent under the skin of an animal or human patient, preferable within a pocket between the skin and underlying tissue, by relatively slow, sustained delivery from a drug receptacle. Pinching or drawing the skin up and away from underlying tissue may create the pocket.

The term "subcutaneous infusion" refers to introduction of a drug under the skin of an animal or human patient, preferably within a pocket between the skin and underlying tissue, by relatively slow, sustained delivery from a drug receptacle for a period of time including, but not limited to, 30 minutes or less, or 90 minutes or less. Optionally, the infusion may be made by subcutaneous implantation of a drug delivery pump implanted under the skin of the animal or human patient, wherein the pump delivers a predetermined amount of drug for a predetermined period of time, such as 30 minutes, 90 minutes, or a time period spanning the length of the treatment regimen.

The term "subcutaneous bolus" refers to drug administration beneath the skin of an animal or human patient, where bolus drug delivery is less than approximately 15 minutes; in another aspect, less than 5 minutes, and in still another aspect, less than 60 seconds. In yet even another aspect, administration is within a pocket between the skin and underlying tissue, where the pocket may be created by pinching or drawing the skin up and away from underlying tissue.

The term "therapeutically effective amount" is used to refer to an amount of an active agent that relieves or ameliorates one or more of the symptoms of the disorder being treated. In another aspect, the therapeutically effective amount refers to a target serum concentration that has been shown to be effective in, for example, slowing disease progression. Efficacy can be measured in conventional ways, depending on the condition to be treated.

The terms "treatment" and "therapy" and the like, as used herein, are meant to include therapeutic as well as prophylactic, or suppressive measures for a disease or disorder leading to any clinically desirable or beneficial effect, including but not limited to alleviation or relief of one or more symptoms, regression, slowing or cessation of progression of the disease or disorder. Thus, for example, the term treatment includes the administration of an agent prior to or following the onset of a symptom of a disease or disorder thereby preventing or removing one or more signs of the disease or disorder. As another example, the term includes the administration of an agent after clinical manifestation of the disease to combat the symptoms of the disease. Further, administration of an agent after onset and after clinical symptoms have developed where administration affects clinical parameters of the disease or disorder, such as the degree of tissue injury or the amount or extent of metastasis, whether or not the treatment leads to amelioration of the disease, comprises "treatment" or "therapy" as used herein. Moreover, as long as the compositions of the invention either alone or in combination with another therapeutic agent alleviate or ameliorate at least one symptom of a disorder being treated as compared to that symptom in the absence of use of the anti-IL-23A antibody composition, the result should be considered an effective treatment of the underlying disorder regardless of whether all the symptoms of the disorder are alleviated or not.

The term "package insert" is used to refer to instructions customarily included in commercial packages of therapeutic products, that contain information about the indications, usage, administration, contraindications and/or warnings concerning the use of such therapeutic products.

Antibodies

The CDRs of selected antibodies used in the context of the present invention are shown in Table 1 and 2. The variable regions of selected antibodies used in the context of the present invention are shown in Table 3 and 4.

TABLE 1

LIGHT CHAIN CDR sequences

| | L-CDR1 | L-CDR2 | L-CDR3 |
|---|---|---|---|
| 6B8 | KASRDVAIAVA (SEQ ID NO: 1) | WASTRHT (SEQ ID NO: 2) | HQYSSYPFT (SEQ ID NO: 3) |

TABLE 2

HEAVY CHAIN CDR sequences

| | H-CDR1 | H-CDR2 | H-CDR3 |
|---|---|---|---|
| 6B8 | GNTFTDQTIH (SEQ ID NO: 4) | YIYPRDDSPKYNENFKG (SEQ ID NO: 5) | PDRSGYAWFIY (SEQ ID NO: 6) |
| Hu_6B8-2 | GYTFTDQTIH (SEQ ID NO: 7) | YIYPRDDSPKYNENFKG (SEQ ID NO: 5) | PDRSGYAWFIY (SEQ ID NO: 6) |
| Hu_6B8-5 | GFTFTDQTIH (SEQ ID NO: 8) | YIYPRDDSPKYNENFKG (SEQ ID NO: 5) | PDRSGYAWFIY (SEQ ID NO: 6) |
| Hu_6B8-36/65 | GGTFTDQTIH (SEQ ID NO: 9) | YIYPRDDSPKYNENFKG (SEQ ID NO: 5) | PDRSGYAWFIY (SEQ ID NO: 6) |

TABLE 3

Humanized 6B8-VK Sequences

| 6B8CVK-65 | DIQMTQSPSSLSASVGDRVTITCKASRDVAIAVAWYQQKPGK VPKLLLFWASTRHTGVPDRFSGSGSGTDFTLTISSLQPEDLA DYYCHQYSSYPFTFGQGTKLEIK (SEQ ID NO: 10) |
|---|---|
| 6B8CVK-66 | DIQMTQSPSSLSASVGDRVTITCKASRDVAIAVAWYQQKPGK VPKLLIYWASTRHTGVPSRFSGSGSRTDFTLTISSLQPEDVA DYFCHQYSSYPFTFGSGTKLEIK (SEQ ID NO: 11) |
| 6B8CVK-67 | DIQMTQSPSSLSASVGDRVTITCKASRDVAIAVAWYQQKPGK VPKLLLYWASTRHTGVPSRFSGSGSRTDFTLTISSLQPEDVA TYYCHQYSSYPFTFGSGTKLEIK (SEQ ID NO: 12) |
| 6B8CVK-78 | DIQMTQSPSSLSASVGDRVTITCKASRDVAIAVAWYQQKPGK VPKLLLFWASTRHTGVPDRFSGSGSRTDFTLTISSLQPEDLA DYYCHQYSSYPFTFGSGTKLEIK (SEQ ID NO: 13) |

TABLE 4

Humanized 6B8-VH Sequence

| 6B8CVH-02 | QVQLVQSGAEVKKPGSSVKVSCKASGYTFTDQTIHWMRQ APGQGLEWIGYIYPRDDSPKYNENFKGKVTITADKSTST AYMELSSLRSEDTAVYYCAIPDRSGYAWFIYWGQGTLVT VSS (SEQ ID NO: 14) |
|---|---|
| 6B8CVH-05 | QVQLVQSGAEVKKPGSSVKVSCKASGFTFTDQTIHWVRQ APGQGLEWMGYIYPRDDSPKYNENFKGKVTLTADKSTST AYMELSSLRSEDTAVYYCAIPDRSGYAWFIYWGQGTLVT VSS (SEQ ID NO: 15) |
| 6B8CVH-36 | QVQLVQSGAEVKKPGSSVKTSCKASGGTFTDQTIHWVRQ RPGQGLEWMGYIYPRDDSPKYNENFKGRVTITADKSTST AYMELSSLRSEDTAVYYCAIPDRSGYAWFIYWGQGTLVT VSS (SEQ ID NO: 16) |
| 6B8CVH-65 | QVQLVQSGAEVKKPGSSVKVSCKASGGTFTDQTIHWVRQ APGQGLEWMGYIYPRDDSPKYNENFKGRVTLTADKSTST AYMELSSLRSEDTAVYFCARPDRSGYAWFIYWGQGTLVT VSS (SEQ ID NO: 17) |

Selected combination of humanized light chain and heavy chain variable regions derived from mouse antibody 6B8 resulted in Antibodies A, B, C and D:

Antibody A: 6B8-IgG1 KO-2 with IgK-66 (heavy chain variable region 6B8CVH-02 and light chain variable region 6B8CVK-66);

Antibody B: 6B8-IgG1 KO-5 with IgK-66 (heavy chain variable region 6B8CVH-05 and light chain variable region 6B8CVK-66);

Antibody C: 6B8-IgG1 KO-2 with IgK-65 (heavy chain variable region 6B8CVH-02 and light chain variable region 6B8CVK-65);

Antibody D: 6B8-IgG1 KO-5 with IgK-65 (heavy chain variable region 6B8CVH-05 and light chain variable region 6B8CVK-65).

Antibodies A, B, C and D have the heavy and light chain sequences shown in Table 5.

TABLE 5

Heavy and Light Chain DNA and Amino Acid Sequences for Antibodies A, B, C, and D

| Antibody A | IgK light Chain #66 | DIQMTQSPSSLSASVGDRVTITCKASRDVAIAVAWYQ QKPGKVPKLLIYWASTRHTGVPSRFSGSGSRTDFTLT ISSLQPEDVADYFCHQYSSYPFTFGSGTKLEIKRTVA APSVFIFPPSDEQLKSGTASVVCLLNNFYPREAKVQW KVDNALQSGNSQESVTEQDSKDSTYSLSSTLTLSKAD YEKHKVYACEVTHQGLSSPVTKSFNRGEC (SEQ ID NO: 18) |
|---|---|---|
| | IgG1 KO Heavy Chain #2 | QVQLVQSGAEVKKPGSSVKVSCKASGYTFTDQTIHWM RQAPGQGLEWIGYIYPRDDSPKYNENFKGKVTITADK STSTAYMELSSLRSEDTAVYYCAIPDRSGYAWFIYWG QGTLVTVSSASTKGPSVFPLAPSSKSTSGGTAALGCL VKDYFPEPVTVSWNSGALTSGVHTFPAVLQSSGLYSL SSVVTVPSSSLGTQTYICNVNHKPSNTKVDKRVEPKS CDKTHTCPPCPAPEAAGGPSVFLFPPKPKDTLMISRT PEVTCVVVDVSHEDPEVKFNWYVDGVEVHNAKTKPRE EQYNSTYRVVSVLTVLHQDWLNGKEYKCKVSNKALPA PIEKTISKAKGQPREPQVYTLPPSREEMTKNQVSLTC LVKGFYPSDIAVEWESNGQPENNYKTTPPVLDSDGSF FLYSKLTVDKSRWQQGNVFSCSVMHEALHNHYTQKSL SLSPG (SEQ ID NO: 19) |
| Antibody B | IgK light Chain #66 | (SEQ ID NO: 18) |
| | IgG1KO Heavy | QVQLVQSGAEVKKPGSSVKVSCKASGFTFTDQTIHWV RQAPGQGLEWMGYIYPRDDSPKYNENFKGKVTLTADK |

TABLE 5-continued

Heavy and Light Chain DNA and Amino Acid Sequences for Antibodies A, B, C, and D

| | Chain #5 | STSTAYMELSSLRSEDTAVYYCAIPDRSGYAWFIYWG <u>QGTLVTVSSA</u>STKGPSVFPLAPSSKSTSGGTAALGCL VKDYFPEPVTVSWNSGALTSGVHTFPAVLQSSGLYSL SSVVTVPSSSLGTQTYICNVNHKPSNTKVDKRVEPKS CDKTHTCPPCPAPEAAGGPSVFLFPPKPKDTLMISRT PEVTCVVVDVSHEDPEVKFNWYVDGVEVHNAKTKPRE EQYNSTYRVVSVLTVLHQDWLNGKEYKCKVSNKALPA PIEKTISKAKGQPREPQVYTLPPSREEMTKNQVSLTC LVKGFYPSDIAVEWESNGQPENNYKTTPPVLDSDGSF FLYSKLTVDKSRWQQGNVFSCSVMHEALHNHYTQKSL SLSPG (SEQ ID NO: 20) |
|---|---|---|
| Anti-body C | IgK light Chain #65 | <u>DIQMTQSPSSLSASVGDRVTITCKASRDVAIAVAWYQ QKPGKVPKLLLFWASTRHTGVPDRFSGSGSGTDFTLT ISSLQPEDLADYYCHQYSSYPFTFGQGTKLEIK</u>RTVA APSVFIFPPSDEQLKSGTASVVCLLNNFYPREAKVQW KVDNALQSGNSQESVTEQDSKDSTYSLSSTLTLSKAD YEKHKVYACEVTHQGLSSPVTKSFNRGEC (SEQ ID NO: 21) |
| | IgG1KO Heavy Chain #2 | (SEQ ID NO: 19) |
| Anti-body D | IgK light Chain #65 | (SEQ ID NO: 21) |
| | IgG1KO Heavy Chain #5 | (SEQ ID NO: 20) |

Light chains and heavy chain variable regions of Antibodies A, B, C, and D are underlined in Table 5 above.

In one embodiment, an anti-IL-23A antibody comprises the light chain sequence of SEQ ID NO:18 and the heavy chain sequence of SEQ ID NO:19. In one embodiment, an anti-IL-23A antibody comprises the light chain sequence of SEQ ID NO:18 and the heavy chain sequence of SEQ ID NO:20. In one embodiment, an anti-IL-23A antibody comprises the light chain sequence of SEQ ID NO:21 and the heavy chain sequence of SEQ ID NO:19. In one embodiment, an anti-IL-23A antibody comprises the light chain sequence of SEQ ID NO:21 and the heavy chain sequence of SEQ ID NO:20.

In one embodiment, an anti-IL-23A antibody consists of the light chain sequence of SEQ ID NO:18 and the heavy chain sequence of SEQ ID NO:19. In one embodiment, an anti-IL-23A antibody consists of the light chain sequence of SEQ ID NO:18 and the heavy chain sequence of SEQ ID NO:20. In one embodiment, an anti-IL-23A antibody consists of the light chain sequence of SEQ ID NO:21 and the heavy chain sequence of SEQ ID NO:19. In one embodiment, an anti-IL-23A antibody consists of the light chain sequence of SEQ ID NO:21 and the heavy chain sequence of SEQ ID NO:20.

In a further embodiment, an anti-IL-23A antibody binds to human IL-23A at an epitope consisting of amino acid residues 108 to 126 and amino acid residues 137 to 151 of SEQ ID NO: 22.

In a further embodiment, an anti-IL-23A antibody competitively binds to human IL-23A with an antibody of the present invention, for example Antibody A, Antibody B, Antibody C or Antibody D described herein. The ability of an antibody to competitively bind to IL-23A can be measured using competitive binding assays known in the art.

In some embodiments, an anti-IL-23A antibody comprises light chain variable region sequences having the amino acid sequence set forth in of SEQ ID NO:10, 11, 12 or 13.

In some embodiments, an anti-IL-23A antibody comprises heavy chain variable region sequences having the amino acid sequence set forth in of SEQ ID NO:14, 15, 16 or 17 (see Tables 3 and 4 above). The CDR sequences of these antibodies are shown in Tables 1 and 2. For example, anti-IL-23A antibodies are monoclonal antibodies with the combinations of light chain variable and heavy chain variable regions of SEQ ID NO: 11/14, 11/15, 10/14 or 10/15. Such variable regions can be combined with human constant regions.

Polynucleotides, Vectors, Host Cells, and Recombinant Methods

Other embodiments encompass isolated polynucleotides that comprise a sequence encoding an anti-IL-23A antibody, vectors, and host cells comprising the polynucleotides, and recombinant techniques for production of the humanized antibody. The isolated polynucleotides can encode any desired form of the anti-IL-23A antibody including, for example, full length monoclonal antibodies, Fab, Fab', F(ab')$_2$, and Fv fragments.

The polynucleotide(s) that comprise a sequence encoding an anti-IL-23A antibody can be fused to one or more regulatory or control sequence, as known in the art, and can be contained in suitable expression vectors or host cell as known in the art. Each of the polynucleotide molecules encoding the heavy or light chain variable domains can be independently fused to a polynucleotide sequence encoding a constant domain, such as a human constant domain, enabling the production of intact antibodies. Alternatively, polynucleotides, or portions thereof, can be fused together, providing a template for production of a single chain antibody.

For recombinant production, a polynucleotide encoding the antibody is inserted into a replicable vector for cloning (amplification of the DNA) or for expression. Many suitable vectors for expressing the recombinant antibody are available. The vector components generally include, but are not limited to, one or more of the following: a signal sequence, an origin of replication, one or more marker genes, an enhancer element, a promoter, and a transcription termination sequence.

The anti-IL-23A antibodies can also be produced as fusion polypeptides, in which the antibody is fused with a heterologous polypeptide, such as a signal sequence or other polypeptide having a specific cleavage site at the amino terminus of the mature protein or polypeptide. The heterologous signal sequence selected is typically one that is recognized and processed (i.e., cleaved by a signal peptidase) by the host cell. For prokaryotic host cells that do not recognize and process the anti-IL-23A antibody signal sequence, the signal sequence can be substituted by a prokaryotic signal sequence. The signal sequence can be, for example, alkaline phosphatase, penicillinase, lipoprotein, heat-stable enterotoxin II leaders, and the like. For yeast secretion, the native signal sequence can be substituted, for example, with a leader sequence obtained from yeast invertase alpha-factor (including *Saccharomyces* and *Kluyveromyces* α-factor leaders), acid phosphatase, *C. albicans* glucoamylase, or the signal described in WO90/13646. In mammalian cells, mammalian signal sequences as well as viral secretory leaders, for example, the herpes simplex gD signal, can be used. The DNA for such precursor region is ligated in reading frame to DNA encoding the anti-IL-23A antibody.

Expression and cloning vectors contain a nucleic acid sequence that enables the vector to replicate in one or more selected host cells. Generally, in cloning vectors this sequence is one that enables the vector to replicate independently of the host chromosomal DNA, and includes origins of replication or autonomously replicating sequences. Such sequences are well known for a variety of bacteria, yeast, and viruses. The origin of replication from the plasmid pBR322 is suitable for most Gram-negative bacteria, the 2-υ. plasmid origin is suitable for yeast, and various viral origins (SV40, polyoma, adenovirus, VSV, and BPV) are useful for cloning vectors in mammalian cells. Generally, the origin of replication component is not needed for mammalian expression vectors (the SV40 origin may typically be used only because it contains the early promoter).

Expression and cloning vectors may contain a gene that encodes a selectable marker to facilitate identification of expression. Typical selectable marker genes encode proteins that confer resistance to antibiotics or other toxins, e.g., ampicillin, neomycin, methotrexate, or tetracycline, or alternatively, are complement auxotrophic deficiencies, or in other alternatives supply specific nutrients that are not present in complex media, e.g., the gene encoding D-alanine racemase for *Bacilli*.

One example of a selection scheme utilizes a drug to arrest growth of a host cell. Those cells that are successfully transformed with a heterologous gene produce a protein conferring drug resistance and thus survive the selection regimen. Examples of such dominant selection use the drugs neomycin, mycophenolic acid, and hygromycin. Common selectable markers for mammalian cells are those that enable the identification of cells competent to take up a nucleic acid encoding an anti-IL-23A antibody, such as DHFR (dihydrofolate reductase), thymidine kinase, metallothionein-I and -II (such as primate metallothionein genes), adenosine deaminase, ornithine decarboxylase, and the like. Cells transformed with the DHFR selection gene are first identified by culturing all of the transformants in a culture medium that contains methotrexate (Mtx), a competitive antagonist of DHFR. An appropriate host cell when wild-type DHFR is employed is the Chinese hamster ovary (CHO) cell line deficient in DHFR activity (e.g., DG44).

Alternatively, host cells (particularly wild-type hosts that contain endogenous DHFR) transformed or co-transformed with DNA sequences encoding an anti-IL-23A antibody, wild-type DHFR protein, and another selectable marker such as aminoglycoside 3'-phosphotransferase (APH), can be selected by cell growth in medium containing a selection agent for the selectable marker such as an aminoglycosidic antibiotic, e.g., kanamycin, neomycin, or G418. See, e.g., U.S. Pat. No. 4,965,199.

Where the recombinant production is performed in a yeast cell as a host cell, the TRP1 gene present in the yeast plasmid YRp7 (Stinchcomb et al., 1979, Nature 282: 39) can be used as a selectable marker. The TRP1 gene provides a selection marker for a mutant strain of yeast lacking the ability to grow in tryptophan, for example, ATCC No. 44076 or PEP4-1 (Jones, 1977, Genetics 85:12). The presence of the trp1 lesion in the yeast host cell genome then provides an effective environment for detecting transformation by growth in the absence of tryptophan. Similarly, Leu2p-deficient yeast strains such as ATCC 20,622 and 38,626 are complemented by known plasmids bearing the LEU2 gene.

In addition, vectors derived from the 1.6 μm circular plasmid pKD1 can be used for transformation of *Kluyveromyces* yeasts. Alternatively, an expression system for large-scale production of recombinant calf chymosin was reported for *K. lactis* (Van den Berg, 1990, Bio/Technology 8:135). Stable multi-copy expression vectors for secretion of mature recombinant human serum albumin by industrial strains of *Kluyveromyces* have also been disclosed (Fleer et al., 1991, Bio/Technology 9:968-975).

Expression and cloning vectors usually contain a promoter that is recognized by the host organism and is operably linked to the nucleic acid molecule encoding an anti-IL-23p19 antibody or polypeptide chain thereof. Promoters suitable for use with prokaryotic hosts include phoA promoter, β-lactamase and lactose promoter systems, alkaline phosphatase, tryptophan (trp) promoter system, and hybrid promoters such as the tac promoter. Other known bacterial promoters are also suitable. Promoters for use in bacterial systems also will contain a Shine-Dalgarno (S.D.) sequence operably linked to the DNA encoding the anti-IL-23A antibody.

Many eukaryotic promoter sequences are known. Virtually all eukaryotic genes have an AT-rich region located approximately 25 to 30 bases upstream from the site where transcription is initiated. Another sequence found 70 to 80 bases upstream from the start of transcription of many genes is a CNCAAT region where N may be any nucleotide. At the 3' end of most eukaryotic genes is an AATAAA sequence that may be the signal for addition of the poly A tail to the 3' end of the coding sequence. All of these sequences are suitably inserted into eukaryotic expression vectors.

Examples of suitable promoting sequences for use with yeast hosts include the promoters for 3-phosphoglycerate kinase or other glycolytic enzymes, such as enolase, glyceraldehyde-3-phosphate dehydrogenase, hexokinase, pyruvate decarboxylase, phosphofructokinase, glucose-6-phosphate isomerase, 3-phosphoglycerate mutase, pyruvate kinase, triosephosphate isomerase, phosphoglucose isomerase, and glucokinase.

Inducible promoters have the additional advantage of transcription controlled by growth conditions. These include yeast promoter regions for alcohol dehydrogenase 2, isocytochrome C, acid phosphatase, derivative enzymes associated with nitrogen metabolism, metallothionein, glyceraldehyde-3-phosphate dehydrogenase, and enzymes responsible for maltose and galactose utilization. Suitable vectors and promoters for use in yeast expression are further described in EP 73,657. Yeast enhancers also are advantageously used with yeast promoters.

Anti-IL-23A antibody transcription from vectors in mammalian host cells is controlled, for example, by promoters obtained from the genomes of viruses such as polyoma virus, fowlpox virus, adenovirus (such as Adenovirus 2), *bovine papilloma* virus, avian sarcoma virus, cytomegalovirus, a retrovirus, hepatitis-B virus and Simian Virus 40 (SV40), from heterologous mammalian promoters, e.g., the actin promoter or an immunoglobulin promoter, or from heat-shock promoters, provided such promoters are compatible with the host cell systems.

The early and late promoters of the SV40 virus are conveniently obtained as an SV40 restriction fragment that also contains the SV40 viral origin of replication. The immediate early promoter of the human cytomegalovirus is conveniently obtained as a HindIII E restriction fragment. A system for expressing DNA in mammalian hosts using the *bovine papilloma* virus as a vector is disclosed in U.S. Pat. No. 4,419,446. A modification of this system is described in U.S. Pat. No. 4,601,978. See also Reyes et al., 1982, Nature 297:598-601, disclosing expression of human β-interferon cDNA in mouse cells under the control of a thymidine kinase promoter from herpes simplex virus. Alternatively, the Rous sarcoma virus long terminal repeat can be used as the promoter.

Another useful element that can be used in a recombinant expression vector is an enhancer sequence, which is used to increase the transcription of a DNA encoding an anti-IL-23A antibody by higher eukaryotes. Many enhancer sequences are now known from mammalian genes (e.g., globin, elastase, albumin, α-fetoprotein, and insulin). Typically, however, an enhancer from a eukaryotic cell virus is used. Examples include the SV40 enhancer on the late side of the replication origin (bp 100-270), the cytomegalovirus early promoter enhancer, the polyoma enhancer on the late side of the replication origin, and adenovirus enhancers. See also Yaniv, 1982, Nature 297:17-18 for a description of enhancing elements for activation of eukaryotic promoters. The enhancer may be spliced into the vector at a position 5' or 3' to the anti-IL-23A antibody-encoding sequence, but is preferably located at a site 5' from the promoter.

Expression vectors used in eukaryotic host cells (yeast, fungi, insect, plant, animal, human, or nucleated cells from other multicellular organisms) can also contain sequences necessary for the termination of transcription and for stabilizing the mRNA. Such sequences are commonly available from the 5' and, occasionally 3', untranslated regions of eukaryotic or viral DNAs or cDNAs. These regions contain nucleotide segments transcribed as polyadenylated fragments in the untranslated portion of the mRNA encoding anti-IL-23A antibody. One useful transcription termination component is the *bovine* growth hormone polyadenylation region. See WO94/11026 and the expression vector disclosed therein. In some embodiments, humanized anti-IL-23p19 antibodies can be expressed using the CHEF system. (See, e.g., U.S. Pat. No. 5,888,809; the disclosure of which is incorporated by reference herein.)

Suitable host cells for cloning or expressing the DNA in the vectors herein are the prokaryote, yeast, or higher eukaryote cells described above. Suitable prokaryotes for this purpose include eubacteria, such as Gram-negative or Gram-positive organisms, for example, Enterobacteriaceae such as *Escherichia*, e.g., *E. coli, Enterobacter, Erwinia, Klebsiella, Proteus, Salmonella*, e.g., *Salmonella typhimurium, Serratia*, e.g., *Serratia marcescans*, and *Shigella*, as well as *Bacilli* such as *B. subtilis* and *B. licheniformis* (e.g., *B. licheniformis* 41 P disclosed in DD 266,710 published Apr. 12, 1989), *Pseudomonas* such as *P. aeruginosa*, and *Streptomyces*. One preferred *E. coli* cloning host is *E. coli* 294 (ATCC 31,446), although other strains such as *E. coli* B, *E. coli* X1776 (ATCC 31,537), and *E. coli* W3110 (ATCC 27,325) are suitable. These examples are illustrative rather than limiting.

In addition to prokaryotes, eukaryotic microbes such as filamentous fungi or yeast are suitable cloning or expression hosts for anti-IL-23A antibody-encoding vectors. *Saccharomyces cerevisiae*, or common baker's yeast, is the most commonly used among lower eukaryotic host microorganisms. However, a number of other genera, species, and strains are commonly available and useful herein, such as *Schizosaccharomyces pombe; Kluyveromyces* hosts such as, e.g., *K. lactis, K. fragilis* (ATCC 12,424), *K. bulgaricus* (ATCC 16,045), *K. wickeramii* (ATCC 24,178), *K. waltii* (ATCC 56,500), *K. drosophilarum* (ATCC 36,906), *K. thermotolerans*, and *K. marxianus*; yarrowia (EP 402,226); *Pichia pastors* (EP 183,070); *Candida; Trichoderma reesia* (EP 244,234); *Neurospora crassa; Schwanniomyces* such as *Schwanniomyces occidentalis*; and filamentous fungi such as, e.g., *Neurospora, Penicillium, Tolypocladium*, and *Aspergillus* hosts such as *A. nidulans* and *A. niger*.

Suitable host cells for the expression of glycosylated anti-IL-23A antibody are derived from multicellular organisms. Examples of invertebrate cells include plant and insect cells, including, e.g., numerous baculoviral strains and variants and corresponding permissive insect host cells from hosts such as *Spodoptera frugiperda* (caterpillar), *Aedes aegypti* (mosquito), *Aedes albopictus* (mosquito), *Drosophila melanogaster* (fruitfly), and *Bombyx mori* (silk worm). A variety of viral strains for transfection are publicly available, e.g., the L-1 variant of *Autographa californica* NPV and the Bm-5 strain of *Bombyx mori* NPV, and such viruses may be used, particularly for transfection of *Spodoptera frugiperda* cells.

Plant cell cultures of cotton, corn, potato, soybean, petunia, tomato, and tobacco can also be utilized as hosts.

In another aspect, expression of anti-IL-23A antibodies is carried out in vertebrate cells. The propagation of vertebrate cells in culture (tissue culture) has become routine procedure and techniques are widely available. Examples of useful mammalian host cell lines are monkey kidney CV1 line transformed by SV40 (COS-7, ATCC CRL 1651), human embryonic kidney line (293 or 293 cells subcloned for growth in suspension culture, (Graham et al., 1977, J. Gen Virol. 36: 59), baby hamster kidney cells (BHK, ATCC CCL 10), Chinese hamster ovary cells/-DHFR1 (CHO, Urlaub et al., 1980, Proc. Natl. Acad. Sci. USA 77: 4216; e.g., DG44), mouse sertoli cells (TM4, Mather, 1980, Biol. Reprod. 23:243-251), monkey kidney cells (CV1 ATCC CCL 70), African green monkey kidney cells (VERO-76, ATCC CRL-1587), human cervical carcinoma cells (HELA, ATCC CCL 2), canine kidney cells (MDCK, ATCC CCL 34), buffalo rat liver cells (BRL 3A, ATCC CRL 1442), human lung cells (W138, ATCC CCL 75), human liver cells (Hep G2, HB 8065), mouse mammary tumor (MMT 060562, ATCC CCL51), TR1 cells (Mather et al., 1982, Annals N.Y. Acad. Sci. 383: 44-68), MRC 5 cells, FS4 cells, and human hepatoma line (Hep G2).

Host cells are transformed with the above-described expression or cloning vectors for anti-IL-23A antibody production and cultured in conventional nutrient media modified as appropriate for inducing promoters, selecting transformants, or amplifying the genes encoding the desired sequences.

The host cells used to produce an anti-IL-23A antibody described herein may be cultured in a variety of media. Commercially available media such as Ham's F10 (Sigma-Aldrich Co., St. Louis, Mo.), Minimal Essential Medium ((MEM), (Sigma-Aldrich Co.), RPMI-1640 (Sigma-Aldrich Co.), and Dulbecco's Modified Eagle's Medium ((DMEM), Sigma-Aldrich Co.) are suitable for culturing the host cells. In addition, any of the media described in one or more of Ham et al., 1979, Meth. Enz. 58: 44, Barnes et al., 1980, Anal. Biochem. 102: 255, U.S. Pat. Nos. 4,767,704, 4,657, 866, 4,927,762, 4,560,655, 5,122,469, WO 90/103430, and WO 87/00195 may be used as culture media for the host cells. Any of these media may be supplemented as necessary with hormones and/or other growth factors (such as insulin, transferrin, or epidermal growth factor), salts (such as sodium chloride, calcium, magnesium, and phosphate), buffers (such as HEPES), nucleotides (such as adenosine and thymidine), antibiotics (such as gentamicin), trace elements (defined as inorganic compounds usually present at final concentrations in the micromolar range), and glucose or an equivalent energy source. Other supplements may also be included at appropriate concentrations that would be known to those skilled in the art. The culture conditions, such as temperature, pH, and the like, are those previously used with the host cell selected for expression, and will be apparent to the ordinarily skilled artisan.

When using recombinant techniques, the antibody can be produced intracellularly, in the periplasmic space, or directly secreted into the medium. If the antibody is produced intracellularly, the cells may be disrupted to release protein as a first step. Particulate debris, either host cells or lysed fragments, can be removed, for example, by centrifugation or ultrafiltration. Carter et al., 1992, Bio/Technology 10:163-167 describes a procedure for isolating antibodies that are secreted to the periplasmic space of E. coli. Briefly, cell paste is thawed in the presence of sodium acetate (pH 3.5), EDTA, and phenylmethylsulfonylfluoride (PMSF) over about 30 minutes. Cell debris can be removed by centrifugation. Where the antibody is secreted into the medium, supernatants from such expression systems are generally first concentrated using a commercially available protein concentration filter, for example, an Amicon or Millipore Pellicon ultrafiltration unit. A protease inhibitor such as PMSF may be included in any of the foregoing steps to inhibit proteolysis and antibiotics may be included to prevent the growth of adventitious contaminants. A variety of methods can be used to isolate the antibody from the host cell.

The antibody composition prepared from the cells can be purified using, for example, hydroxylapatite chromatography, gel electrophoresis, dialysis, and affinity chromatography, with affinity chromatography being a typical purification technique. The suitability of protein A as an affinity ligand depends on the species and isotype of any immunoglobulin Fc domain that is present in the antibody. Protein A can be used to purify antibodies that are based on human gamma1, gamma2, or gamma4 heavy chains (see, e.g., Lindmark et al., 1983 J. Immunol. Meth. 62:1-13). Protein G is recommended for all mouse isotypes and for human gamma3 (see, e.g., Guss et al., 1986 EMBO J. 5:1567-1575). A matrix to which an affinity ligand is attached is most often agarose, but other matrices are available. Mechanically stable matrices such as controlled pore glass or poly(styrenedivinyl)benzene allow for faster flow rates and shorter processing times than can be achieved with agarose. Where the antibody comprises a $C_{H3}$ domain, the Bakerbond ABX™ resin (J. T. Baker, Phillipsburg, N.J.) is useful for purification. Other techniques for protein purification such as fractionation on an ion-exchange column, ethanol precipitation, reverse phase HPLC, chromatography on silica, chromatography on heparin SEPHAROSE™ chromatography on an anion or cation exchange resin (such as a polyaspartic acid column), chromatofocusing, SDS-PAGE, and ammonium sulfate precipitation are also available depending on the antibody to be recovered.

Following any preliminary purification step(s), the mixture comprising the antibody of interest and contaminants may be subjected to low pH hydrophobic interaction chromatography using an elution buffer at a pH between about 2.5-4.5, typically performed at low salt concentrations (e.g., from about 0-0.25M salt).

Therapeutic Uses

In another embodiment, an anti-IL-23A antibody disclosed herein is useful in the treatment of various disorders associated with the expression of IL-23p19 as described herein. In one aspect, a method for treating an IL-23 associated disorder comprises administering a therapeutically effective amount of an anti-IL-23A antibody to a subject in need thereof.

The anti-IL-23A antibody is administered by any suitable means, including parenteral, subcutaneous, intraperitoneal, intrapulmonary, and intranasal, and, if desired for local immunosuppressive treatment, intralesional administration (including perfusing or otherwise contacting the graft with the antibody before transplantation). The anti-IL-23A antibody or agent can be administered, for example, as an infusion or as a bolus. Parenteral infusions include intramuscular, intravenous, intraarterial, intraperitoneal, or subcutaneous administration. In addition, the anti-IL-23A antibody is suitably administered by pulse infusion, particularly with declining doses of the antibody. In one aspect, the dosing is given by injections, most preferably intravenous or subcutaneous injections, depending in part on whether the administration is brief or chronic. In one aspect, the dosing of the anti-IL-23 antibody is given by subcutaneous injections.

For the prevention or treatment of disease, the appropriate dosage of antibody will depend on a variety of factors such as the type of disease to be treated, as defined above, the severity and course of the disease, whether the antibody is administered for preventive or therapeutic purposes, previous therapy, the patient's clinical history and response to the antibody, and the discretion of the attending physician. The antibody is suitably administered to the patient at one time or over a series of treatments.

The term "suppression" is used herein in the same context as "amelioration" and "alleviation" to mean a lessening of one or more characteristics of the disease.

The antibody is formulated, dosed, and administered in a fashion consistent with good medical practice. Factors for consideration in this context include the particular disorder being treated, the particular mammal being treated, the clinical condition of the individual patient, the cause of the disorder, the site of delivery of the agent, the method of administration, the scheduling of administration, and other factors known to medical practitioners. The "therapeutically effective amount" of the antibody to be administered will be governed by such considerations.

The antibody may optionally be formulated with one or more agents currently used to prevent or treat the disorder in question. The effective amount of such other agents depends on the amount of anti-IL-23A antibody present in the formulation, the type of disorder or treatment, and other factors discussed above.

IL-23-Associated Disorders

The anti-IL-23p19 antibodies or agents are useful for treating or preventing an immunological disorder characterized by abnormal expression of IL-23, e.g., by inappropriate activation of immune cells (e.g., lymphocytes or dendritic cells). Such abnormal expression of IL-23 can be due to, for example, increased IL-23 protein levels.

Immunological diseases that are characterized by inappropriate activation of immune cells and that can be treated or prevented by the methods described herein can be classified, for example, by the type(s) of hypersensitivity reaction(s) that underlie the disorder. These reactions are typically classified into four types: anaphylactic reactions, cytotoxic (cytolytic) reactions, immune complex reactions, or cell-mediated immunity (CMI) reactions (also referred to as delayed-type hypersensitivity (DTH) reactions). (See, e.g., Fundamental Immunology (William E. Paul ed., Raven Press, N.Y., 3rd ed. 1993).) Immunological diseases include inflammatory diseases and autoimmune diseases.

Examples of immunological diseases include the following: psoriasis, inflammatory bowel disease, for example ulcerative colitis or Crohn's disease, and spondyloarthritis, for example ankylosing spondylitis, non-radiographic axial spondyloarthritis, peripheral spondyloarthritis or psoriatic arthritis.

In one aspect, in the context of the present invention, the immunological disease is psoriasis. Psoriasis is a chronic inflammatory disease of the skin characterized by dysfunctional keratinocyte differentiation and hyperproliferation and marked accumulation of inflammatory T cells and dendritic cells. For example, the immunological disease includes plaque psoriasis, for example chronic plaque psoriasis, for example moderate to severe chronic plaque psoriasis, for example in patients who are candidates for systemic therapy or phototherapy. In one aspect, the immunological disease is moderate to severe plaque psoriasis and the patient is a patient who failed to respond to, or who has a contraindication to, or is intolerant to other systemic therapy including ciclosporin, methotrexate, psoralen or ultraviolet-A light (PUVA).

For example, the immunological disease includes palmar pustular psoriasis, guttate psoriasis, inverse psoriasis, pustular psoriasis or erythodermic psoriasis (also known as psoriatic erythroderma).

For psoriasis, disease severity can be characterized by body surface area (BSA) involvement with <5% being considered mild, 5-10% moderate and >10% severe. In some cases, disease status is measured using the Psoriasis Area and Severity Index (PASI), a composite measure of erythema, induration, desquamation and BSA affected by psoriasis with a range of scores from 0 to 72. In one aspect, the percentage of patients reaching $PASI_{75}$ (PASI 75), a 75% reduction in score from baseline at a certain time (for example 12 or 16 weeks) is used as a primary endpoint in psoriasis treatment, for example in psoriasis treatment trials. In one aspect, the percentage of patients reaching a $PASI_{90}$ (PASI 90), a 90% reduction in score from baseline at a certain time (for example at week 12 or 16) is used as primary endpoint in psoriasis treatment, for example in psoriasis treatment trials.

In one aspect, the percentage of patients reaching a $PASI_{90}$ at week 12 pursuant to a method according to the present invention, for example using Antibody A, is at least 60%, at least 65% or at least 70%.

In one aspect, the percentage of patients reaching a sPGA score of clear (score of 0) or almost clear (score of 1) at a certain time (for example at week 12 or 16) is used as primary endpoint in psoriasis treatment, for example in psoriasis treatment trials.

In one aspect, a patient treated within the context of the instant invention is a patient with stable moderate to severe chronic plaque-type psoriasis with or without psoriatic arthritis involving 10% or more body surface area, with disease severity PASI equal or greater than 12 and/or sPGA score of moderate and above (score of at least 3). In one aspect, a patient treated within the context of the instant invention is a patient with a psoriasis disease duration of at least 6 months prior to initiating the treatment.

In one aspect, in the context of the present invention, the immunological disease is psoriatic arthritis. For psoriatic arthritis, a patient has psoriatic skin lesions or a history of psoriasis in combination with nail dystrophy, inflammation of the digits (dactylitis) and a characteristic radiographic appearance (ill-defined ossification near joint margins) with a negative serum test for rheumatoid factor. Efficacy of treatment of psoriatic arthritis in clinical trials is frequently gauged using the percentage of patients achieving the American College of Rheumatology (ACR) composite measure of efficacy, as has been used prominently in trials in rheumatoid arthritis. The ACR20 indicates achievement of at least a 20% improvement in the number of swollen and tender joint counts as well as 20% improvement in 3 of 5 ACR core set measures when comparing baseline to some point in time after initiation of treatment e.g., at 24 weeks.

In one aspect, the percentage of ACR20 responders (20% improvement in American College of Rheumatology response criteria), for example at 24 weeks, is used as primary endpoint in psoriatic arthritis treatment, for example in psoriatic arthritis treatment trials.

In one aspect, immunological disease is psoriatic arthritis, for example active psoriatic arthritis, and the anti-IL-23A antibody is used alone or in combination with one or more non-biologic DMARDs (Disease-Modifying Antirheumatic Drug), for example to reduce signs and symptoms. In one aspect, the anti-IL-23A antibody is used or indicated to inhibit the progression of structural damage, and/or improve physical function.

In one aspect, the anti-IL-23A antibody is used alone or in combination with methotrexate (MTX) for the treatment of psoriatic arthritis, for example active psoriatic arthritis, for example when the response to previous non-biological DMARD therapy has been inadequate. In one aspect, the anti-IL-23A antibody is used to reduce the rate of progression of peripheral joint damage as measured by X-ray and/or to improve physical function.

In one aspect, in the context of the present invention, the immunological disease is axial (spinal) spondyloarthritis (ax-SpA), including ankylosing spondylitis (AS, also called radiographic ax-SpA) and non-radiographic ax-SpA.

In one aspect, in the context of the present invention, the immunological disease is Ankylosing Spondylitis. Ankylosing Spondylitis (AS) is an inflammatory disease involving primarily the axial skeleton and sacroiliac joints. Other musculoskeletal manifestations of the disease include peripheral arthritis and enthesitis. Extra-articular disease includes anterior uveitis, osteoporosis, cardiac disease with primarily valvular involvement, renal disease, lung disease, gastrointestinal disease, and skin disease. AS has a male predominance with a male-to-female ratio of 3:1. The peak age of onset is typically in the second or third decade of life. Estimates of the prevalence of AS worldwide range from approximately 0.5% to 0.07%. Patients with AS are likely to lose their physical function and ability to work, which is likely to have a significant impact on the quality of life unless an appropriate treatment is administered to the patients.

For ankylosing spondylitis, a patient has inflammatory back pain, asymmetrical peripheral arthritis, inflammation of the tendons (enthesitis) and extra-articular features, such as uveitis, and a strong genetic association with human leucocyte antigen B27. In one aspect, the percentage Ankylosing Spondylitis Disease Activity Score 40 (ASDAS 40) responders, for example at 24 weeks is used as primary endpoint in ankylosing spondylitis treatment, for example in ankylosing spondylitis treatment trials.

In one aspect, in the context of the present invention, the immunological disease is non-radiographic axial spondyloarthritis (ax-SpA). Non-radiographic axial spondyloarthritis, a more recently defined entity than AS, is considered to represent an earlier manifestation of the same pathologic processes as AS, although it is increasingly recognized that some patients (particularly females) may not progress to radiographic disease, and may therefore be considered to have a distinct subtype of this disease.

Pharmaceutical Compositions and Administration Thereof

A composition comprising an anti-IL-23A antibody can be administered to a subject having or at risk of having an immunological disorder. The term "subject" as used herein means any mammalian patient to which an anti-IL-23A antibody can be administered, including, e.g., humans and non-human mammals, such as primates, rodents, and dogs. Subjects specifically intended for treatment using the methods described herein include humans. The antibodies can be administered either alone or in combination with other compositions in the prevention or treatment of the immunological disorder.

Anti-IL-23A antibodies for use in such pharmaceutical compositions are described herein, for example Antibody A, Antibody B, Antibody C or Antibody D.

Various delivery systems are known and can be used to administer the anti-IL-23A antibody. Methods of introduction include but are not limited to intradermal, intramuscular, intraperitoneal, intravenous, subcutaneous, intranasal, epidural, and oral routes. The anti-IL-23A antibody can be administered, for example by infusion, bolus or injection, and can be administered together with other biologically active agents such as chemotherapeutic agents. Administration can be systemic or local. In one embodiment, the administration is by subcutaneous injection. Formulations for such injections may be prepared in for example prefilled syringes that may be administered once every other week.

In specific embodiments, the anti-IL-23A antibody is administered by injection, by means of a catheter, by means of a suppository, or by means of an implant, the implant being of a porous, non-porous, or gelatinous material, including a membrane, such as a sialastic membrane, or a fiber. Typically, when administering the composition, materials to which the anti-IL-23A antibody or agent does not absorb are used.

In other embodiments, the anti-IL-23A antibody is delivered in a controlled release system. In one embodiment, a pump may be used (see, e.g., Langer, 1990, Science 249: 1527-1533; Sefton, 1989, CRC Crit. Ref. Biomed. Eng. 14:201; Buchwald et al., 1980, Surgery 88:507; Saudek et al., 1989, N. Engl. J. Med. 321:574). In another embodiment, polymeric materials can be used. (See, e.g., Medical Applications of Controlled Release (Langer and Wise eds., CRC Press, Boca Raton, Fla., 1974); Controlled Drug Bioavailability, Drug Product Design and Performance (Smolen and Ball eds., Wiley, New York, 1984); Ranger and Peppas, 1983, Macromol. Sci. Rev. Macromol. Chem. 23:61. See also Levy et al., 1985, Science 228:190; During et al., 1989, Ann. Neurol. 25:351; Howard et al., 1989, J. Neurosurg. 71:105.) Other controlled release systems are discussed, for example, in Langer, supra.

An anti-IL-23p19 antibody is typically administered as pharmaceutical compositions comprising a therapeutically effective amount of the antibody and one or more pharmaceutically compatible ingredients.

In typical embodiments, the pharmaceutical composition is formulated in accordance with routine procedures as a pharmaceutical composition adapted for intravenous or subcutaneous administration to human beings. Typically, compositions for administration by injection are solutions in sterile isotonic aqueous buffer. Where necessary, the pharmaceutical can also include a solubilizing agent and a local anesthetic such as lignocaine to ease pain at the site of the injection. Generally, the ingredients are supplied either separately or mixed together in unit dosage form, for example, as a dry lyophilized powder or water free concentrate in a hermetically sealed container such as an ampoule or sachette indicating the quantity of active agent. Where the pharmaceutical is to be administered by infusion, it can be dispensed with an infusion bottle containing sterile pharmaceutical grade water or saline. Where the pharmaceutical is administered by injection, an ampoule of sterile water for injection or saline can be provided so that the ingredients can be mixed prior to administration.

Further, the pharmaceutical composition can be provided as a pharmaceutical kit comprising (a) a container containing an anti-IL-23A antibody in lyophilized form and (b) a second container containing a pharmaceutically acceptable diluent (e.g., sterile water) for injection. The pharmaceutically acceptable diluent can be used for reconstitution or dilution of the lyophilized anti-IL-23A antibody. Optionally associated with such container(s) can be a notice in the form prescribed by a governmental agency regulating the manufacture, use or sale of pharmaceuticals or biological products, which notice reflects approval by the agency of manufacture, use or sale for human administration.

Examples of pharmaceutical compositions used in the context of the present invention are disclosed in Example 4 hereinbelow.

The invention is further described in the following examples, which are not intended to limit the scope of the invention.

EXAMPLES

Example 1

Clinical Studies

The results shown in Examples 1a, 1b and 1c are derived from the same clinical study.

Example 1a

Study

This study assessed the efficacy and safety of Antibody A vs ustekinumab in patients with moderate-to-severe plaque psoriasis.

166 patients were randomly assigned to one of three dose regimens of Antibody A (18 mg single injection; 90 or 180 mg at weeks 0 and 4) or ustekinumab (45 or 90 mg). PASI (Psoriasis Area and Severity Index), sPGA (Static Physician Global Assessment) and safety parameters were assessed. Primary endpoint was achievement of PASI 90 (achievement of ≥90% reduction from baseline PASI score) at week 12, with primary analysis comparing the two highest doses of Antibody A (pooled) with ustekinumab.

The primary analysis showed Antibody A to be superior to ustekinumab (PASI 90 response rate of 77.1% for Antibody A vs 40% for ustekinumab [p<0.0001]). sPGA scores of 0 (clear) or 1 (almost clear) were achieved by 90.4% of Antibody A patients compared with 67.5% of ustekinumab patients. Complete clearing of lesions (PASI 100) was achieved in 45.8% of Antibody A patients and 17.5% of ustekinumab patients. AEs were similar across treatment groups with no drug-related severe or serious AEs (adverse events).

Selective blockade of IL-23p19 with Antibody A is associated with superior clinical response to ustekinumab in patients with moderate-to-severe plaque psoriasis.

Example 1b

Study

Objectives: The efficacy and safety of the selective IL-23p19 antagonist monoclonal antibody Antibody A were assessed and compared with ustekinumab in patients with moderate-to-severe plaque psoriasis (including those with and without concurrent psoriatic arthritis (PsA)).

Methods: In this Phase 2 study, 166 patients were randomly assigned (1:1:1:1 ratio) to receive subcutaneous injections of one of three dose regimens of Antibody A (18 mg single dose at week 0; 90 or 180 mg at weeks 0, 4 and 16) or ustekinumab (45 or 90 mg at weeks 0, 4 and 16). Skin lesions were assessed using the Psoriasis Area and Severity Index (PASI) with the primary endpoint of PASI 90 (90% improvement from baseline) at 12 weeks. In patients who had concurrent PsA (either diagnosed by rheumatologist or suspected), the pain was assessed using the Visual Analogue Scale (pain-VAS) at baseline and at weeks 4, 12 and 24. In this interim analysis, all patients had completed the week 12 visit; there is incomplete data after week 12.

Results: The primary endpoint of PASI 90 response at week 12 was achieved by 32.6% (14/43), 73.2% (30/41) and 81.0% (34/42) of Antibody A patients in the 18, 90 and 180 mg groups, respectively, and 40.0% (16/40) of ustekinumab patients. A two-sided Cochran-Mantel-Haenszel test of PASI 90 response at week 12 between the 18, 90 and 180 mg groups of Antibody A and ustekinumab gave p-values of 0.4337, 0.0013 and <0.0001, respectively. Of 166 patients, 46 (27.7%) had concurrent PsA. Median percentage decrease from baseline in pain-VAS at week 12 were 31.9%, 70.2% and 58.4%, respectively, in patients in Antibody A 18, 90 and 180 mg dose groups compared with 57.3% in ustekinumab-treated patients. More than 50% decrease in pain-VAS (defined post hoc) at week 12 was achieved in 29% (2/7), 73% (8/11) and 50% (6/12) of patients in Antibody A 18, 90 and 180 mg dose groups, respectively, compared with 54% (7/13) in ustekinumab-treated patients. FIG. 1 demonstrates that reductions in pain-VAS score were observed as early as 4 weeks and maintained through 24 weeks (incomplete data). Adverse events (AEs) were similar across treatment groups with no drug-related severe or serious AEs.

Conclusions: Selective blockade of IL-23p19 with Antibody A is associated with superior clinical response compared to ustekinumab on skin lesions in patients with moderate-to-severe plaque psoriasis. Numeric improvement over ustekinumab in pain-VAS was also observed in patients with PsA.

Figure 2:
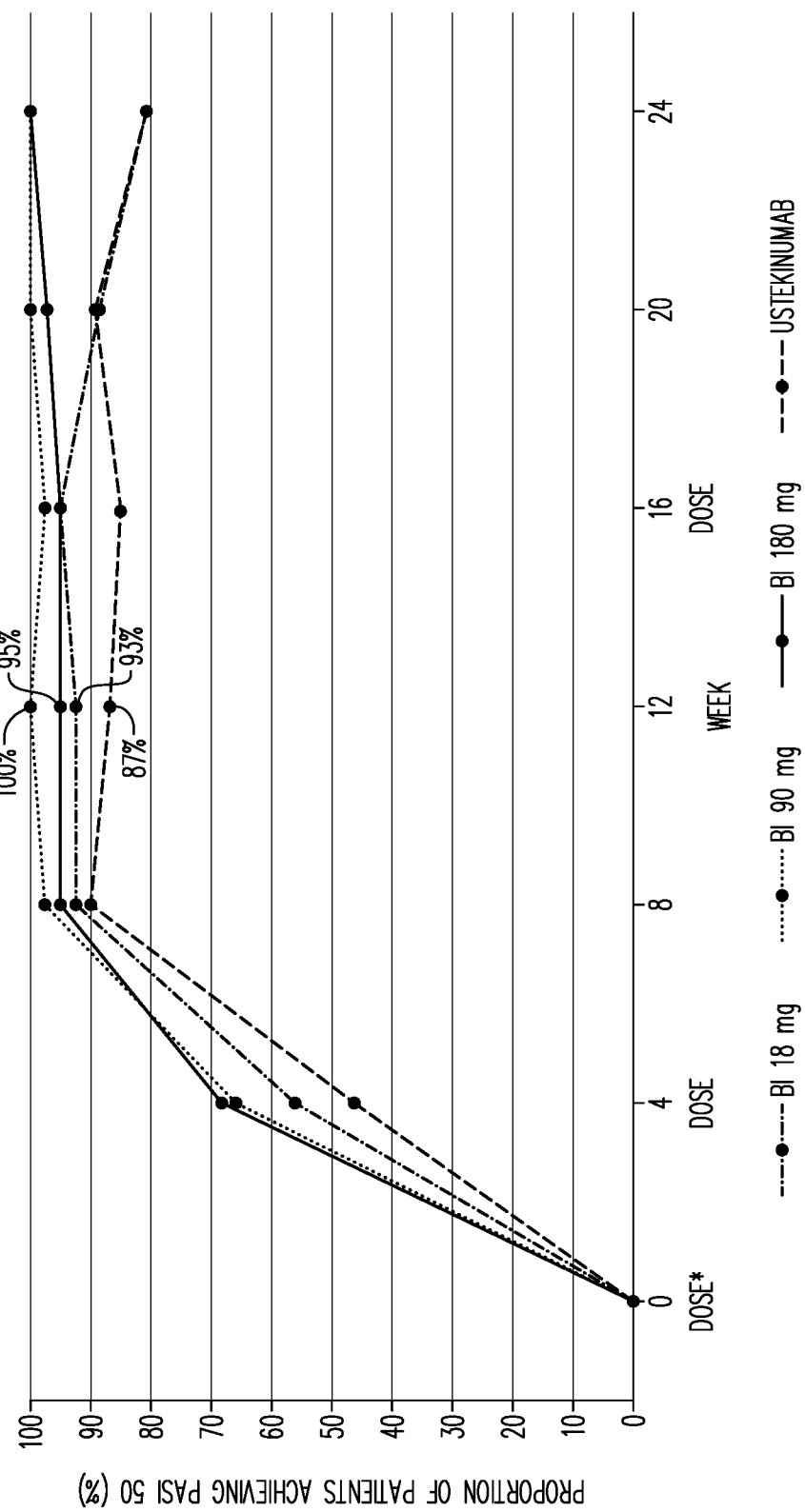
FIG. 2: Achievement of PASI 50 over time (observed).

PASI 50, PASI 75 and PASI 100 responses at week 12 were also determined in the above study. They showed proportions of patients achieving PASI 50 at week 12 of 93%, 95% and 100% of Antibody A patients in the 18, 90 and 180 mg groups, respectively, and 87% of ustekinumab patients. Achievement of PASI 50 over time is shown in FIG. 2.

Figure 3:
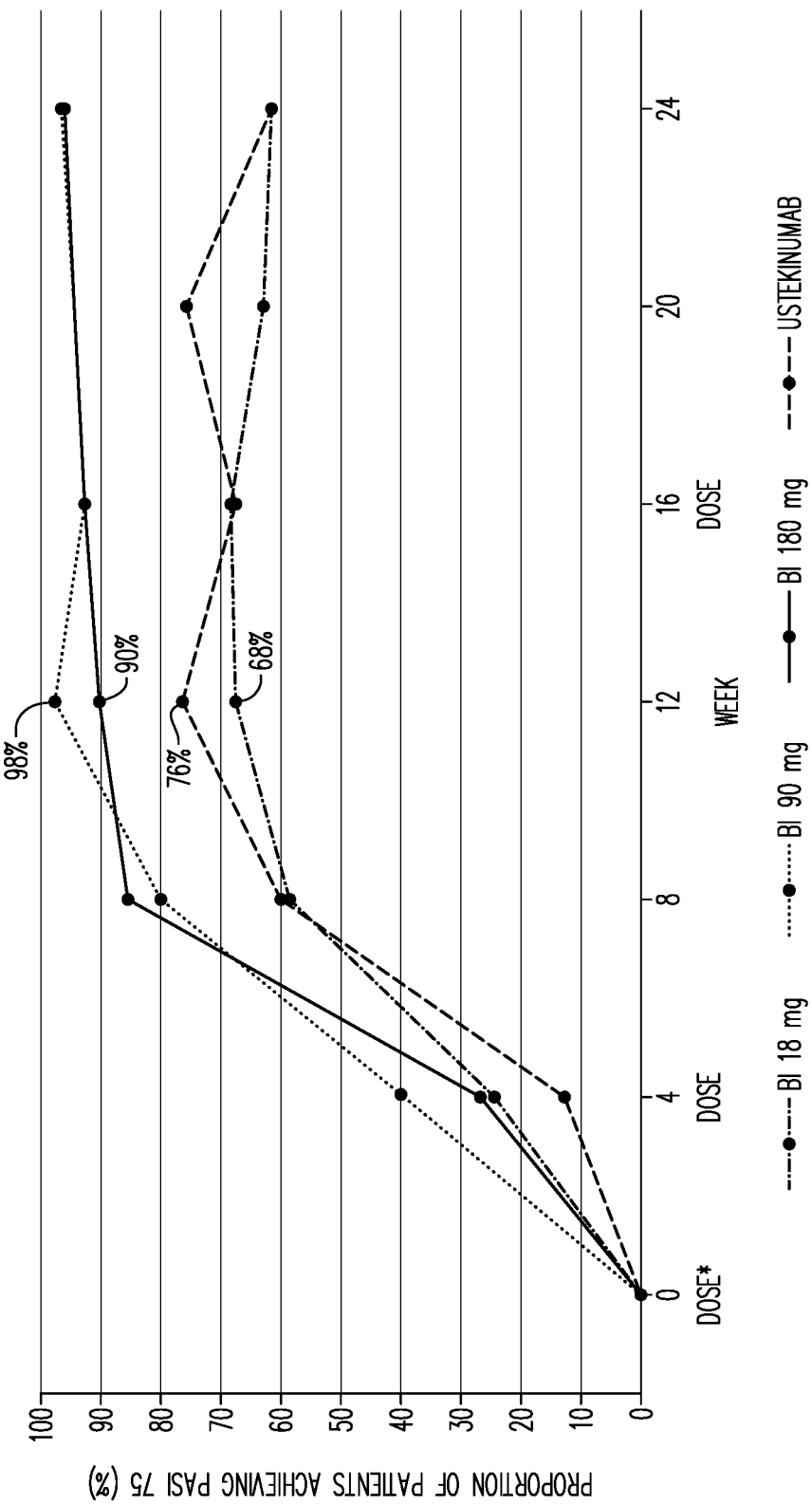
FIG. 3: Achievement of PASI 75 over time (observed).

They also showed proportions of patients achieving PASI 75 at week 12 of 76%, 90% and 98% of Antibody A patients in the 18, 90 and 180 mg groups, respectively, and 68% of ustekinumab patients. Achievement of PASI 75 over time is shown in FIG. 3.

Figure 5:
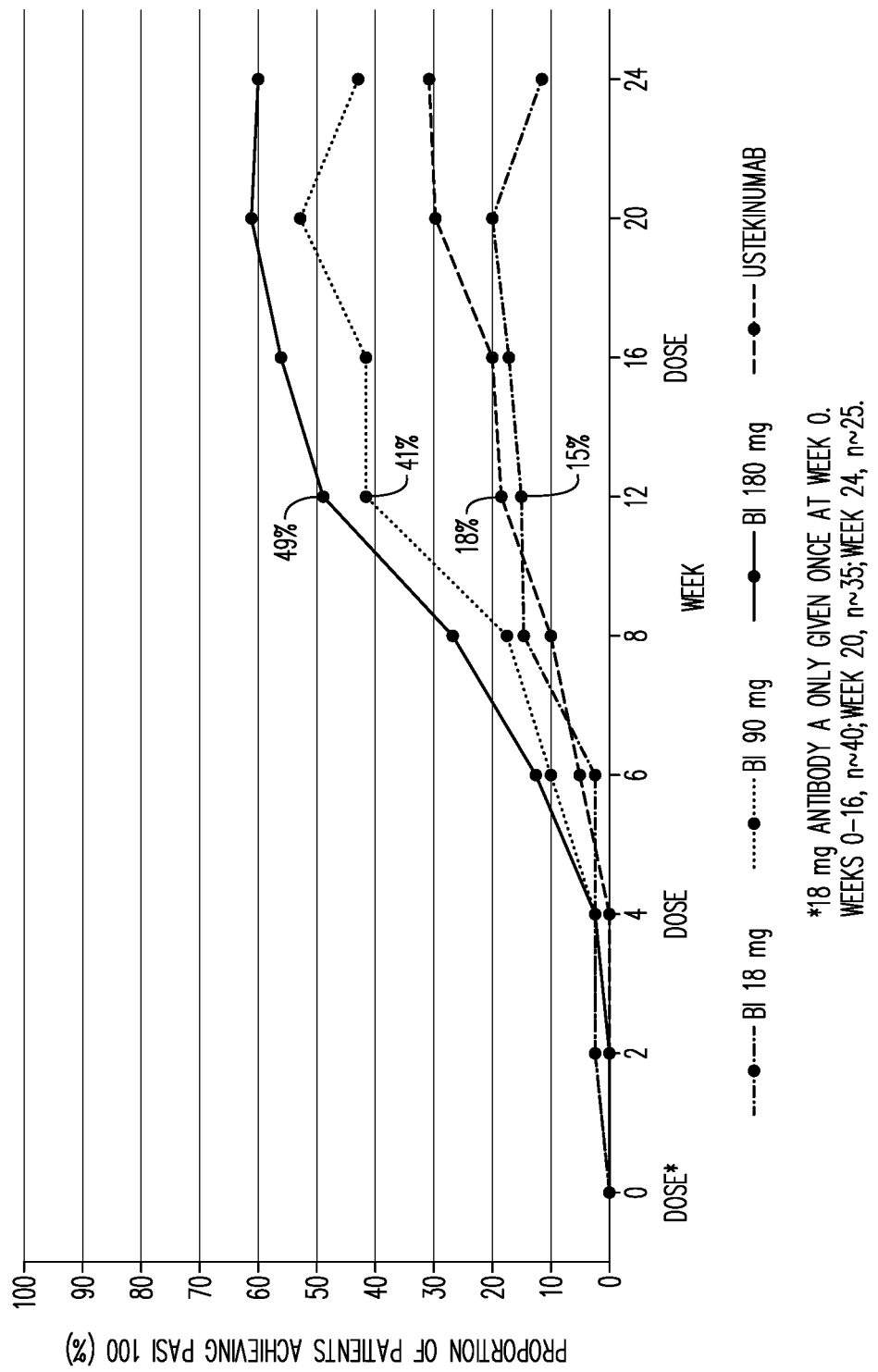
FIG. 5: Achievement of PASI 100 over time (observed).
Antibody A is also referred to as "BI" in FIGS. 2 to 5.

They also showed proportions of patients achieving PASI 100 at week 12 of 18%, 41% and 49% of Antibody A patients in the 18, 90 and 180 mg groups, respectively, and 15% of ustekinumab patients. Achievement of PASI 100 over time is shown in FIG. 5.

Figure 4:
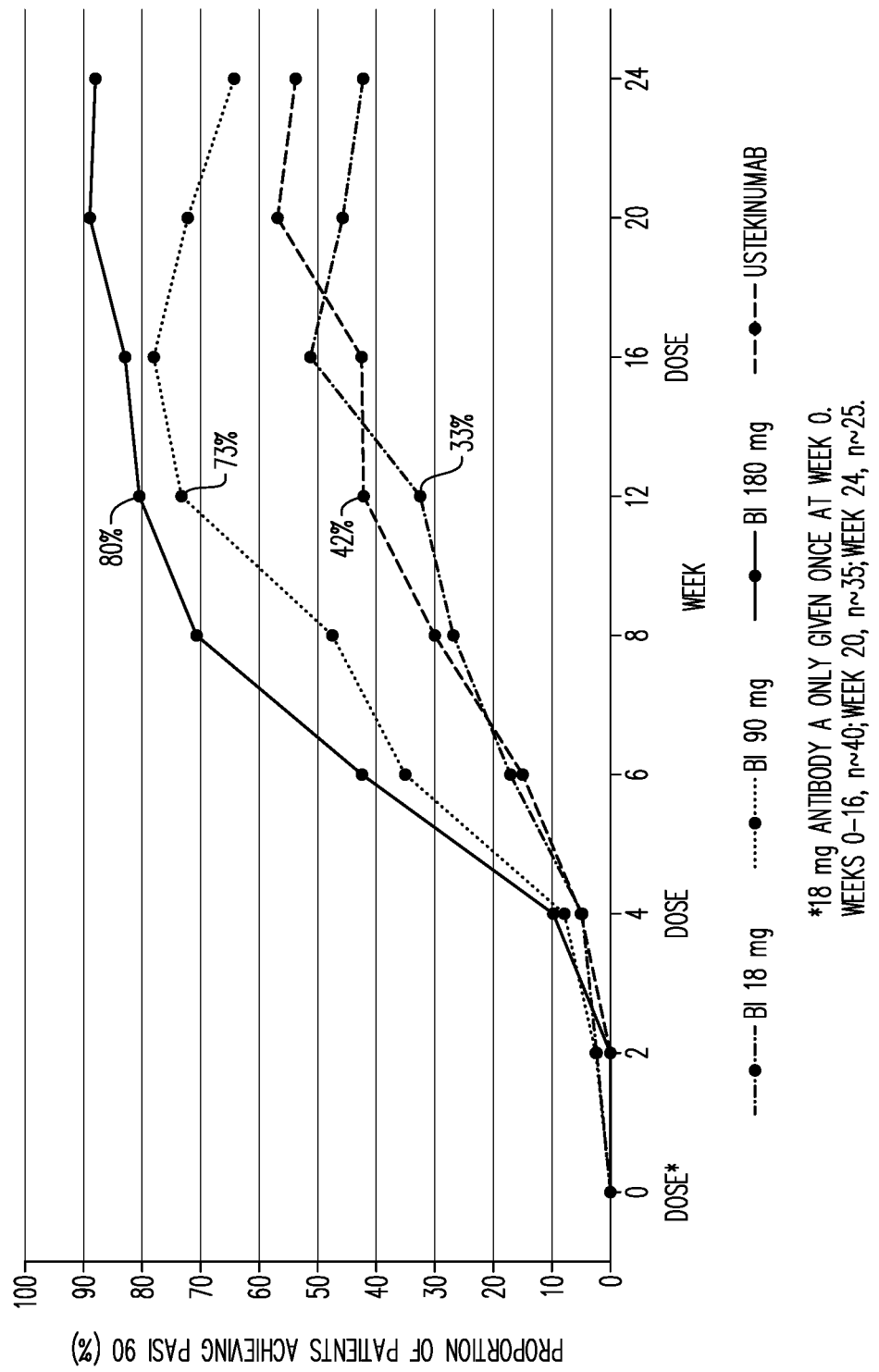
FIG. 4: Achievement of PASI 90 over time (observed).

Achievement of PASI 90 over time is shown in FIG. 4.

Example 1c

Study

This study assessed the onset and duration of clinical response following treatment with a selective IL-23p19 inhibitor (Antibody A) compared with ustekinumab in patients with moderate-to-severe chronic plaque psoriasis.

Materials & Methods: In this multi-center, randomized, double-blind (within Antibody A dose groups) Phase II study, 166 patients with moderate-to-severe chronic plaque psoriasis were assigned to receive subcutaneous injections of either Antibody A at three different dose regimens (18 mg single injection; 90 or 180 mg at Weeks 0, 4 and 16) or ustekinumab (45 or 90 mg, based on weight, at Weeks 0, 4 and 16). PASI was assessed at Weeks 0, 1, 2, 4, 6 and 8, followed by every 4 weeks for a total of 48 weeks. Safety was assessed at all visits by recording adverse events (AEs).

Results: At Week 24, PASI 90 was achieved by 66% (27/41) and 86% (36/42) of patients in the 90 mg and 180 mg Antibody A arms, respectively, compared with 55% (22/40) of patients receiving ustekinumab. Complete clearing of lesions (PASI 100) was achieved in 41% (17/41) and 57% (24/42) of patients in the 90 and 180 mg Antibody A arms, compared with 28% of patients receiving ustekinumab. The time to onset of PASI 90 was approximately twice as fast for patients in the 90 and 180 mg Antibody A arms compared with those in the ustekinumab arm (median days to onset of PASI 90=57 days [in both Antibody A dose groups; ~8 weeks] vs 113 days [~16 weeks], respectively, p=0.0016 [90 mg] and p<0.0001 [180 mg]). Patients in the 90 and 180 mg Antibody A arms who achieved PASI 90 maintained that response longer than those receiving ustekinumab (days to 50% of patients having first loss of PASI 90=337 days [in both Antibody A dose groups; ~48 weeks] vs 253 days [~36 weeks], respectively). AEs were similar between treatment arms and there was no dose response relationship for any AE. Seven patients reported serious AEs (four in the 18 mg and two in the 90 mg Antibody A arms and one in the ustekinumab arm); all were considered unrelated to study medication.

The same study showed that Antibody A had a rapid onset of effect with 69% and 66% of patients (180 mg and 90 mg, respectively) achieving PASI 50 by Week 4, vs 45% of ustekinumab patients. By Week 8, 83% and 80% of Antibody A patients (180 mg and 90 mg, respectively) had achieved PASI 75 vs 60% of ustekinumab patients. By Week 12, the proportion of patients achieving PASI 90 (primary endpoint) was 81% and 73% for 180 mg and 90 mg Antibody A arms vs 40% for ustekinumab. Body weight had little impact on efficacy for Antibody A. At Week 20, 90% and 76% of Antibody A patients (180 mg and 90 mg, respectively) achieved PASI 90 vs 55% for ustekinumab; and 62% and 51% of Antibody A patients had complete clearing of lesions (PASI 100) vs 25% of ustekinumab patients. Clinical responses were sustained at high levels beyond Week 36 for the 180 mg and 90 mg Antibody A dose groups. In patients with PsA, there was a greater decrease in pain at Week 12 observed with Antibody A (180 mg and 90 mg, pooled) vs ustekinumab (68% vs 57%). In patients with psoriatic arthritis, pain was assessed by visual analog scale and expressed as median percentage change from baseline.

Conclusions: Selective blockade of IL-23 by Antibody A demonstrates superior efficacy, a more rapid onset and longer duration of response compared with blockade of IL-12 and IL-23 with ustekinumab.

In the same study, Dermatology Life Quality Index (DLQI) and the EuroQol-5D (EQ-5D) were completed at Weeks 0, 12, 24, and 48. The median percentage changes from baseline in DLQI total score (analyzed descriptively and by the van Elteren test) were compared with ustekinumab at Weeks 12 and 24. The proportion of patients achieving a DLQI score of 0 or 1 was also assessed. The EQ-5D index score was analyzed descriptively. Antibody A results are reported for the pooled 90 mg and 180 mg arms. At baseline, the median DLQI score was 13.0 for patients randomized to Antibody A, compared with 16.0 for those randomized to ustekinumab. Mean EQ-5D index score was 0.7 in both treatment arms. At Week 12, the median percentage improvement in DLQI score was greater for patients receiving Antibody A than for those receiving ustekinumab (100% vs 90.6%, respectively; p=0.0304). The proportion of patients with a DLQI score of 0 or 1 at Week 24 was 80% for Antibody A patients compared with 61% for ustekinumab patients. At Week 12, Antibody A patients were observed to have a 50% greater improvement in mean EQ-5D score compared with ustekinumab patients (0.3 vs 0.2, respectively). This was sustained at Week 24.

In patients with moderate-to-severe plaque psoriasis, selective blockade of IL-23 by Antibody A demonstrated superior efficacy and provides significant improvement in QoL outcomes compared with ustekinumab.

In the same study, the efficacy of Antibody A was assessed for the treatment of scalp, palmoplantar and nail psoriasis.

Psoriasis Scalp Severity Index (PSSI) and Palmoplantar Psoriasis Area and Severity Index (PPASI) were used to evaluate scalp and palmoplantar psoriasis, respectively. Nail Psoriasis Severity Index (NAPSI) was assessed on the hands only. Assessments were performed at baseline and (in those who had symptoms at baseline) at Weeks 1, 2, 4, 6, 8, 12 and every 4 weeks through Week 48. Patients who were documented to have no signs or symptoms were assigned a total score of zero for that visit. Median percentage improvements from baseline for Antibody A (90 mg and 180 mg, pooled) were compared with those for ustekinumab.

One hundred and fifty four (92.8%) patients had scalp psoriasis, 42 (25.3%) patients had palmoplantar psoriasis and 96 (57.8%) patients had nail psoriasis. Scalp and palmoplantar disease responded rapidly; by Week 2, Antibody A-treated patients showed improvements from baseline in PSSI and PPASI of 50% and 51%, compared with 37% and 30% for ustekinumab-treated patients. By Week 6, patients in both Antibody A and ustekinumab groups had complete clearance of scalp psoriasis, which were maintained throughout the study. For PPASI, complete clearance was seen at Week 6 for Antibody A and Week 16 for ustekinumab and maintained throughout the study. Nail disease resolved more slowly, with 30% improvement in NAPSI for Antibody A at Week 6 compared to 0% for ustekinumab. By Week 12, improvements in NAPSI were 41% and 36% for Antibody A and ustekinumab, respectively, and by Week 24, the improvements in NAPSI were 61% and 67%, respectively.

Selective blockade of IL-23 by Antibody A demonstrates promising efficacy in the treatment of scalp, palmoplantar, and nail psoriasis, and suggests a more rapid improvement may be achieved with Antibody A compared with ustekinumab.

Example 2

Assessment of Efficacy

Antibody A is administered to a patient at a dose and dose regimen described herein.

The efficacy of Antibody A is assessed by one or more of the following endpoints, which are determined using known methods. Endpoints are measured for example at one or more of week 4, 6, 8, 12, 16, 20, 24, 28, 32, 36, 40, 44, 48, 52, 76 or 104 after administration or as set forth below.

Psoriasis:
Achievement of ≥90% reduction from baseline PASI score ($PASI_{90}$), for example at week 12.
Achievement of ≥75% reduction from baseline in PASI score ($PASI_{75}$), for example at week 12 and 24.
Achievement of 100% reduction from baseline in PASI score ($PASI_{100}$), for example at week 12.
Achievement of ≥50% reduction from baseline in PASI score ($PASI_{50}$), for example at week 12.
Achievement of $PASI_{90}$, for example at week 24.
Achievement of sPGA clear or almost clear, for example at week 12.
Percentage of PASI reduction from baseline, for example at week 12.
Time to loss of $PASI_{50}$ response. This endpoint is calculated from the first treatment to first <50% reduction of PASI score compared with baseline after the response has been achieved.

Other endpoints are as follows:
Achievement of $PASI_{90}$ and $PASI_{75}$ for example at week 4, 6, 8, 16, 20, 28, 32, 36, 40, 44, 48.
Achievement of $PASI_{100}$, $PASI_{50}$ and percentage of PASI reduction from baseline, for example at week 4, 6, 8, 16, 20, 24, 28, 32, 36, 40, 44, 48.
Achievement of sPGA clear or almost clear, for example at week 4, 6, 8, 16, 20, 24, 28, 32, 36, 40, 44, 48.
Time to onset of $PASI_{50}$ response (from the first treatment to first 50% reduction of PASI score compared with baseline).
Percent change from baseline in NAPS! (Nail Psoriasis Severity Index), PSSI (Psoriasis Scalp Severity Index) and PPASI (Palmoplantar Psoriasis Area Severity Index), for example at week 4, 6, 8, 12, 16, 20, 24, 28, 32, 36, 40, 44, 48.
Change from baseline in PGAR (Patient's Global Assessment Rank) and PAI
(Patient's Assessment of Itch), for example at week 4, 12, 24, 36, 48.
Change from baseline in Pain-VAS, for example at week 12 (in subgroup of patients with psoriatic arthritis only).
Change from baseline in Dermatology Life Quality Index (DLQI), for example at weeks 4, 6, 8, 12, 16, 20, 24, 48.
Change from baseline in EQ-5D (EuroQoL Group Questionaire) VAS score (Visual Analog Scale), for example at week 12.
Change from baseline in EQ-5D index score, for example at week 12.
Proportion of patients achieving Dermatology Life Quality Index (DLQI) scores of 0 or 1, for example at week 12.
Change from baseline in psoriasis symptoms evaluated using the total score on the PSS (Psoriasis Symptoms Scale), for example at week 16.
Achievement of total score on the PSS of 0, for example at week 16.

Psoriatic arthritis (responses assessed for example at one or more of week 4, 6, 8, 12, 16, 20, 24, 28, 32, 36, 40, 44, 48, 52, 76, 104):
Psoriatic Arthritis Screening and Evaluation (PASE) Questionnaire, for example at week 4, 6, 8, 12, 16, 20, 24, 28, 32, 36, 40, 44, 48.

20% improvement in American College of Rheumatology response criteria (ACR 20), for example at week 4, 6, 8, 12, 16, 20, 24, 28, 32, 36, 40, 44, 48.

50% and 70% improvement in American College of Rheumatology response criteria (ACR 50 and ACR 70).

Clinical Disease Activity Index (CDAI).

Disease Activity Score for 28-joint counts (DAS28).

Dactylitis (swelling of the whole digit), with assessment of the number of all 20 digits that are affected (ranges from 0 to 20 digits (fingers and toes) as present or absent for each digit).

Enthesitis (inflammation of tendon and ligament insertions, as assessed by the presence or absence of tenderness at the six sites of the Leeds Enthesitis Index (LEI)).

Individual ACR components including the number of tender or painful joints, the number of swollen joints.

The patient's global assessment of disease activity and joint pain.

The physician's global assessment of disease activity.

Responses of the Health Assessment Questionnaire-Disability Index (HAQ-DI), Health Assessment Questionnaire-Disability Index (HAQ-DI).

C-reactive protein levels.

Erythrocyte sedimentation rate.

Patient-reported outcome measures included the Bath Ankylosing Spondylitis Disease Activity Index (BASDAI). Scores on the Bath Ankylosing Spondylitis Disease Activity Index (BASDAI).

Version 2 of the Medical Outcomes Study 36-Item Short-Form Health Survey (SF-36).

Psoriasis Symptom Inventory.

The modified total Sharp score (mTSS), for example at week 24, 52, 104.

The tender-joint count.

The swollen-joint count.

Patient's assessment of pain,

Patient's assessment of Level of disability.

Acute-phase reactant (C-reactive protein or erythrocyte sedimentation rate),

Patient's global assessment of disease.

Physician's global assessment of disease.

Minimal Disease Activity (MDA).

Composite Psoriatic Disease Activity Index (CPDAI).

Psoriasis Area and Severity Index (PASI) percentage change from baseline (PASI 75/90/100).

Modified Nail Psoriasis Severity Index (mNAPSI).

Psoriatic Arthritis Quality of Life (PsAQOL).

Functional Assessment of Chronic Illness Therapy-Fatigue (FACIT-F).

Psoriatic Arthritis Magnetic Resonance Imaging Scoring System (PsAMRIS), for example at week 24, 52 and 104.

For Ankylosing Spondylitis and non-radiographic ax-S$_D$A (responses assessed for example at one or more of week 4, 6, 8, 12, 16, 20, 24, 28, 32, 36, 40, 44, 48, 52, 76, 104):

Patient-reported inflammatory symptoms.

Acute-phase reactants (erythrocyte sedimentation rate [ESR] or CRP).

Bath Ankylosing Spondylitis Disease Activity Index (BASDAI). Change in BASDAI score as compared to baseline.

Ankylosing Spondylitis Disease Activity Score (ASDAS). Change in ASDAS score compared to baseline.

Bath Ankylosing Spondylitis Function Index (BASFI). Change in BASFI score as compared to baseline.

Bath Ankylosing Spondylitis Metrology Index (BASMI). Change in spinal mobility assessed by BASMI score as compared to baseline.

Magnetic Resonance Imaging (MRI), for example at week 24, 52, 104.

ASAS 40 response.

ASAS 5/6 response.

ASAS partial remission criteria.

ASAS 20 response

Change in peripheral joint count (TJC and SJC) as compared to baseline.

Change in entheseal score (MASES) at as compared to baseline.

Change in Ankylosing Spondylitis Disease Activity Score (ASDAS) score as compared to baseline.

Time to loss of maintenance.

Time to post-treatment flare.

Time to loss of maintenance.

Ankylosing Spondylitis Quality of Life scale (ASQoL).

Example 3

Pharmacokinetic Endpoint(s)

In order to determine the pharmacokinetic parameters of an anti-IL-23A antibody, such as Antibody A, the following parameters are evaluated using methods known in the art:

maximum measured plasma concentration ($C_{max}$)

time from dosing to the maximum plasma concentration ($t_{max}$)

area under the plasma concentration-time curve over the time interval of treatment ($AUC_{0-t}$)

area under the plasma concentration-time curve over the time interval from zero extrapolated to infinity ($AUC_{0-\infty}$)

terminal half-life ($t_{1/2}$)

population pharmacokinetics.

Example 4

Pharmaceutical Compositions

Examples of formulations suitable for an antibody of the present invention are shown below. Antibodies used in the formulations below are for example Antibody A, Antibody B, Antibody C or Antibody D.

Formulation 1:

| Components | Concentration [mmol/L] | Concentration [g/l] | Nominal Amount [mg/vial] V = 10.0 ml |
|---|---|---|---|
| Antibody | | 10.0 | 100.0 |
| Succinic acid | 0.7 | 0.083 | 0.8 |
| Disodium succinate hexahydrate | 24.3 | 6.564 | 65.6 |
| Sodium chloride | 125 | 7.305 | 73.1 |
| Polysorbat 20 | 0.16 | 0.20 | 0.20 |
| Water for Injection | — | Ad 1 L | Ad 1 mL |

The pH of formulation 1 is typically in the range of pH 6.0 to 7.0, for example pH 6.5. This formulation is particularly suitable for intravenous administration.

Molecular weight (MW in g/mol) of used excipients: Disodium succinate hexahydrate=270.14 g/mol; Succinic acid=118.09 g/mol; Sodium chloride=58.44 g/mol.

The osmolarity of the formulation is 300+/−30 mOsmol/kg, as determined using an Osmomat 030 (Gonotec GmbH, Berlin, Germany). The density at 20° C. of the formulation is approximately 1.0089 g/cm³, as determined using a measuring unit DMA 4500 (Anton Paar GmbH, Ostfildern-Scharnhausen, Germany).

Formulation 2:

| Components | Concentration [mmol/L] | Concentration [g/l] | Nominal Amount [mg/syringe] V = 1.0 ml |
|---|---|---|---|
| Antibody | 0.6 | 90.0 | 90.0 |
| Succinic acid | 0.5 | 0.059 | 0.059 |
| Disodium succinate hexahydrate | 3.9 | 1.054 | 1.054 |
| Sorbitol | 225 | 41.00 | 41.00 |
| Polysorbat 20 | 0.16 | 0.20 | 0.20 |
| Water for Injection | — | Ad 1 L | Ad 1 mL |

The pH of formulation 2 is typically in the range of pH 5.5 to 6.5, for example 5.5 to 6.1, for example the pH is 5.8. This formulation is particularly suitable for subcutaneous administration.

Molecular weight (MW in g/mol) of used excipients:
MW: Succinic acid ($C_4H_6O_4$)=118.09 g/mol
MW: Disodium succinate hexahydrate ($C_4O_4Na_2H_4 \times 6H_2O$) =270.14 g/mol
MW: Sorbitol=182.17 g/mol
MW: Polysorbate 20=1227.72 g/mol The osmolarity of the formulation is 300+/−30 mOsmol/kg, as determined using an Osmomat 030 (Gonotec GmbH, Berlin, Germany). The density at 20° C. of the formulation is approximately 1.040 g/cm³, as determined using a measuring unit DMA 4500 (Anton Paar GmbH, Ostfildern-Scharnhausen, Germany).

Formulation 3:

| Components | Concentration [mmol/L] | Concentration [g/l] | Nominal Amount [mg/syringe] V = 1.0 ml |
|---|---|---|---|
| Antibody | 0.6 | 90.0 | 90.0 |
| Sorbitol | 240 | 43.733 | 43.733 |
| Polysorbat 20 | 0.16 | 0.20 | 0.20 |
| Water for Injection | — | Ad 1 L | Ad 1 mL |

The pH of formulation 3 is typically in the range of pH 5.5 to 6.5, for example 5.5 to 6.1, for example the pH is 5.8. This formulation is particularly suitable for subcutaneous administration.

Molecular weight (MW in g/mol) of used excipients:
MW: Sorbitol=182.17 g/mol
MW: Polysorbate 20=1227.72 g/mol.

The osmolarity of the formulation is 300+/−30 mOsmol/kg, as determined using an Osmomat 030 (Gonotec GmbH, Berlin, Germany).

The invention claimed is:

1. A method for treating moderate to severe plaque psoriasis in an adult human patient with moderate to severe plaque psoriasis, comprising administering to the patient a safe and therapeutically effective dosing regimen of a full-length anti-IL-23A antibody, said anti-IL-23A antibody comprising two light chains each having the amino acid sequence of SEQ ID NO: 18 and two heavy chains each having the amino acid sequence of SEQ ID NO: 19, wherein said treating is significantly reducing or completely clearing psoriatic skin lesions, the dosing regimen comprising:
   a) subcutaneously administering to the patient a first dose of 150 mg of said anti-IL-23A antibody regardless of the patient's body weight; and
   b) subcutaneously administering to the patient a second dose of 150 mg of said anti-IL-23A antibody regardless of the patient's body weight 4 weeks after said first dose is administered,
wherein the method results in the patient achieving at least a 90% reduction from baseline Psoriasis Area and Severity Index score (PASI 90) 12 weeks after receiving the first dose.

2. The method according to claim 1, wherein each of the 150 mg doses is administered as two 75 mg subcutaneous injections.

3. A method for treating scalp psoriasis in an adult human patient with scalp psoriasis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO:19, wherein said treating is completely clearing scalp psoriasis, the dosing regimen comprising:
   a) subcutaneously administering to the patient a first dose of 150 mg of said anti-IL-23A antibody regardless of the patient's body weight; and
   b) subcutaneously administering to the patient a second dose of 150 mg of said anti-IL-23A antibody regardless of the patient's body weight 4 weeks after said first dose is administered,
wherein the method results in the patient achieving complete clearance of scalp psoriasis as measured by Psoriasis Scalp Severity Index (PSSI) 6 weeks after receiving the first dose.

4. A method for treating palmoplantar psoriasis in an adult human patient with palmoplantar, psoriasis comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO:19, wherein said treating is completely clearing palmoplantar psoriasis, the dosing regimen comprising:
  a) subcutaneously administering to the patient a first dose of 150 mg of said anti-IL-23A antibody regardless of the patient's body weight; and
  b) subcutaneously administering to the patient a second dose of 150 mg of said anti-IL-23A antibody regardless of the patient's body weight 4 weeks after said first dose is administered,
wherein the method results in the patient achieving complete clearance of palmoplantar psoriasis as measured by Palmoplantar Psoriasis Area Severity Index (PPASI) 6 weeks after receiving the first dose.

5. A method for treating nail psoriasis in an adult human patient with nail psoriasis comprising administering to the patient a safe and therapeutically effective dosing regimen of a full-length anti-IL-23A antibody, said anti-IL-23A antibody comprising two light chains each having the amino acid sequence of SEQ ID NO: 18 and two heavy chains each having the amino acid sequence of SEQ ID NO:19, wherein said treating is significantly reducing the severity of nail psoriasis, the dosing regimen comprising:
  a) subcutaneously administering to the patient a first dose of 150 mg of said anti-IL-23A antibody regardless of the patient's body weight; and
  b) subcutaneously administering to the patient a second dose of 150 mg of said anti-IL-23A antibody regardless of the patient's body weight 4 weeks after said first dose is administered,
wherein the method results in the patient achieving an improvement from baseline Nail Psoriasis Severity Index (NAPSI) 6 weeks after receiving the first dose.

6. The method according to claim 3, wherein each of the 150 mg doses is administered as two 75 mg subcutaneous injections.

7. The method according to claim 4, wherein each of the 150 mg doses is administered as two 75 mg subcutaneous injections.

8. The method according to claim 5, wherein each of the 150 mg doses is administered as two 75 mg subcutaneous injections.

9. A method for treating psoriatic arthritis in an adult human patient with psoriatic arthritis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO:19, wherein said treating is improving one or more measures of psoriatic arthritis disease activity, the dosing regimen comprising:
  a) subcutaneously administering to the patient a first dose of 150 mg of said anti-IL-23A antibody regardless of the patient's body weight; and
  b) subcutaneously administering to the patient a second dose of 150 mg of said anti-IL-23A antibody regardless of the patient's body weight 4 weeks after said first dose is administered,
wherein the method results in the patient achieving at least a 50% improvement in American College of Rheumatology response criteria (ACR 50) 24 weeks after receiving the first dose.

10. A method for treating moderate to severe plaque psoriasis in an adult human patient having moderate to severe plaque psoriasis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO:19, wherein said treating is significantly reducing or completely clearing psoriatic skin lesions, the dosing regimen comprising:
  a) subcutaneously administering to the patient a first dose of 150 mg of said anti-IL-23A antibody regardless of the patient's body weight;
  b) subcutaneously administering to the patient a second dose of 150 mg of said anti-IL-23A antibody regardless of the patient's body weight 4 weeks after said first dose is administered; and
  c) subcutaneously administering to the patient a third dose of 150 mg of said anti-IL-23A antibody regardless of the patient's body weight 12 weeks after said second dose is administered,
wherein the method results in the patient achieving at least a 90% reduction from baseline Psoriasis Area and Severity Index score (PASI 90) 16 weeks after receiving the first dose.

11. A method for treating scalp psoriasis in an adult human patient with scalp psoriasis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO: 19, wherein said treating is completely clearing scalp psoriasis, the dosing regimen comprising:
  a) subcutaneously administering to the patient a first dose of 150 mg of said anti-IL-23A antibody regardless of the patient's body weight;
  b) subcutaneously administering to the patient a second dose of 150 mg of said anti-IL-23A antibody regardless of the patient's body weight 4 weeks after said first dose is administered; and
  c) subcutaneously administering to the patient a third dose of 150 mg of said anti-IL-23A antibody regardless of the patient's body weight 12 weeks after said second dose is administered,
wherein the method results in the patient achieving complete clearance of scalp psoriasis as measured by Psoriasis Scalp Severity Index (PSSI) 6 weeks after receiving the first dose.

12. A method for treating palmoplantar psoriasis in an adult human patient with palmoplantar psoriasis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO:19, wherein said treating is completely clearing palmoplantar psoriasis, the dosing regimen comprising:
  a) subcutaneously administering to the patient a first dose of 150 mg of said anti-IL-23A antibody regardless of the patient's body weight; and
  b) subcutaneously administering to the patient a second dose of 150 mg of said anti-IL-23A antibody regardless of the patient's body weight 4 weeks after said first dose is administered, and c) subcutaneously administering to the patient a third dose of 150 mg of said anti-IL-23A antibody regardless of the patient's body weight 12 weeks after said second dose is administered, wherein the method results in the patient achieving complete clearance of palmoplantar psoriasis as measured by Palmoplantar Psoriasis Area Severity Index (PPASI) 6 weeks after receiving the first dose.

13. A method for treating nail psoriasis in an adult human patient with nail psoriasis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO:19, wherein said treating is significantly reducing the severity of nail psoriasis, the dosing regimen comprising:
 a) subcutaneously administering to the patient a first dose of 150 mg of said anti-IL-23A antibody regardless of the patient's body weight; and
 b) subcutaneously administering to the patient a second dose of 150 mg of said anti-IL-23A antibody regardless of the patient's body weight 4 weeks after said first dose is administered, and c) subcutaneously administering to the patient a third dose of 150 mg of said anti-IL-23A antibody regardless of the patient's body weight 12 weeks after said second dose is administered,
wherein the method results in the patient achieving an improvement from baseline Nail Psoriasis Severity Index (NAPSI) 6 weeks after receiving the first dose.

14. A method for treating psoriatic arthritis in an adult human patient with psoriatic arthritis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO:19, wherein said treating is improving one or more measures of psoriatic arthritis disease activity, the dosing regimen comprising:
 a) subcutaneously administering to the patient a first dose of 150 mg of said anti-IL-23A antibody regardless of the patient's body weight; and
 b) subcutaneously administering to the patient a second dose of 150 mg of said anti-IL-23A antibody regardless of the patient's body weight 4 weeks after said first dose is administered, c) subcutaneously administering to the patient a third dose of 150 mg of said anti-IL-23A antibody regardless of the patient's body weight 12 weeks after said second dose is administered,
wherein the method results in the patient achieving at least a 50% improvement in American College of Rheumatology response criteria (ACR 50) 24 weeks after receiving the first dose.

15. The method according to claim 10, wherein beginning 12 weeks after the third dose is administered to the patient, a dose of 150 mg of the anti-IL-23A antibody is subcutaneously administered to the patient regardless of the patient's body weight once every 12 weeks.

16. The method according to claim 11, wherein beginning 12 weeks after the third dose is administered to the patient, a dose of 150 mg of the anti-IL 23A antibody is subcutaneously administered to the patient regardless of the patient's body weight once every 12 weeks.

17. The method according to claim 12, wherein beginning 12 weeks after the third dose is administered to the patient, a dose of 150 mg of the anti-IL-23A antibody is subcutaneously administered to the patient regardless of the patient's body weight once every 12 weeks.

18. The method according to claim 13, wherein beginning 12 weeks after the third dose is administered to the patient, a dose of 150 mg of the anti-IL-23A antibody is subcutaneously administered to the patient regardless of the patient's body weight once every 12 weeks.

19. The method according to claim 14, wherein beginning 12 weeks after the third dose is administered to the patient, a dose of 150 mg of the anti-IL-23A antibody is subcutaneously administered to the patient regardless of the patient's body weight once every 12 weeks.

20. The method according to claim 9, wherein each of the 150 mg doses is administered as two 75 mg subcutaneous injections.

21. The method according to claim 10, wherein each of the 150 mg doses is administered as two 75 mg subcutaneous injections.

22. The method according to claim 11, wherein each of the 150 mg doses is administered as two 75 mg subcutaneous injections.

23. The method according to claim 12, wherein each of the 150 mg doses is administered as two 75 mg subcutaneous injections.

24. The method according to claim 13, wherein each of the 150 mg doses is administered as two 75 mg subcutaneous injections.

25. The method according to claim 14, wherein each of the 150 mg doses is administered as two 75 mg subcutaneous injections.

26. The method according to claim 1, wherein the method results in a 100% reduction from baseline Psoriasis Area and Severity Index score (PASI 100) 16 weeks after receiving the first dose.

27. The method according to claim 10, wherein the method results in a 100% reduction from baseline Psoriasis Area and Severity Index score (PASI 100) 16 weeks after receiving the first dose.

28. The method according to claim 9, wherein the method results in the patient achieving at least a 50% improvement in American College of Rheumatology response criteria (ACR 50) 16 weeks after receiving the first dose.

29. The method according to claim 9, wherein the method results in the patient achieving at least a 70% improvement in American College of Rheumatology response criteria (ACR 70) 24 weeks after receiving the first dose.

30. The method according to claim 9, wherein the method results in the patient achieving at least a 70% improvement in American College of Rheumatology response criteria (ACR 70) 16 weeks after receiving the first dose.

31. The method according to claim 14, wherein the method results in the patient achieving at least a 50% improvement in American College of Rheumatology response criteria (ACR 50) 16 weeks after receiving the first dose.

32. The method according to claim 14, wherein the method results in the patient achieving at least a 70% improvement in American College of Rheumatology response criteria (ACR 70) 24 weeks after receiving the first dose.

33. The method according to claim 14, wherein the method results in the patient achieving at least a 70% improvement in American College of Rheumatology response criteria (ACR 70) 16 weeks after receiving the first dose.

34. The method according to claim 1, wherein the method results in the patient achieving a Static Physician Global Assessment (sPGA) score of 0 or 1 at 12 weeks after receiving the first dose.

35. A method for treating moderate to severe plaque psoriasis in an adult human patient with moderate to severe plaque psoriasis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO:19, wherein said treating is significantly reducing or completely clearing psoriatic skin lesions, the dosing regimen comprising:
   a) subcutaneously administering to the patient a first dose of 90 mg to 180 mg of said anti-IL-23A antibody regardless of the patient's body weight; and
   b) subcutaneously administering to the patient a second dose of said anti-IL-23A antibody 4 weeks after said first dose is administered,
   wherein the second dose comprises an amount of the anti-IL-23A antibody equal to the first dose regardless of the patients' body weight, and wherein the method results in the patient achieving at least a 90% reduction from baseline Psoriasis Area and Severity Index score (PASI 90) 12 weeks after receiving the first dose.

36. The method according to claim 35, wherein each of the first and second doses is administered as two subcutaneous injections, wherein each of the subcutaneous injections delivers an equal amount of the anti-IL-23A antibody to the patient.

37. A method for treating scalp psoriasis in an adult human patient with scalp psoriasis, comprising administering to the patient a safe and therapeutically effective dosing regimen of a full-length anti-IL-23A antibody, said anti-IL-23A antibody comprising two light chains each having the amino acid sequence of SEQ ID NO: 18 and two heavy chains each having the amino acid sequence of SEQ ID NO:19, wherein said treating is completely clearing scalp psoriasis, the dosing regimen comprising:
   a) subcutaneously administering to the patient a first dose of 90 mg to 180 mg of said anti-IL-23A antibody regardless of the patient's body weight; and
   b) subcutaneously administering to the patient a second dose of said anti-IL-23A antibody 4 weeks after said first dose is administered,
   wherein the second dose comprises an amount of the anti-IL-23A antibody equal to the first dose regardless of the patient's body weight, and wherein the method results in the patient achieving complete clearance of scalp psoriasis as measured by Psoriasis Scalp Severity Index (PSSI) 6 weeks after receiving the first dose.

38. The method according to claim 37, wherein each of the first and second doses is administered as two subcutaneous injections, wherein each of the subcutaneous injections delivers an equal amount of the anti-IL-23A antibody to the patient.

39. A method for treating palmoplantar psoriasis in an adult human patient with palmoplantar psoriasis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO: 19, wherein said treating is completely clearing palmoplantar psoriasis, the dosing regimen comprising:
   a) subcutaneously administering to the patient a first dose of 90 mg to 180 mg of said anti-IL-23A antibody regardless of the patient's body weight; and
   b) subcutaneously administering to the patient a second dose of said anti-IL-23A antibody 4 weeks after said first dose is administered,
   wherein the second dose comprises an amount of the anti-IL-23A antibody equal to the first dose regardless of the patient's body weight, and wherein the method results in the patient achieving complete clearance of palmoplantar psoriasis as measured by Palmoplantar Psoriasis Area Severity Index (PPASI) 6 weeks after receiving the first dose.

40. The method according to claim 39, wherein each of the first and second doses is administered as two subcutaneous injections, wherein each of the subcutaneous injections delivers an equal amount of the anti-IL-23A antibody to the patient.

41. A method for treating nail psoriasis in an adult human patient with nail psoriasis, comprising administering to the patient a safe and therapeutically effective dosing regimen of a full-length anti-IL-23A antibody, said anti-IL-23A antibody comprising two light chains each having the amino acid sequence of SEQ ID NO: 18 and two heavy chains each having the amino acid sequence of SEQ ID NO:19, wherein said treating is significantly reducing nail psoriasis, the dosing regimen comprising:
   a) subcutaneously administering to the patient a first dose of 90 mg to 180 mg of said anti-IL-23A antibody regardless of the patient's body weight; and
   b) subcutaneously administering to the patient a second dose of said anti-IL-23A antibody 4 weeks after said first dose is administered,
   wherein the second dose comprises an amount of the anti-IL-23A antibody equal to the first dose regardless of the patient's body weight, and wherein the method results in the patient achieving an improvement from baseline Nail Psoriasis Severity Index (NAPSI) 6 weeks after receiving the first dose.

42. The method according to claim 41, wherein each of the first and second doses is administered as two subcutaneous injections, wherein each of the subcutaneous injections delivers an equal amount of the anti-IL-23A antibody to the patient.

43. A method for treating psoriatic arthritis in an adult human patient with psoriatic arthritis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO:19, wherein said treating is improving one or more measures of psoriatic arthritis disease activity, the dosing regimen comprising:
   a) subcutaneously administering to the patient a first dose of 90 mg to 180 mg of said anti-IL-23A antibody regardless of the patient's body weight; and
   b) subcutaneously administering to the patient a second dose of said anti-IL-23A antibody 4 weeks after said first dose is administered,
   wherein the second dose comprises an amount of the anti-IL-23A antibody equal to the first dose regardless of the patient's body weight, and wherein the method results in the patient achieving at least a 50% improvement in American College of Rheumatology response criteria (ACR 50) 24 weeks after receiving the first dose.

44. The method according to claim 43, wherein each of the first and second doses is administered as two subcutaneous injections, wherein each of the subcutaneous injections delivers an equal amount of the anti-IL-23A antibody to the patient.

45. A method for treating moderate to severe plaque psoriasis in an adult human patient with moderate to severe plaque psoriasis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO:19, wherein said treating is significantly reducing or completely clearing psoriatic skin lesions, the dosing regimen comprising:
 a) subcutaneously administering to the patient a first dose of 90 mg to 180 mg of said anti-IL-23A antibody regardless of the patient's body weight;
 b) subcutaneously administering to the patient a second dose of said anti-IL-23A antibody 4 weeks after said first dose is administered; and
 c) subcutaneously administering to the patient a third dose of said anti-IL-23A antibody 12 weeks after said second dose is administered,
 wherein the second dose and the third dose each comprise an amount of the anti-IL-23A antibody equal to the first dose regardless of the patient's body weight, and wherein the method results in the patient achieving at least a 90% reduction from baseline Psoriasis Area and Severity Index score (PASI 90) 16 weeks after receiving the first dose.

46. A method for treating scalp psoriasis in an adult human patient with scalp psoriasis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO:19, wherein said treating is completely clearing scalp psoriasis, the dosing regimen comprising:
 a) subcutaneously administering to the patient a first dose of 90 mg to 180 mg of said anti-IL-23A antibody regardless of the patient's body weight;
 b) subcutaneously administering to the patient a second dose of said anti-IL-23A antibody 4 weeks after said first dose is administered; and
 c) subcutaneously administering to the patient a third dose of said anti-IL-23A antibody 12 weeks after said second dose is administered,
 wherein the second dose and the third dose each comprise an amount of the anti-IL-23A antibody equal to the first dose regardless of the patient's body weight, and wherein the method results in the patient achieving complete clearance of scalp psoriasis as measured by Psoriasis Scalp Severity Index (PSSI) 6 weeks after receiving the first dose.

47. A method for treating palmoplantar psoriasis in an adult human patient with palmoplantar psoriasis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO: 19, wherein said treating is completely clearing palmoplantar psoriasis, the dosing regimen comprising:
 a) subcutaneously administering to the patient a first dose of 90 mg to 180 mg of said anti-IL-23A antibody regardless of the patient's body weight;
 b) subcutaneously administering to the patient a second dose of said anti-IL-23A antibody 4 weeks after said first dose is administered; and
 c) subcutaneously administering to the patient a third dose of said anti-IL-23A antibody 12 weeks after said second dose is administered,
 wherein the second dose and the third dose each comprise an amount of the anti-IL-23A antibody equal to the first dose regardless of the patient's body weight and wherein the method results in the patient achieving complete clearance of palmoplantar psoriasis as measured by Palmoplantar Psoriasis Area Severity Index (PPASI) 6 weeks after receiving the first dose.

48. A method for treating nail psoriasis in an adult human patient with nail psoriasis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO: 19, wherein said treating is significantly reducing the severity of nail psoriasis, the dosing regimen comprising:
 a) subcutaneously administering to the patient a first dose of 90 mg to 180 mg of said anti-IL-23A antibody regardless of the patient's body weight;
 b) subcutaneously administering to the patient a second dose of said anti-IL-23A antibody 4 weeks after said first dose is administered; and
 c) subcutaneously administering to the patient a third dose of said anti-IL-23A antibody 12 weeks after said second dose is administered,
 wherein the second dose and the third dose each comprise an amount of the anti-IL-23A antibody equal to the first dose regardless of the patient's body weight and wherein the method results in the patient achieving an improvement from baseline Nail Psoriasis Severity Index (NAPSI) 6 weeks after receiving the first dose.

49. A method for treating psoriatic arthritis in an adult human patient with psoriatic arthritis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO: 19, wherein said treating is improving one or more measures of psoriatic arthritis disease activity, the dosing regimen comprising:
 a) subcutaneously administering to the patient a first dose of 90 mg to 180 mg of said anti-IL-23A antibody regardless of the patient's body weight;
 b) subcutaneously administering to the patient a second dose of said anti-IL-23A antibody 4 weeks after said first dose is administered; and
 c) subcutaneously administering to the patient a third dose of said anti-IL-23A antibody 12 weeks after said second dose is administered,
 wherein the second dose and the third dose each comprise an amount of the anti-IL-23A antibody equal to the first dose regardless of the patient's body weight and wherein the method results in the patient achieving at least a 50% improvement in American College of Rheumatology response criteria (ACR 50) 24 weeks after receiving the first dose.

50. The method according to claim 45, wherein beginning 12 weeks after the third dose is administered to the patient, additional doses of the anti-IL-23A antibody are subcutaneously administered to the patient once every 12 weeks, and wherein said additional doses each comprise an amount of the anti-IL-23 antibody equal to the first dose regardless of the patient's body weight.

51. The method according to claim 46, wherein beginning 12 weeks after the third dose is administered to the patient, additional doses of the anti-IL-23A antibody are subcutaneously administered to the patient once every 12 weeks, and wherein said additional doses each comprise an amount of the anti-IL-23 antibody equal to the first dose regardless of the patient's body weight.

52. The method according to claim 47, wherein beginning 12 weeks after the third dose is administered to the patient, a additional doses of the anti-IL-23A antibody are subcutaneously administered to the patient once every 12 weeks, and wherein said additional doses each comprise an amount of the anti-IL-23 antibody equal to the first dose regardless of the patient's body weight.

53. The method according to claim 48, wherein beginning 12 weeks after the third dose is administered to the patient, a additional doses of the anti-IL-23A antibody are subcutaneously administered to the patient once every 12 weeks, and wherein said additional doses each comprise an amount of the anti-IL-23 antibody equal to the first dose regardless of the patient's body weight.

54. The method according to claim 49, wherein beginning 12 weeks after the third dose is administered to the patient, additional doses of the anti-IL-23A antibody are subcutaneously administered to the patient once every 12 weeks, and wherein said additional doses each comprise an amount of the anti-IL-23 antibody equal to the first dose regardless of the patient's body weight.

55. A method for treating psoriatic arthritis in an adult human patient with psoriatic arthritis, comprising administering to the patient a safe and therapeutically effective dosing regimen of a full-length anti-IL-23A antibody, said anti-IL-23A antibody comprising two light chains each having the amino acid sequence of SEQ ID NO: 18 and two heavy chains each having the amino acid sequence of SEQ ID NO: 19, wherein said treating is improving one or more measures of psoriatic arthritis disease activity, the dosing regimen comprising:
   a) subcutaneously administering to the patient a first dose of 150 mg of said anti-IL-23A antibody regardless of the patient's body weight; and
   b) subcutaneously administering to the patient a second dose of 150 mg of said anti-IL-23A antibody regardless of the patient's body weight 4 weeks after said first dose is administered;
wherein the method results in the patient achieving at least a 50% reduction from baseline in pain as assessed by Visual Analog Scale score at 12 weeks after receiving the first dose.

56. A method for treating psoriatic arthritis in an adult human patient with psoriatic arthritis, comprising administering to the patient a safe and therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO: 19, wherein said treating is improving one or more measures of psoriatic arthritis disease activity, the dosing regimen comprising:
   a) subcutaneously administering to the patient a first dose of 90 mg to 180 mg of said anti-IL-23A antibody regardless of the patient's body weight; and
   b) subcutaneously administering to the patient a second dose of said anti-IL-23A antibody 4 weeks after said first dose is administered;
wherein the second dose comprises an amount of the anti-IL-23A antibody equal to the first dose regardless of the patient's body weight, and wherein the method results in the patient achieving at least a 50% reduction from baseline in pain as assessed by Visual Analog Scale score at 12 weeks after receiving the first dose.

57. A method for treating moderate to severe plaque psoriasis, comprising administering to a human patient with moderate to severe plaque psoriasis a therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO:19, wherein said treating is significantly reducing or completely clearing psoriatic skin lesions, the dosing regimen comprising:
   a) subcutaneously administering to the patient a first dose of 150 mg of said anti-IL-23A antibody regardless of the patient's body weight; and
   b) subcutaneously administering to the patient a second dose of 150 mg of said anti-IL-23A antibody regardless of the patient's body weight 4 weeks after said first dose is administered,
wherein the method results in the patient achieving a Static Physician Global Assessment (sPGA) score of 0 or 1 at 12 weeks after receiving the first dose.

58. The method according to claim 57, wherein beginning 12 weeks after the second dose is administered to the patient, a dose of 150 mg of the anti-IL-23A antibody is subcutaneously administered to the patient regardless of the patient's body weight once every 12 weeks.

59. A method for treating moderate to severe plaque psoriasis, comprising administering to a human patient with moderate to severe plaque psoriasis a therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO: 19, wherein said treating is significantly reducing or completely clearing psoriatic skin lesions, the dosing regimen comprising:
   a) subcutaneously administering to the patient a first dose of 90 mg to 180 mg of said anti-IL-23A antibody regardless of the patient's body weight; and
   b) subcutaneously administering to the patient a second dose of said anti-IL-23A antibody 4 weeks after said first dose is administered,
wherein the second dose comprises an amount of the anti-IL-23A antibody equal to the first dose regardless of the patient's body weight, and wherein the method results in the patient achieving a Static Physician Global Assessment (sPGA) score of 0 or 1 at 12 weeks after receiving the first dose.

60. The method according to claim 59, wherein beginning 12 weeks after the second dose is administered to the patient, additional doses of the anti-IL-23A antibody are subcutaneously administered to the patient once every 12 weeks and wherein said additional doses each comprise an amount of the anti-IL-23A antibody equal to the first dose regardless of the patient's body weight.

61. A method of treating palmoplantar psoriasis, comprising administering to a human patient with palmoplantar psoriasis a therapeutically effective dosing regimen of a full-length anti-IL-23A antibody, said anti-IL-23A antibody comprising two light chains each having the amino acid sequence of SEQ ID NO: 18 and two heavy chains each having the amino acid sequence of SEQ ID NO:19, wherein said treating is completely clearing palmoplantar psoriasis, the dosing regimen comprising:
  a) subcutaneously administering to the patient a first dose of 150 mg of said anti-IL-23A antibody regardless of the patient's body weight; and
  b) subcutaneously administering to the patient a second dose of 150 mg of said anti-IL-23A antibody regardless of the patient's body weight 4 weeks after said first dose is administered,
wherein the method results in the patient achieving complete clearance of palmoplantar psoriasis as measured by Palmoplantar Psoriasis Area Severity Index (PPASI) 2 weeks after receiving the first dose.

62. The method according to claim 61, wherein beginning 12 weeks after the second dose is administered to the patient, a dose of 150 mg of the anti-IL-23A antibody is subcutaneously administered to the patient regardless of the patient's body weight once every 12 weeks.

63. A method for treating palmoplantar psoriasis, comprising administering to a human patient with palmoplantar psoriasis a therapeutically effective dosing regimen of a full-length anti-IL-23A antibody, said anti-IL-23A antibody comprising two light chains each having the amino acid sequence of SEQ ID NO: 18 and two heavy chains each having the amino acid sequence of SEQ ID NO:19, wherein said treating is completely clearing palmoplantar psoriasis, the dosing regimen comprising:
  a) subcutaneously administering to the patient a first dose of 90 mg to 180 mg of said anti-IL-23A antibody regardless of the patient's body weight; and
  b) subcutaneously administering to the patient a second dose of said anti-IL-23A antibody 4 weeks after said first dose is administered,
wherein the method results in the patient achieving complete clearance of palmoplantar psoriasis as measured by Palmoplantar Psoriasis Area Severity Index (PPASI) 2 weeks after receiving the first dose.

64. The method according to claim 63, wherein beginning 12 weeks after the second dose is administered to the patient, additional doses of the anti-IL-23A antibody are subcutaneously administered to the patient once every 12 weeks and wherein said additional doses each comprise an amount of the anti-IL-23A antibody equal to the first dose regardless of the patient's body weight.

65. A method for treating nail psoriasis, comprising administering to a human patient with nail psoriasis a therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO: 19, wherein said treating is significantly reducing the severity of nail psoriasis, the dosing regimen comprising:
  a) subcutaneously administering to the patient a first dose of 150 mg of said anti-IL-23A antibody regardless of the patient's body weight; and
  b) subcutaneously administering to the patient a second dose of 150 mg of said anti-IL-23A antibody regardless of the patient's body weight 4 weeks after said first dose is administered,
wherein the method results in the patient achieving an improvement from baseline Nail Psoriasis Severity Index (NAPSI) 12 weeks after receiving the first dose.

66. The method according to claim 65, wherein beginning 12 weeks after the second dose is administered to the patient, a dose of 150 mg of the anti-IL-23A antibody is subcutaneously administered to the patient regardless of the patient's body weight once every 12 weeks.

67. A method for treating nail psoriasis, comprising administering to a human patient with nail psoriasis a therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO: 19, wherein said treating is significantly reducing the severity of nail psoriasis, the dosing regimen comprising:
  a) subcutaneously administering to the patient a first dose of 90 mg to 180 mg of said anti-IL-23A antibody regardless of the patient's body weight; and
  b) subcutaneously administering to the patient a second dose of said anti-IL-23A antibody 4 weeks after said first dose is administered,
wherein the method results in the patient achieving an improvement from baseline Nail Psoriasis Severity Index (NAPSI) 12 weeks after receiving the first dose.

68. The method according to claim 67, wherein beginning 12 weeks after the second dose is administered to the patient, additional doses of the anti-IL-23A antibody are subcutaneously administered to the patient once every 12 weeks and wherein said additional doses each comprise an amount of the anti-IL-23A antibody equal to the first dose regardless of the patient's body weight.

69. A method of treating scalp psoriasis, comprising administering to a human patient with scalp psoriasis a therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO: 19, wherein said treating is completely clearing scalp psoriasis, the dosing regimen comprising:
  a) subcutaneously administering to the patient a first dose of 150 mg of said anti-IL-23A antibody regardless of the patient's body weight; and
  b) subcutaneously administering to the patient a second dose of 150 mg of said anti-IL-23A antibody regardless of the patient's body weight 4 weeks after said first dose is administered,
wherein the method results in the patient achieving complete clearance of scalp psoriasis as measured by Psoriasis Scalp Severity Index (PSSI) 2 weeks after receiving the first dose.

70. The method according to claim 69, wherein beginning 12 weeks after the second dose is administered to the patient, a dose of 150 mg of the anti-IL-23A antibody is subcutaneously administered to the patient regardless of the patient's body weight once every 12 weeks.

71. A method for treating scalp psoriasis, comprising administering to a human patient with scalp psoriasis a therapeutically effective dosing regimen of a full-length anti-IL-23A antibody, said anti-IL-23A antibody comprising two light chains each having the amino acid sequence of SEQ ID NO: 18 and two heavy chains each having the amino acid sequence of SEQ ID NO: 19, wherein said treating is completely clearing scalp psoriasis, the dosing regimen comprising:

a) subcutaneously administering to the patient a first dose of 90 mg to 180 mg of said anti-IL-23A antibody regardless of the patient's body weight; and b) subcutaneously administering to the patient a second dose of said anti-IL-23A antibody 4 weeks after said first dose is administered, wherein the method results in the patient achieving complete clearance of scalp psoriasis as measured by Psoriasis Scalp Severity Index (PSSI) 2 weeks after receiving the first dose.

72. The method according to claim 71, wherein beginning 12 weeks after the second dose is administered to the patient, additional doses of the anti-IL-23A antibody are subcutaneously administered to the patient once every 12 weeks and wherein said additional doses each comprise an amount of the anti-IL-23A antibody equal to the first dose regardless of the patient's body weight.

73. A method of treating psoriatic arthritis, comprising administering to a human patient with psoriatic arthritis a therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO: 19, wherein said treating is improving one or more measures of psoriatic arthritis disease activity, the dosing regimen comprising:

a) subcutaneously administering to the patient a first dose of 150 mg of said anti-IL-23A antibody regardless of the patient's body weight; and b) subcutaneously administering to the patient a second dose of 150 mg of said anti-IL-23A antibody regardless of the patient's body weight 4 weeks after said first dose is administered, wherein the method results in the patient achieving at least a 50% reduction from baseline in pain as assessed by Visual Analogue Scale (pain-VAS) score at 12 weeks after receiving the first dose or the method results in the patient achieving at least a 90% reduction from baseline Psoriasis Area and Severity Index score (PASI 90) at 12 weeks after receiving the first dose.

74. The method according to claim 73, wherein the method results in the patient achieving at least a 50% reduction from baseline in pain as assessed by Visual Analogue Scale (pain-VAS) score at 12 weeks after receiving the first dose.

75. The method according to claim 73, wherein the method results in the patient achieving at least a 90% reduction from baseline Psoriasis Area and Severity Index score (PASI 90) at 12 weeks after receiving the first dose.

76. The method according to claim 73, wherein beginning 12 weeks after the second dose is administered to the patient, a dose of 150 mg of the anti-IL-23A antibody is subcutaneously administered to the patient regardless of the patient's body weight once every 12 weeks.

77. A method for treating psoriatic arthritis, comprising administering to a human patient with psoriatic arthritis a therapeutically effective dosing regimen of a full-length anti-IL-23A antibody, said anti-IL-23A antibody comprising two light chains each having the amino acid sequence of SEQ ID NO:18 and two heavy chains each having the amino acid sequence of SEQ ID NO: 19, wherein said treating is improving one or more measures of psoriatic arthritis disease activity, the dosing regimen comprising:

a) subcutaneously administering to the patient a first dose of 90 mg to 180 mg of said anti-IL-23A antibody regardless of the patient's body weight; and b) subcutaneously administering to the patient a second dose of said anti-IL-23A antibody 4 weeks after said first dose is administered, wherein the method results in the patient achieving at least a 50% reduction from baseline in pain as assessed by Visual Analogue Scale (pain-VAS) score at 12 weeks after receiving the first dose or the method results in the patient achieving at least a 90% reduction from baseline Psoriasis Area and Severity Index score (PASI 90) at 12 weeks after receiving the first dose.

78. The method according to claim 77, wherein the method results in the patient achieving at least a 50% reduction from baseline in pain as assessed by Visual Analogue Scale (pain-VAS) score at 12 weeks after receiving the first dose.

79. The method according to claim 77, wherein the method results in the patient achieving at least a 90% reduction from baseline Psoriasis Area and Severity Index score (PASI 90) at 12 weeks after receiving the first dose.

80. The method according to claim 77, wherein beginning 12 weeks after the second dose is administered to the patient, additional doses of the anti-IL-23A antibody are subcutaneously administered to the patient once every 12 weeks and wherein said additional doses each comprise an amount of the anti-IL-23A antibody equal to the first dose regardless of the patient's body weight.

* * * * *